(12) United States Patent
Bednarz, III

(10) Patent No.: US 9,285,281 B1
(45) Date of Patent: Mar. 15, 2016

(54) DEFLECTION PLATE FOR MOBILE DYNAMOMETER

(75) Inventor: Edward T. Bednarz, III, Tobyhanna, PA (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 627 days.

(21) Appl. No.: 13/545,565

(22) Filed: Jul. 10, 2012

(51) Int. Cl.
*G01L 1/00* (2006.01)

(52) U.S. Cl.
CPC .......................................... *G01L 1/00* (2013.01)

(58) Field of Classification Search
CPC ....... G01L 1/2225; G01L 1/2268; G01L 1/26; G01L 1/2206; G01L 1/2243; G01G 3/1402; G01G 3/1412; G01G 3/1404; G01G 19/12; G01G 23/3735; Y10S 177/09
USPC ...................... 73/862.622, 862.634, 862.471, 73/862.639, 862.65–862.66, 862.6, 1.13; 177/229, 50, 25.13, 211
See application file for complete search history.

(56) References Cited

U.S. PATENT DOCUMENTS 4,237,727 A * 12/1980 Lockery et al. .......... 73/862.622
4,261,429 A * 4/1981 Lockery ........................ 177/211

OTHER PUBLICATIONS

Zhu et al., "Practical Aspects in Moving Load Identification", Journal of Sound and Vibration, 2002, V258, pp. 123-146.
Asnachinda, et al., "Multiple Vehicle Axle Load Identification from Continuous Bridge Bending Moment Response", Science Direct, May 2008, pp. 1-18.
Moses, "Weigh-In-Motion System Using Instrumented Bridges", Transportation Engineering Journal, May 1979, pp. 233-249.
Peters, "Axway a System to Obtain Vehicle Axle Weights", The 12th ARRB Conference, Hobart, Tasmania, Aug. 1984, pp. 10-18.
Yuan, "Identification of Moving Loads from the Response of Simply Supported Beam", Proceedings of the International' Conference on Structural Dynamics, Vibration, Noise and Control, Hong Kong, Dec. 1995, pp. 924-929.
Bu, et al., "Innovative Bridge Condition Assessment from Dynamic Response of a Passing Vehicle", Journal of Engineering Mechanics, Dec. 2006, pp. 1372-1379.
Law, et al., "Moving Load Identification on a Simply Supported Orthotropic Plate", InteroationaJ Journal ofMechanical Sciences, 2007, V49, pp. 1262-1275.
Rowley, et al., "Experimental Testing of a Moving Force Identification Bridge Weigh-In-Motion Algoritlun", Experimental Mechanics, Nov. 2008, pp. 743-746.
Skelton, et al., "A Transducer for Measuring Tensile Strains in Concrete Bridge Girders", Experimental Mechanics, 2006, V46, pp. 325-332.

(Continued)

*Primary Examiner* — Lisa Caputo
*Assistant Examiner* — Brandi N Hopkins
(74) *Attorney, Agent, or Firm* — Azza Jayaprakash

(57) ABSTRACT

A deflection plate for protecting a load cell of a mobile dynamometer, includes a generally elongated member having a front surface, a back surface, a top surface, a bottom surface and two side surfaces. The front surface is at least partially tapered such that the front surface adjacent the top surface is thicker than the front surface adjacent the bottom surface. The taper of said front surface of the deflection plate is preferably dimensioned and configured such that the safety factor along substantially most of its length is at least about 1.1 and less than about 1.2. A method for employing strain gages identifies the magnitudes and locations of loads on slender beams using strain gage based methods with application to portable Army bridges.

20 Claims, 79 Drawing Sheets

(56) References Cited

OTHER PUBLICATIONS

Adams, et al., "Multiple Force Identification for Complex Structures", Experimental Mechanics, Mar. 2002, pp. 25-36.
Jiu, et al., Input Force Estimation of a Cantilever Plate by Using a System Identification Technique, Computer Methods in Applied Mechanics and Engineering, 2000, V 190, pp. 1309-1322.
Hillary, et al., "The Use of Strain Gauges in Force Determination and Frequency Response Function Measurements", Proceedings of the 2nd International Modal Analysis Conference and Exhibit, Feb. 1984, pp. 627-634.
Rajkondawar, et al., "A System for Identifying Lameness in Dairy Cattle", American Society of Agricultural and Biological Engineers, 2002, V 18, pp. J-28.
The Technical Staff of Measurements Group, Inc., "Strain Gage Based Transducers: Their Design and Construction", 1988, pp. 1-79.
Vishay Measurements Group, Inc., "Measurement of Force, Torque, and Other Mechanical Variables with Strain Gages", Technical Publication 2011, pp. J-26.
Young, "Roark's Formulas for Stress & Strain, 6th Edition", McGraw-Hill, 1989, p. 52.
Vishay Measurements Group, Inc., "Strain Gage Selection: Criteria, Procedures, Recommendations", Tech Note TN:-505-4, Nov. 2010 pp. 49-64.
Moller, "Load Identification Through Structural Modification", Journal of Applied Mechanics, vol. 66, Issue 1, Mar. 1999, pp. 236-241.
Masroor, et al., "Designing an All-Purpose Force Transducer, Experimental Mechanics", vol. 31, Issue 1, 1991, pp. 33-35.
Vishay Measurements Group, Inc., SC-300 Strain Measuring Systems Workshop, 2003.
Craig, "Mechanics of Materials", John Wiley and Sons, 1996.
Nash, "Schaum's Outlines: Statics and Mechanics of Materials", McGrawHill Companies, 1992.
Muvdi, et al., "Engineering Mechanics of Materials", Macmillan Publishing Co., 1980.

Kluck, et al., "Trilateral Design and Test Code for Military Bridging and Gap-Crossing Equipment", Military Document Approved for Public Release, 2005, pp. 1-117.
American Forest & Paper Association, "Beam Design Formulas with Shear and Moment Diagrams", Nov. 2007, pp. 1-20.
Vishay Measurements Group, Inc., "Strain Gage Thermal Output and Gage Factor Variation with Temperature", Tech Note TN-504-1, Sep. 2010, pp. 35-47.
Andrae, et al., "Time Synchronized Measurement of Multi-Bridge Force Transducers", Measurement, 2001, V29, pp. 105-111.
Blakeborough, et al., "Novel Load Cell for Measuring Axial Force, Shear Force and Bending Moment in Large-Scale Structural Experiments", Experimental Mechanics, Mar. 2002, pp. 115-122.
Frederiksen, et al., "On Calibration of Adjustable Strain Transducers", Experimental Mechanics, Sep. 1996, pp. 218-223.
Dorsey., "Homegrown Strain-Gage Transducers", Experimental Mechanics, Jul. 1977, pp. 255-260.
Vishay Measurements Group, Inc., "Plane-Shear Measurement with Strain Gages", Tech Note TN-512-1, Sep. 2010 pp. 113-118.
Mahoud, "Applying a Fuzzy Logic Expert System in the Selection of Bridge Deck Joints", Dissertation, University of Central Florida, 1998, pp. 1-474.
Groper, "Microslip and Macroslip in Bolted Joints", Experimental Mechanics, 1985,pp. 171-174.
Gaul, et al., "Identification of Nonlinear Structural Joint Models and Implementation in Discretized Structure Models", Conference on Mechanical Vibration and Noise, 1987, pp. 213-219.
Blendulg, "Fastening Technology & Bolted I Screwed Joint Design", seminar, Feb. 2010, pp. 1-284.
He, et al., "Finite Element Modeling of Structures With L-Shaped Beams and Bolted Joints", Journal of Vibration and Acoustics, Feb. 2011, V133, pp. 1-13.
Song, et al., "Simulation of Dynamics of Beam Structures with Bolted Joints Using Adjusted Iwan Beam Eleiments", Journal of Sound and Vibration, 2004, V273, pp. 249-276.

* cited by examiner

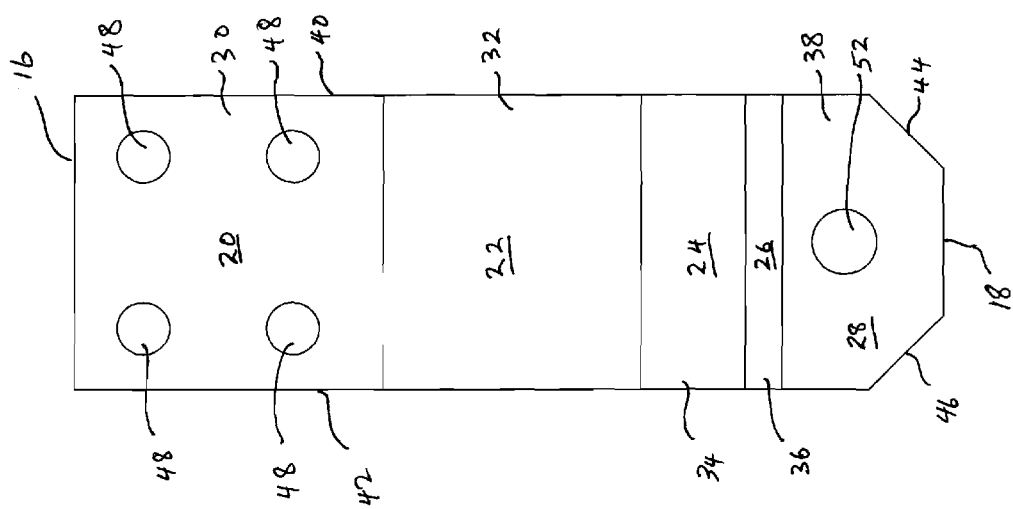

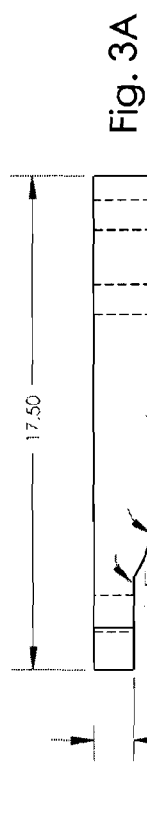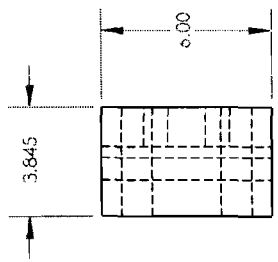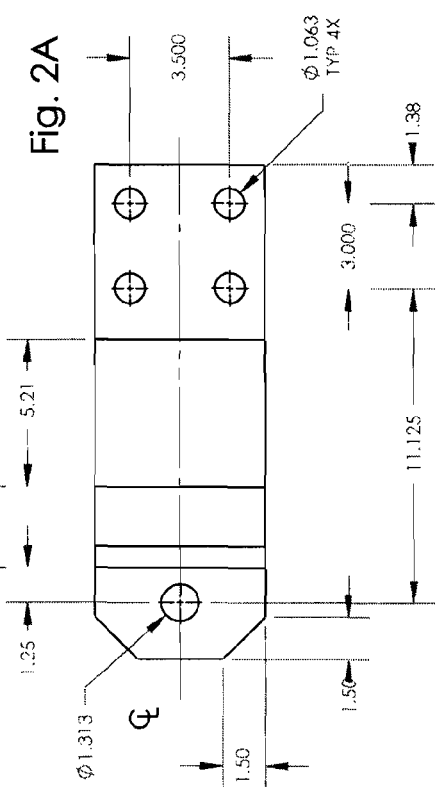

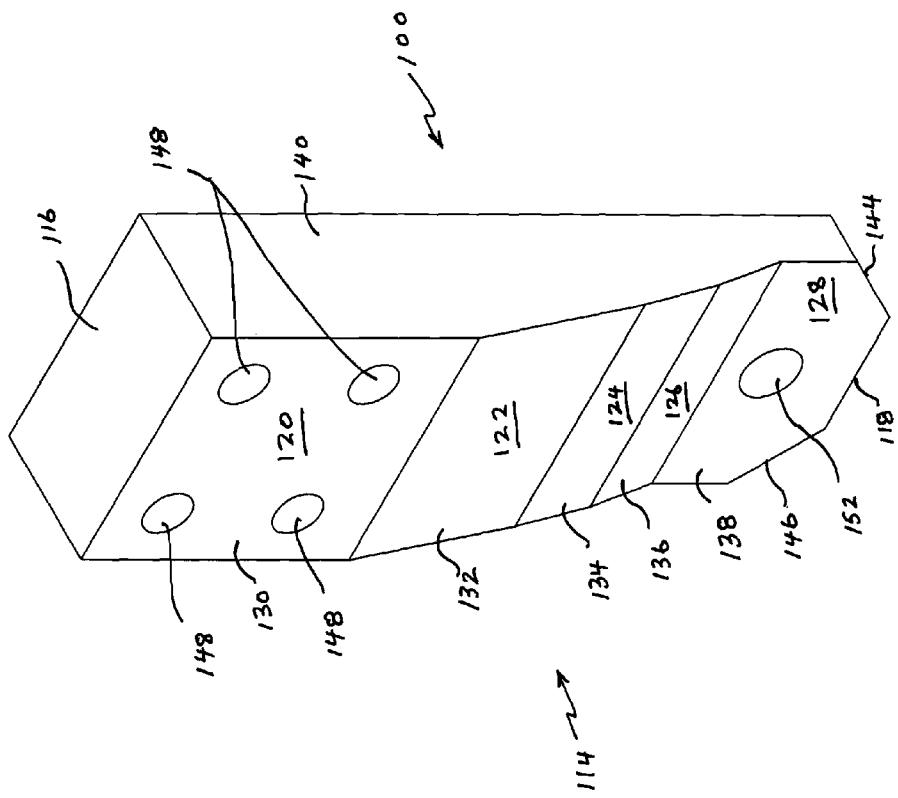

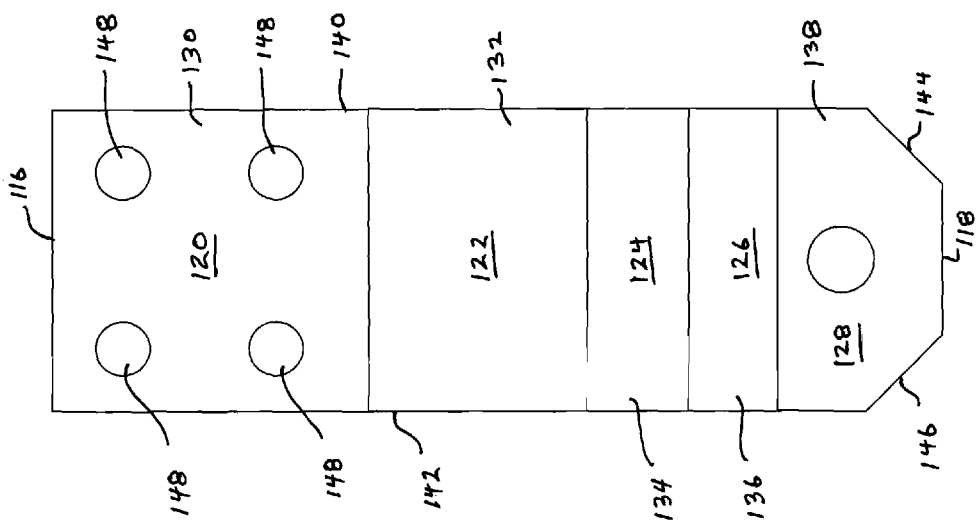

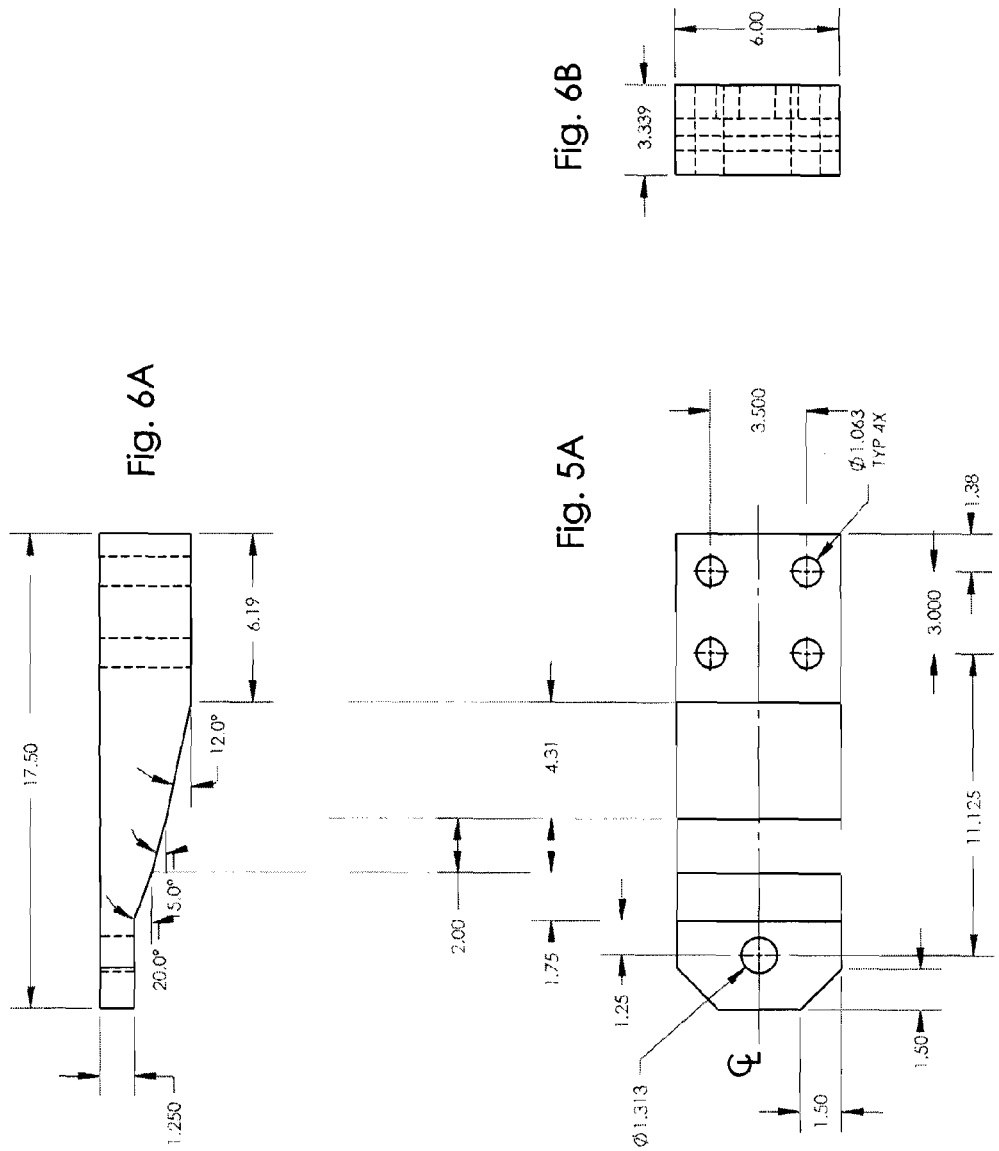

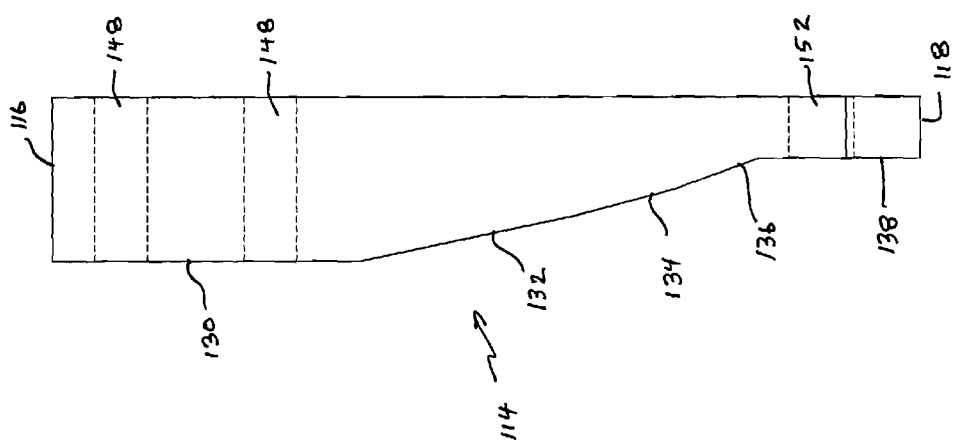

(a)

(b)

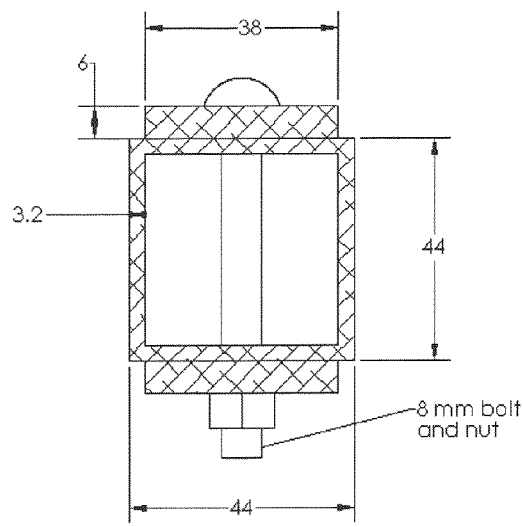
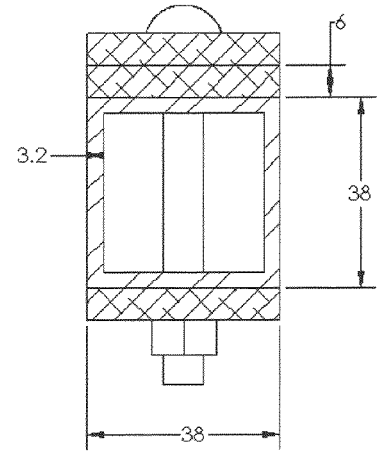
FIG. 119  FIG. 120
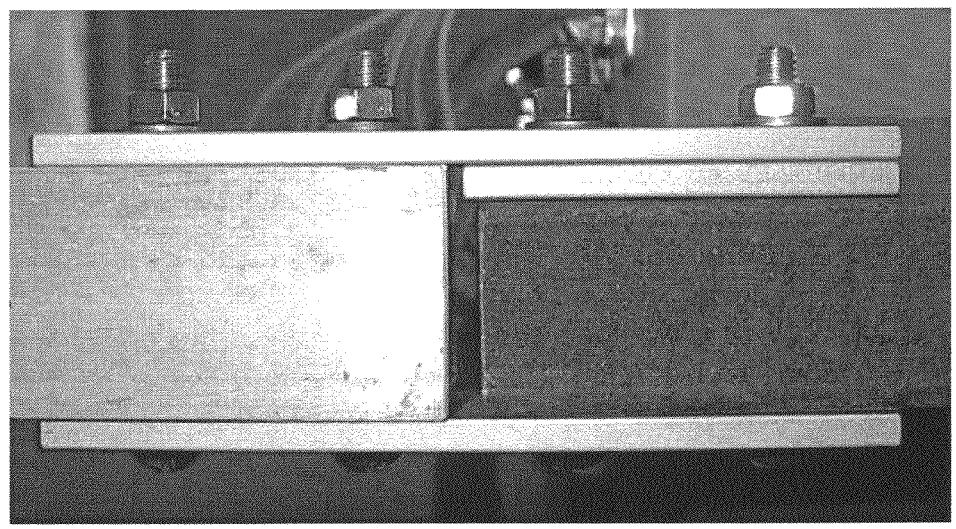
FIG. 121

FIG. 122
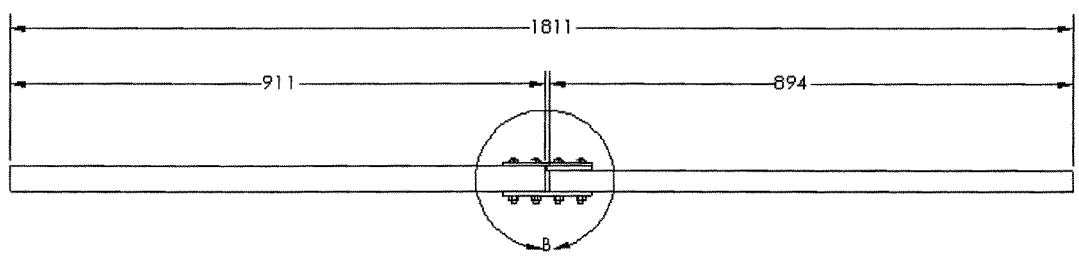
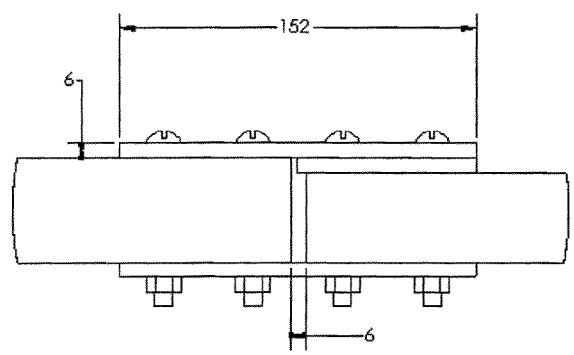
DETAIL B
SCALE 1 : 2
FIG. 123

DEFLECTION PLATE FOR MOBILE DYNAMOMETER

GOVERNMENT INTEREST

The invention described herein may be manufactured, used, imported, sold, and licensed by or for the Government of the United States of America without the payment to me of any royalty thereon.

FIELD OF THE INVENTION

The present invention relates generally to deflection plates to protect load cells from overloading and, more particularly, to a deflection plate for the M16 and M18 Mobile Dynamometers used by the U.S. Army. The present invention also relates to a method for employing strain gages to identify the magnitudes and locations of loads on slender beams using strain gage based methods with application to portable Army bridges.

BACKGROUND OF THE INVENTION

A mobile dynamometer is a vehicle that can measure the force needed to tow large vehicles such as tanks. A load cell with a capacity of about, for example, 100,000 pounds is connected to a sway bar underneath the dynamometer. However, a method and structure is needed to prevent the load cell from being overloaded should the force suddenly exceed the 100,000 pound capacity. Overloading the load cell can lead to damage.

SUMMARY OF THE INVENTION

The present invention is directed to a deflection plate for protecting a load cell of a mobile dynamometer, comprising a generally elongated member having a front surface, a back surface, a top surface, a bottom surface and two side surfaces; the front surface being at least partially tapered such that the front surface adjacent the top surface is thicker than the front surface adjacent the bottom surface; the front surface having at least one bore adjacent the top surface; and the front surface having at least one bore adjacent the bottom surface.

In a preferred embodiment, the front surface of the deflection plate tapers for a substantial portion from adjacent the top surface to adjacent the bottom surface with decreasing thicknesses. The front surface can taper with at least four decreasing thicknesses.

The deflection plate can be formed of five segments wherein said first segment includes the top surface and the fifth segment includes the bottom surface and wherein the second segment, the third segment and the fourth segment are disposed in increasing segment number order between the first segment and the fifth segment.

In another preferred embodiment, the first segment and the fifth segment can have respective constant thicknesses and wherein the thickness of the first segment is greater than the thickness of the fifth segment. Also the second segment, the third segment and the fourth segment each have decreasing thicknesses such that the junction of the second segment and the third segment is greater than the thickness of the junction of the third segment and the fourth segment. In a preferred embodiment, the front surfaces of each of said second segment, said third segment and said fourth segment are generally flat. Preferably the elongated member is generally rectangular.

Yet in another preferred embodiment, the back surface, the top surface, the bottom surface and the two side surfaces are generally flat. Also the bottom surface and the sides are joined by flat angled surfaces.

In a preferred embodiment, the front surface of the deflection plate is dimensioned and configured such that the safety factor along substantially most of the length of the deflection plate is at least 1.1. Also preferably the safety factor along substantially most of the length of said deflection plate is less than about 1.2.

The present invention is also directed to a linkage system for a mobile dynamometer for testing power drawbar effect and resistance to towing characteristics of tracked and wheeled vehicles, and wherein the mobile dynamometer has an undercarriage. The linkage system includes a deflection plate, a load cell coupled at one end to the deflection plate; a load beam coupled at one end to the other end of the load cell; and a tow mechanism coupled to the other end of the load beam.

The linkage system further includes at least stopper plate mounted on the load beam and at least one stop member mounted on the undercarriage of the mobile dynamometer. The stopper plate and the at least one stop member are disposed relative to one another such that the load beam can travel a predetermined distance before the stopper plate and the at least one stop member abut one another. The predetermined distance in one preferred embodiment is about 0.25 inches.

The present invention is in addition directed to a method for testing power drawbar effect and resistance to towing characteristics of tracked and wheeled vehicles coupled to a mobile dynamometer, and wherein the mobile dynamometer has an undercarriage, comprising providing a deflection plate; providing a load cell coupled at one end to said deflection plate; providing a load beam coupled at one end to the other end of said load cell; and providing a tow mechanism coupled to the other end of said load beam for connecting a vehicle to be towed.

In one preferred embodiment of the method, the taper of the front surface of the deflection plate is dimensioned and configured such that the safety factor along substantially most of the length of the deflection plate is at least 1.1. In another preferred embodiment, the taper of the front surface of the deflection plate is dimensioned and configured such that the safety factor along substantially most of the length of the deflection plate is at least about 1.1 and less than about 1.2. Preferably in the method, the elongated member is formed of five segments wherein the first segment includes the top surface and the fifth segment includes the bottom surface and wherein the second segment, the third segment and the fourth segment are disposed in increasing segment number order between the first segment and the fifth segment. Also in this method, the first segment and the fifth segment have respective constant thicknesses and the thickness of the first segment is greater than the thickness of the fifth segment, and wherein the second segment, the third segment and the fourth segment each have decreasing thicknesses such that the junction of the second segment and the third segment is greater than the thickness of the junction of the third segment and the fourth segment.

The present invention also is directed to a method for employing strain gages to identify the magnitudes and locations of loads on slender beams using strain gage based methods with application to portable Army bridges.

BRIEF DESCRIPTION OF THE DRAWINGS

The following detailed description is made with reference to the accompanying drawings, in which:

FIG. 2 is a front view of the deflection plate of FIG. 1;

FIG. 2A is a front view with detailed dimensions of the deflection plate of FIG. 1;

FIG. 3A is a side view with detailed dimensions of the deflection plate of FIG. 1;

FIG. 3B is an top end view with detailed dimensions of the deflection plate of FIG. 1;

FIG. 4 is a perspective view of a deflection plate in accordance with an alternative preferred embodiment of the present invention;

FIG. 5 is a front view of the deflection plate of FIG. 4;

FIG. 5A is a front view with detailed dimensions of the deflection plate of FIG. 4;

FIG. 6 is a side view of the deflection plate of FIG. 4;

FIG. 6A is a side view with detailed dimensions of the deflection plate of FIG. 4;

FIG. 6B is an top end view with detailed dimensions of the deflection plate of FIG. 4;

FIG. 113 shows strain response for the beam in FIG. 100 with different bolt torque values;

FIG. 114 is a comparison of the theoretical and calculated bending moment diagrams for the beam in FIG. 100 with different bolt torque values;

FIG. 115 shows comparisons of the theoretical strains for firm rest boundary conditions, the measured strains, and the zeroed strains from FEA for soft rest boundary conditions with the updated Young's modulus;

FIG. 116 is a comparison of the theoretical bending moment diagram and the calculated bending moment diagram from a global scaling factor, for a 445 N force at position 9.5 on the beam in FIG. 100;

FIG. 117 is a comparison of the theoretical and calculated bending moment diagrams for the beam in FIG. 100;

FIG. 118 is a picture of an experimental setup of a half aluminum and half steel beam with a bolted joint and rest boundary conditions;

FIG. 119 illustrates a cross section of the half aluminum beam in FIG. 118;

FIG. 120 illustrates a cross section of the half steel beam in FIG. 118;

FIG. 121 is a picture of a close-up view of the bolted joint in the beam in FIG. 118;

FIG. 122 is a side view of the bolted joint in the beam in FIG. 1,18 (dimensions in mm);

FIG. 123 is a close-up view of the bolted joint in the beam in FIG. 118 (dimensions in mm);

FIG. 124 is a side view of the beam in FIG. 118 with numbered strain gage locations (dimensions in mm);

Figure 125:
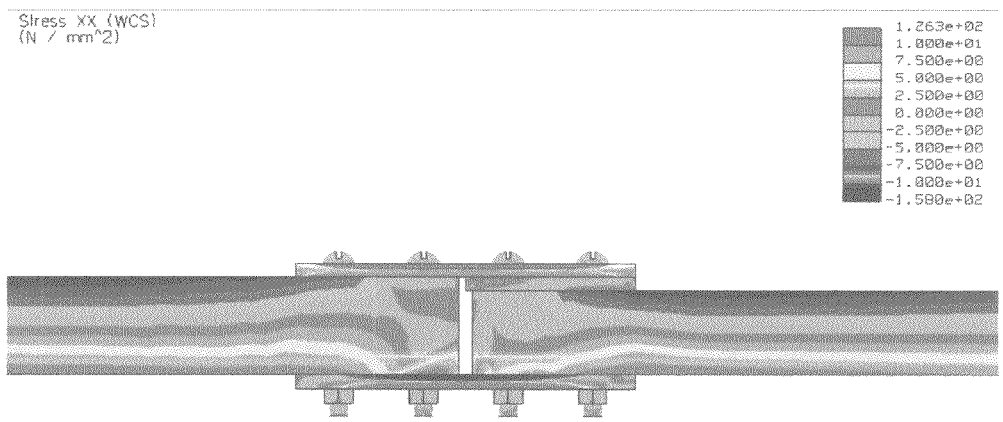
Figure 118:
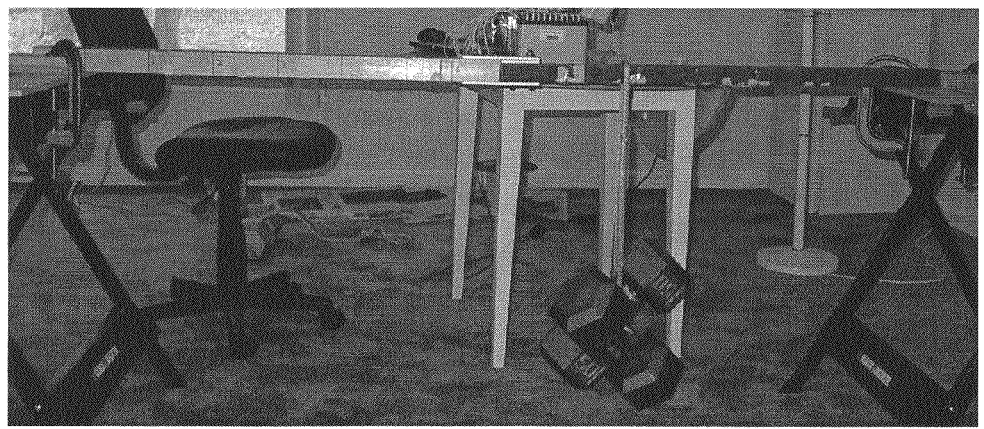
Figure 126:
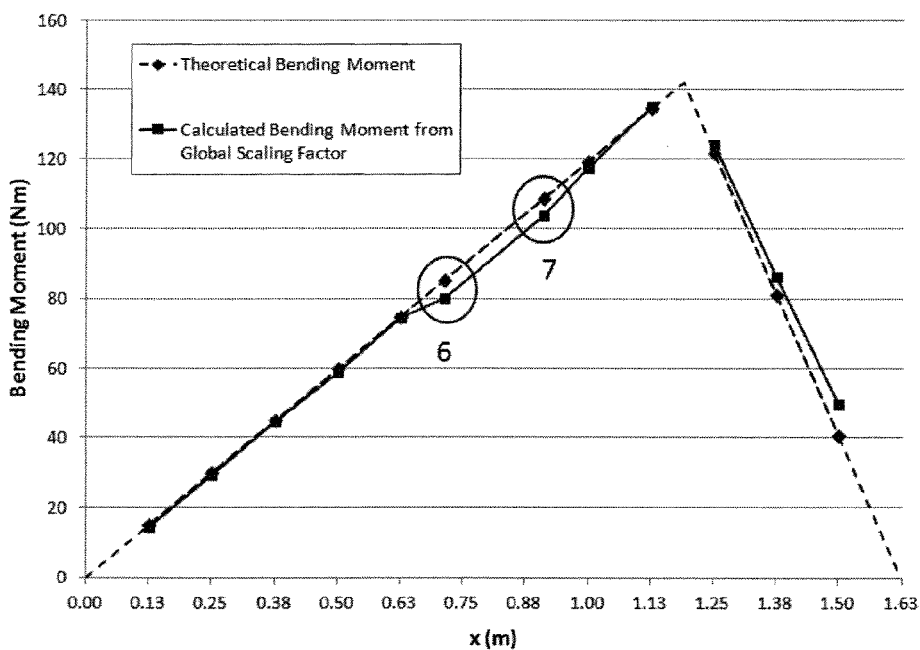
Figure 127:
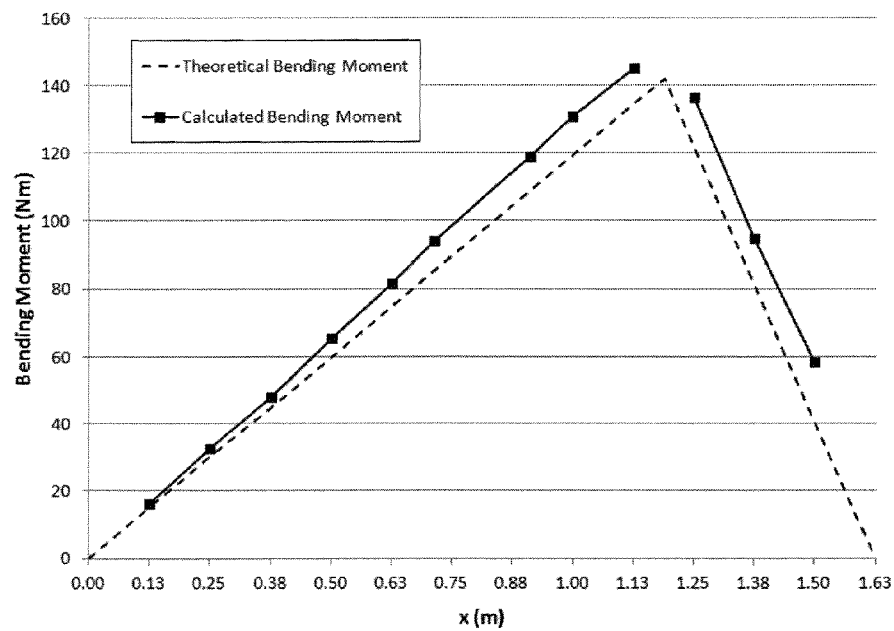
Figure 129:
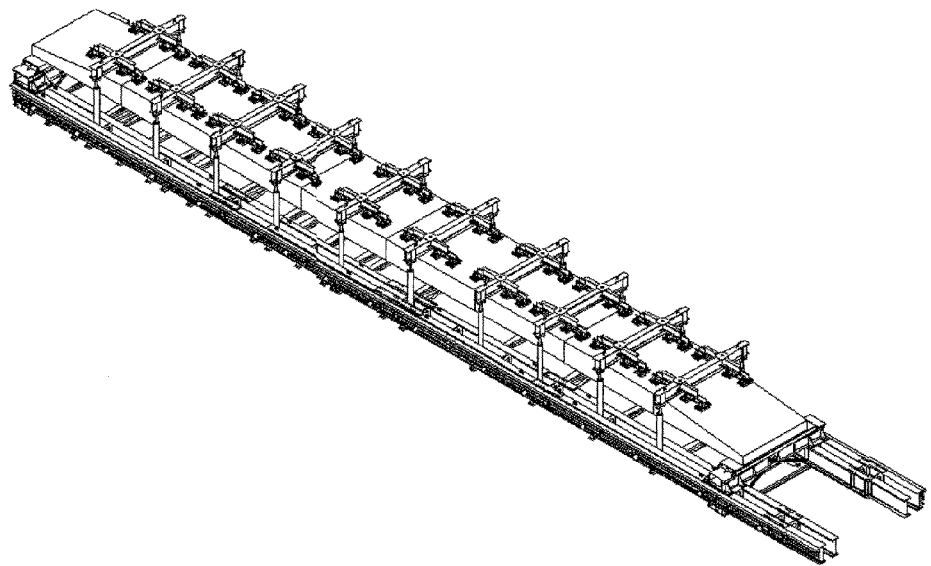
Figure 128:
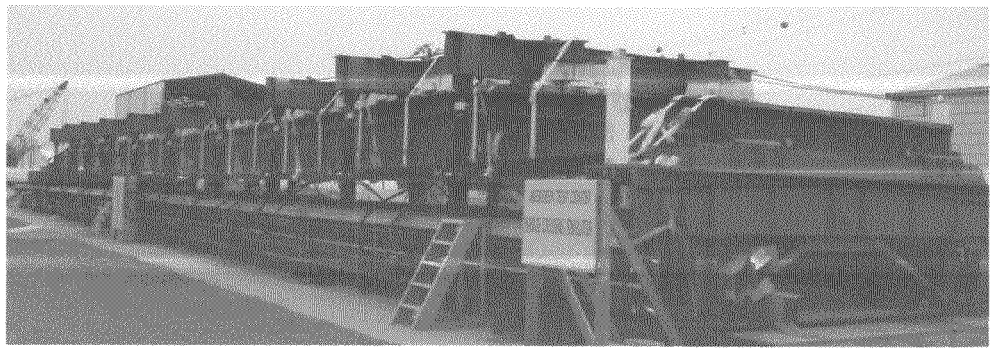
Figure 130:
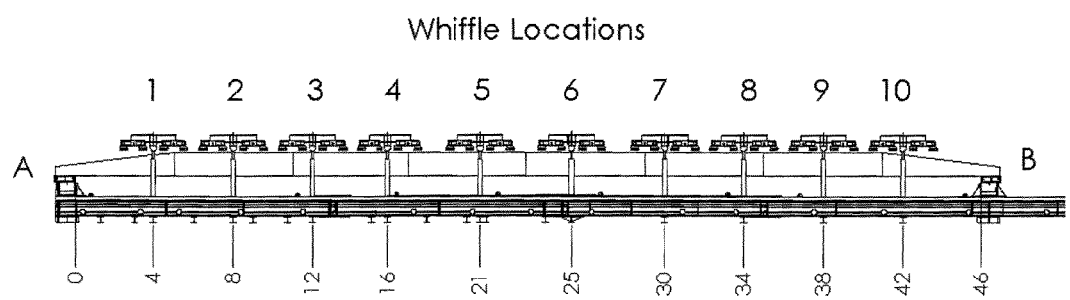
Figure 131:
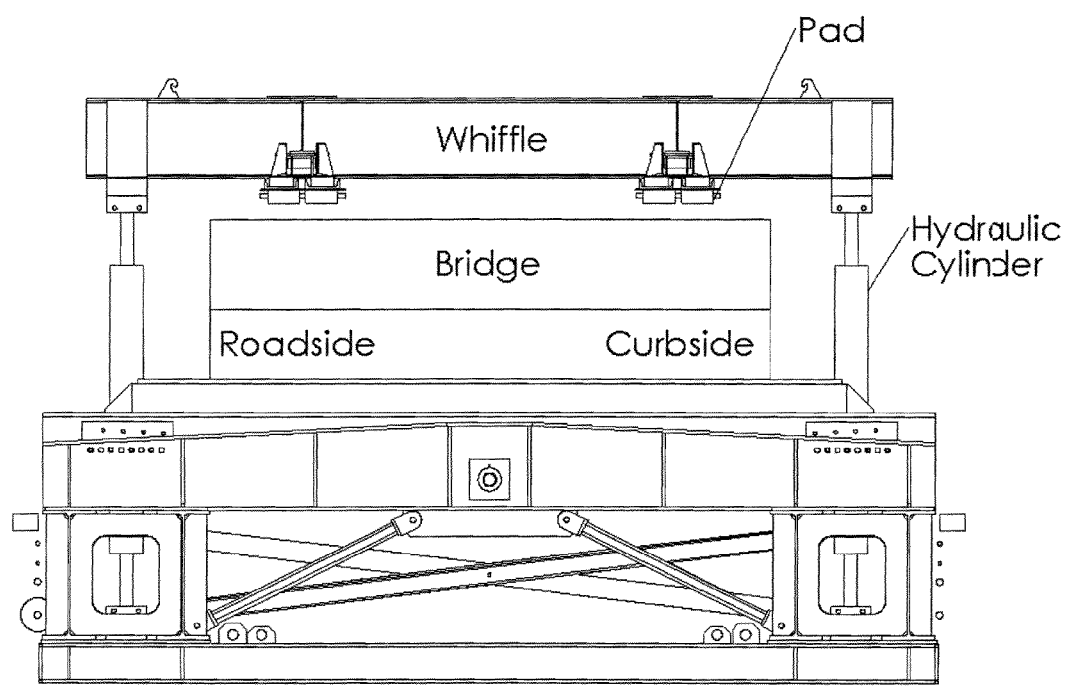
Figure 132:
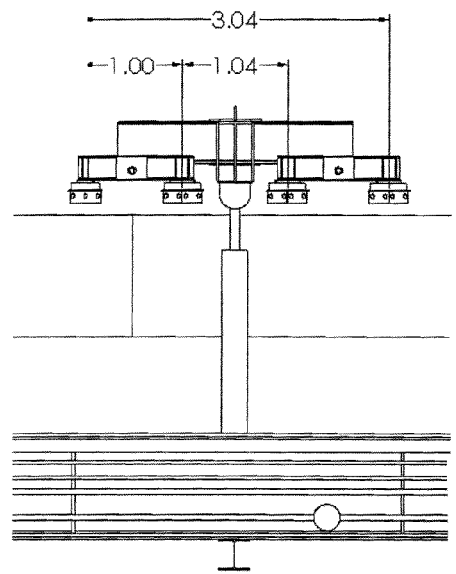
Figure 133:
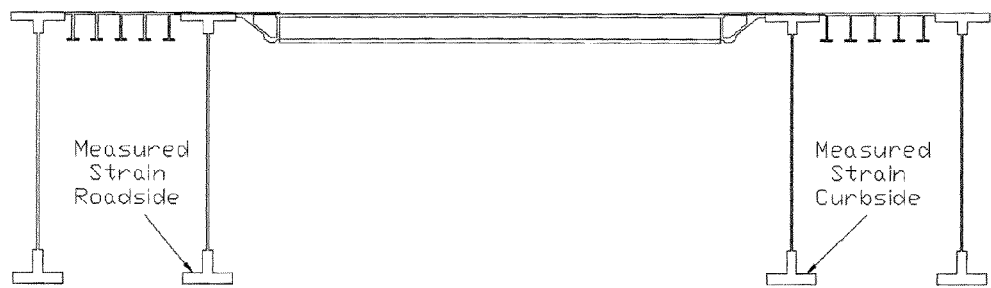
Figure 134:
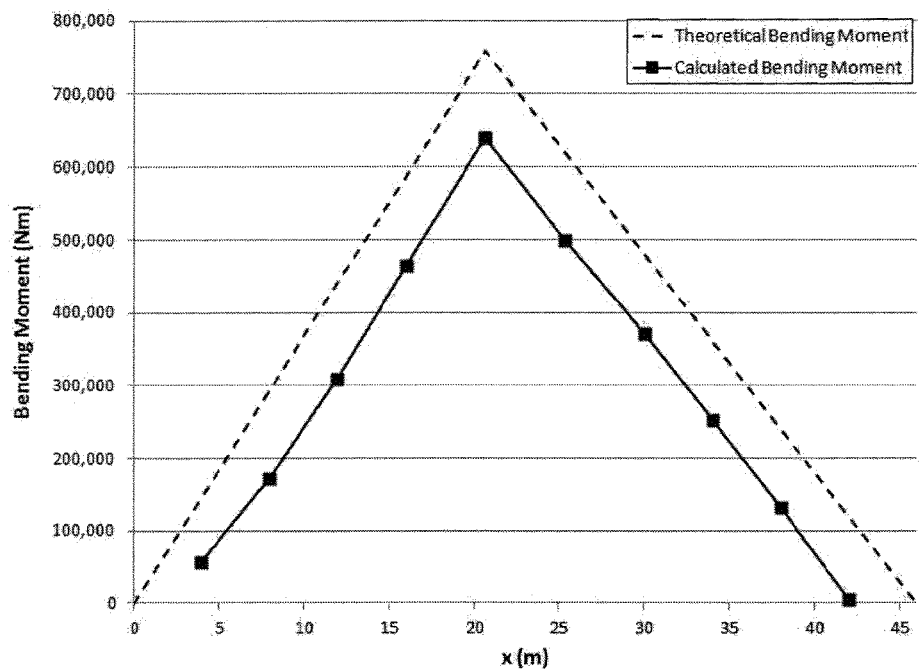
Figure 135:
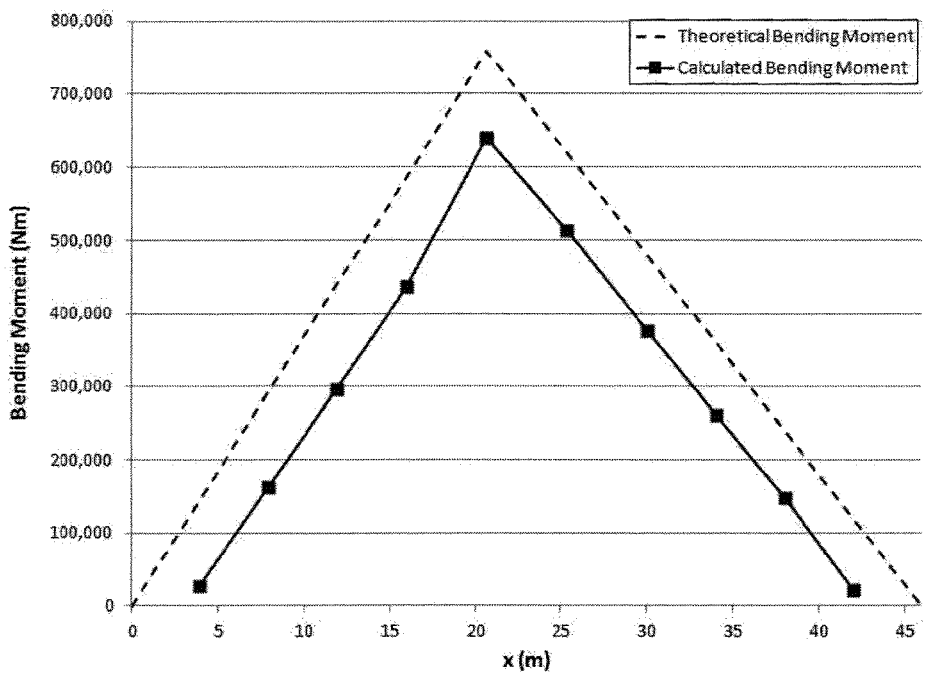
Figure 136:

FIG. 125 is a color presentation of a predicted stress pattern from FEA on the beam in FIG. 118 with pinned boundary conditions, zero preloads in the bolts, and a 445 N force at position 2.5;

FIG. 126 is a comparison of the theoretical and calculated bending moments from a global scaling factor for a 445 N force at position 9.5 for the beam in FIG. 118;

FIG. 127 is a comparison of the theoretical and calculated bending moment diagrams for the beam in FIG. 118;

FIG. 128 is a picture of an experimental setup of a portable army bridge on the BCS at the US Army Aberdeen Test Center;

FIG. 129 is a schematic of the portable army bridge with ten Whiffles on the BCS;

FIG. 130 is a side view of the portable army bridge on the BCS, showing the Whiffle locations (dimensions in meters);

FIG. 131 is an end view of the BCS from abutment A, showing the bridge, a Whiffle, pads, and hydraulic cylinders;

FIG. 132 is a side view of a Whiffle (dimensions in meters);

FIG. 133 is a cross section of the portable army bridge showing strain gage locations;

FIG. 134 is a comparison of the theoretical and calculated bending moment diagrams for the roadside of the portable army bridge on the BCS;

FIG. 135 is a comparison of the theoretical and calculated bending moment diagrams for the curbside of the portable army bridge on the BCS; and FIG. 136 shows a tank crossing a truss bridge.

DETAILED DESCRIPTION OF THE INVENTION

In the description herein with respect to the drawings, any reference to direction is purely informative and is employed for ease of reference. It is not intended as limiting the scope of the claims herein.

The deflection plate or anchor arm plate of the present invention is for use in the M16 Heavy Mobile Dynamometer Vehicle (manufactured by Barnes and Reinecke in the late 1970's) and the M18 Medium Mobile Dynamometer Vehicle (manufactured also by Barnes and Reinecke, in the late 1980's). These vehicles are designed for testing power drawbar effect and resistance to towing characteristics of tracked and wheeled vehicles.

Figure 1:
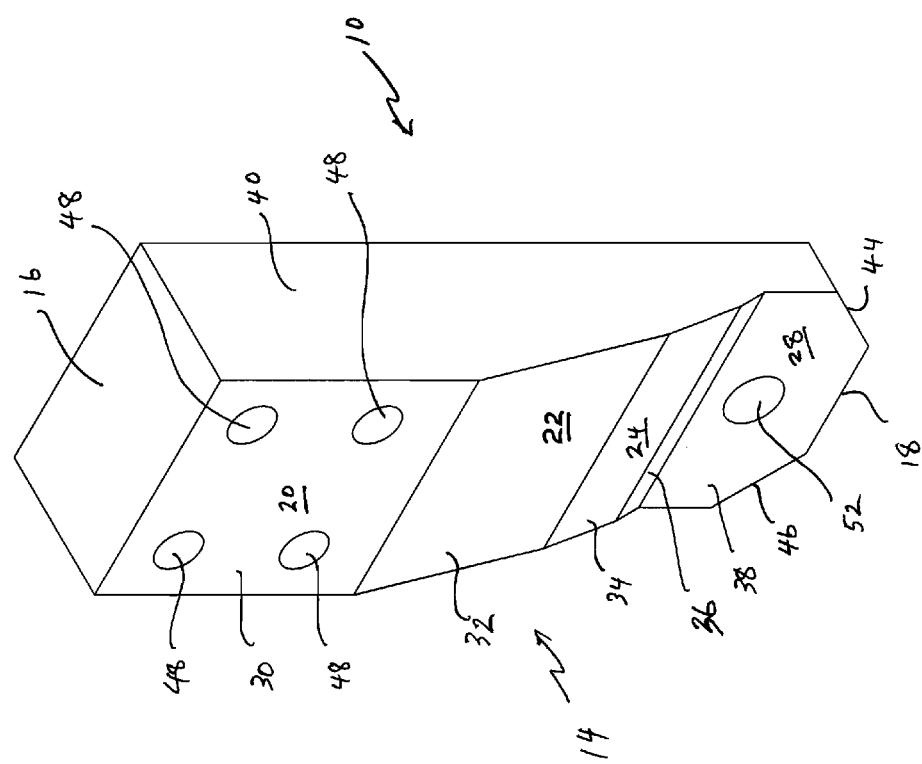
FIG. 1 is a perspective view of a deflection plate in accordance with one preferred embodiment of the present invention.
Figure 3:
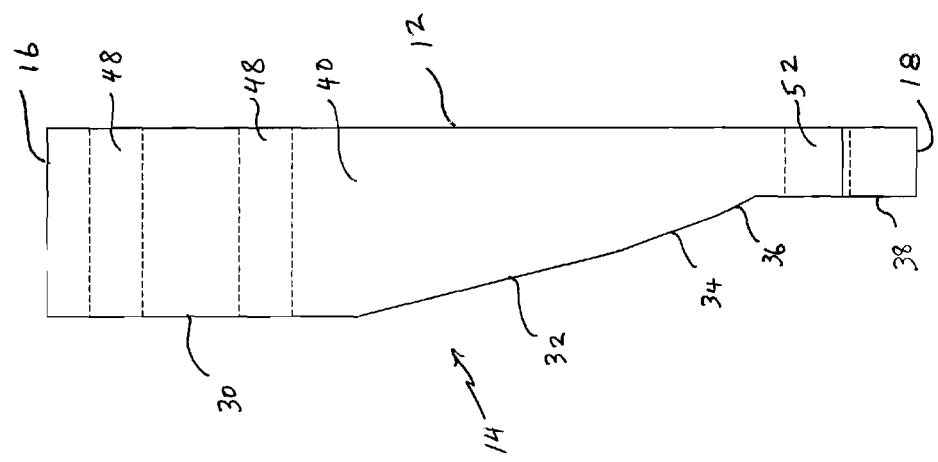
FIG. 3 is a side view of the deflection plate of FIG. 1.

Referring to FIG. 1, there is shown one preferred embodiment of a high strength deflection plate 10 according to the present invention. The deflection plate 10, as shown generally in FIGS. 1, 2 and 3, is a 100,000 pound (referred to here as 100 kip) embodiment which has a generally rectangular configuration having a flat back surface 12 and a front surface 14 as shown in FIG. 3 which is not flat along its entire length from top to bottom. The top surface 16 and the bottom surface 18 of the deflection place 10 are also preferably flat. Generally the front surface 14 is tapered such that the front surface 14 adjacent the top surface 16 is thicker than the front surface 14 adjacent the bottom surface 18.

Figure 16:
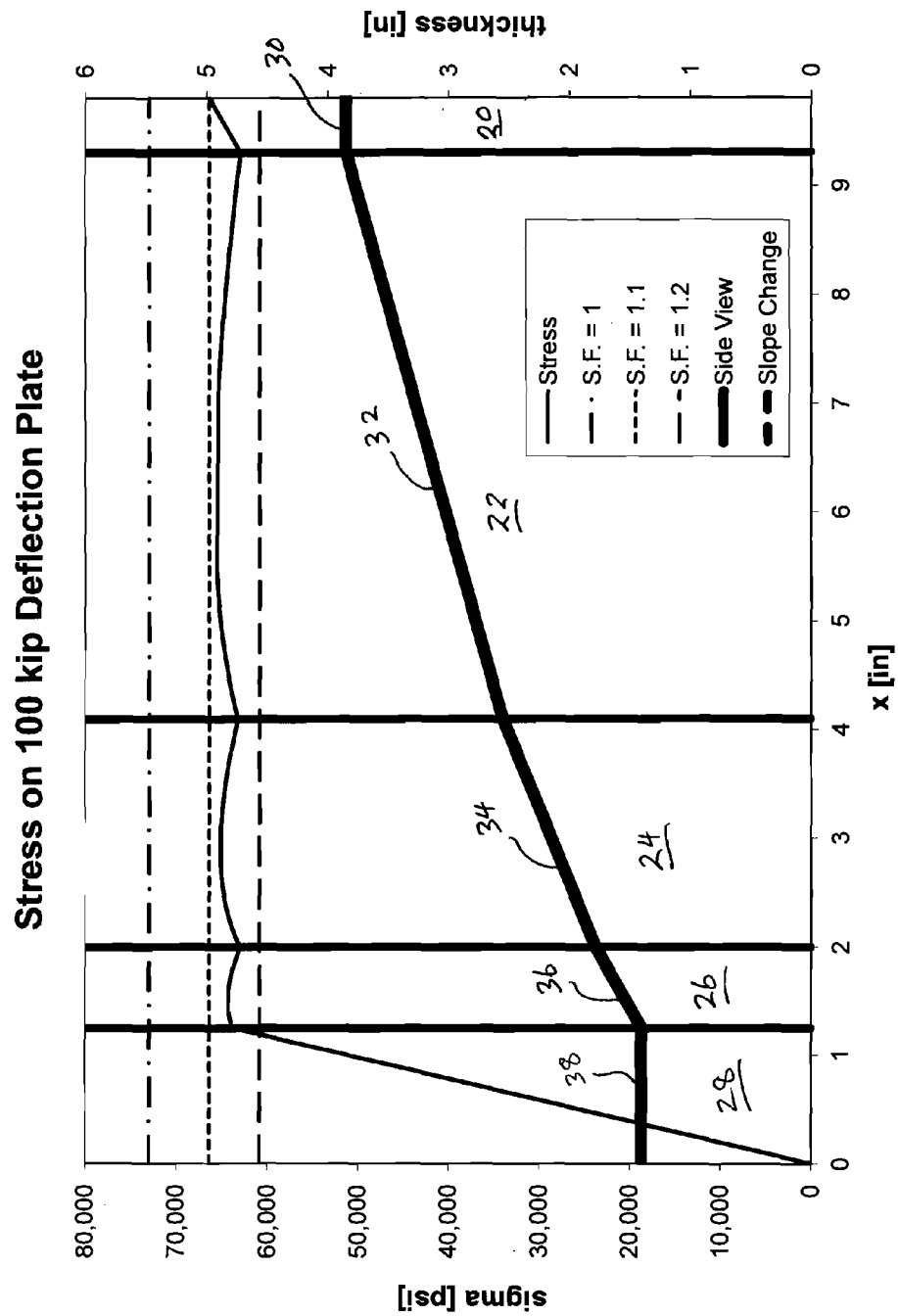
FIG. 16 is a graph illustrating the stress and the safety factor on a 100 kip (where one kip is equal to 1,000 pounds) deflection plate along its vertical length in accordance with one preferred embodiment of the present invention.

The deflection plate 10 as shown in FIG. 3 and also in FIG. 16 is formed of preferably five segments of varying thickness and shape. As shown in FIG. 16, these are segments 20, 22, 24, 26 and 28. Segments 20 and 28 have flat front surfaces 30 and 38, respectively. Segments 22, 24 and 26 have tapered front surfaces 32, 34 and 36, respectively. Generally each of these tapered segments has decreasing cross-sectional thicknesses toward the bottom segment 28 which has the smallest cross-sectional thickness. Hence segment 20 has the largest thickness and segment 28 has the smallest thickness. The deflection plate 10 has a right side wall 40 and a left side wall 42 which are preferably flat. Segment 28 has bottom inwardly tapered flat wall portions 44 and 46 as shown in FIGS. 1, 2 and 3.

Segment 20 has four similar bores 48 as shown in FIGS. 1, 2 and 3 to receive suitably dimensioned and configured similar bolts 50 as shown, for example, in FIGS. 7 through 10. Segment 28 has a single bore 52 to receive a single suitably dimensioned and configured bolt 54 that is preferably larger in cross-section than bolts 50.

Referring now to FIGS. 4, 5 and 6, there is shown an alternative preferred embodiment of a deflection plate 100 also according to the present invention. The deflection plate 100 is a 75 kip (75,000 pound) embodiment which has generally like configuration as does deflection plate 10. However the 75 kip embodiment 100 has different tapered segments and different sizes and dimensions than those of the 100 kip embodiment 10.

Figure 17:
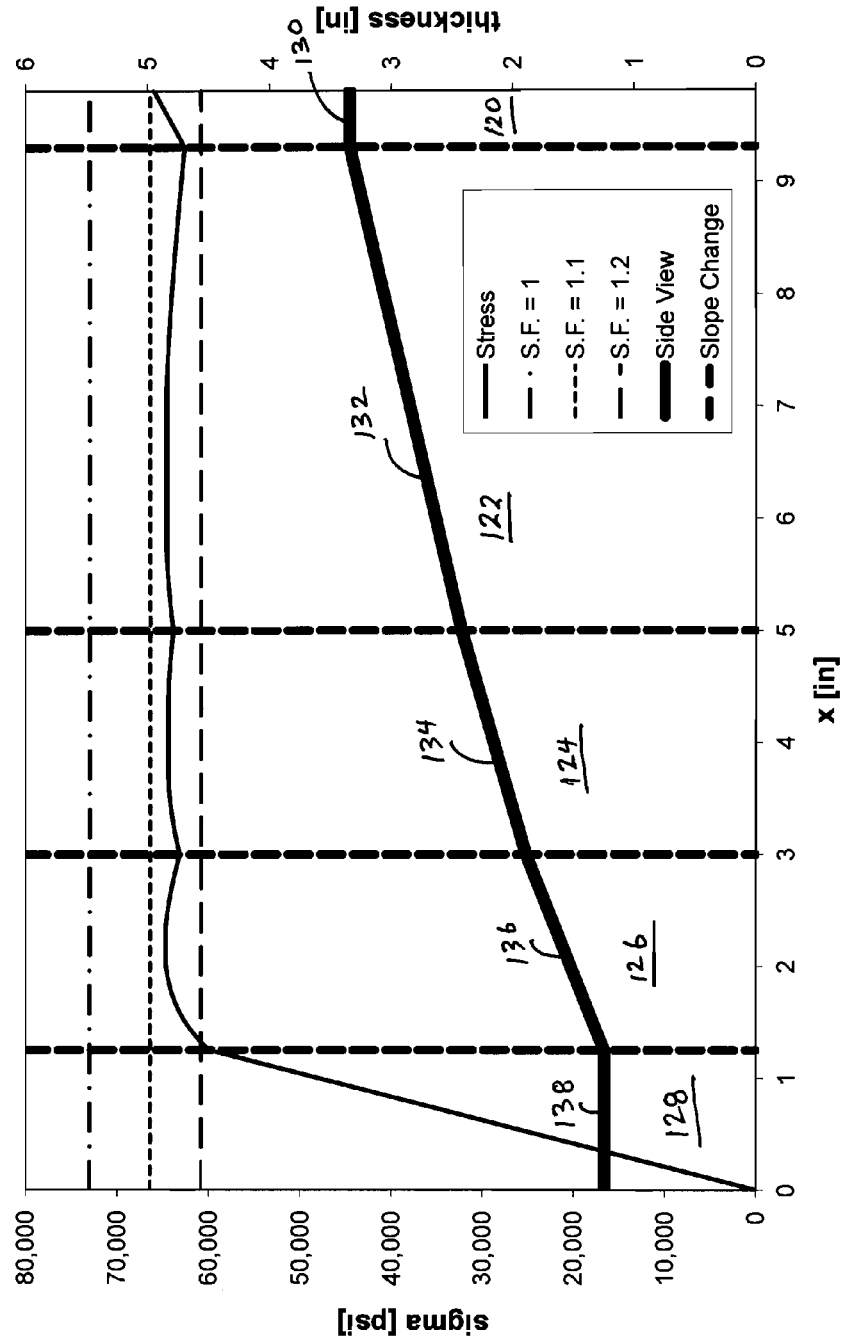
FIG. 17 is a graph illustrating the stress and the safety factor on a 75 kip deflection plate along its vertical length in accordance with an alternative preferred embodiment of the present invention.

A comparison of these tapered segments and dimensions for the deletion plates 10 and 100 are shown in FIGS. 16 and 17. For example, in deflection plate 10 segment 20 has a thickness of about 3.85 inches. Segment 120 of deflection plate 100 has a thickness of about 3.34 inches. In general, deflection plate 100 has smaller dimensions than deflection plate 10. But both have the same height of about 17.5 inches and a width of about 6.00 inches so that they can each be bolted in place to the same surrounding structural components of the undercarriage of the Mobile Dynamometer Vehicle as shown in FIGS. 7 through 10. More detailed dimensions of a preferred embodiment for deflection plate 10 are shown in FIGS. 2A, 3A and 3B and for deflection plate 100 are shown in FIGS. 2A, 3A and 3B.

The deflection plate 100 also has a generally rectangular configuration having a flat back surface 112 and a front surface 114 as shown in FIG. 4 which is not flat along its entire length from top to bottom. The top surface 116 and the bottom surface 118 of the deflection place 10 are preferably flat. As was the case with deflection plate 10, deflection plate 100 similarly has a front surface 114 that is tapered such that the front surface 114 adjacent the top surface 116 is thicker than the front surface 114 adjacent the bottom surface 118.

The deflection plate 100 as shown in FIG. 6 and also in FIG. 17 is formed of preferably five segments of varying thickness and shape. As shown in FIG. 17, these are segments 120, 122, 124, 126 and 128. Segments 120 and 128 have flat front surfaces 130 and 138, respectively. Segments 122, 124 and 126 have tapered front surfaces 132, 134 and 136, respectively. Generally each of these tapered segments has decreasing cross-sections thicknesses toward the bottom segment 128 which has the smallest cross-sectional thickness. Hence segment 120 has the largest thickness and segment 128 has the smallest thickness. The deflection plate 100 has a right side wall 140 and a left side wall 142 which are preferably flat. Segment 128 has bottom inwardly tapered flat wall portions 144 and 146 as shown in FIGS. 4, 5 and 6.

Segment 120 has four similar bores 148 as shown in FIGS. 4, 5 and 6 to receive suitably dimensioned and configured similar bolts (not shown) which are comparable to bolts 50 shown, for example, in FIGS. 7 through 10. Segment 128 has a single bore 152 to receive a single suitably dimensioned and configured bolt (not shown) that is preferably larger in cross-section than the bolts for bores 148 and is comparable to bolt 54 also shown in FIGS. 7 through 10.

Figure 7:
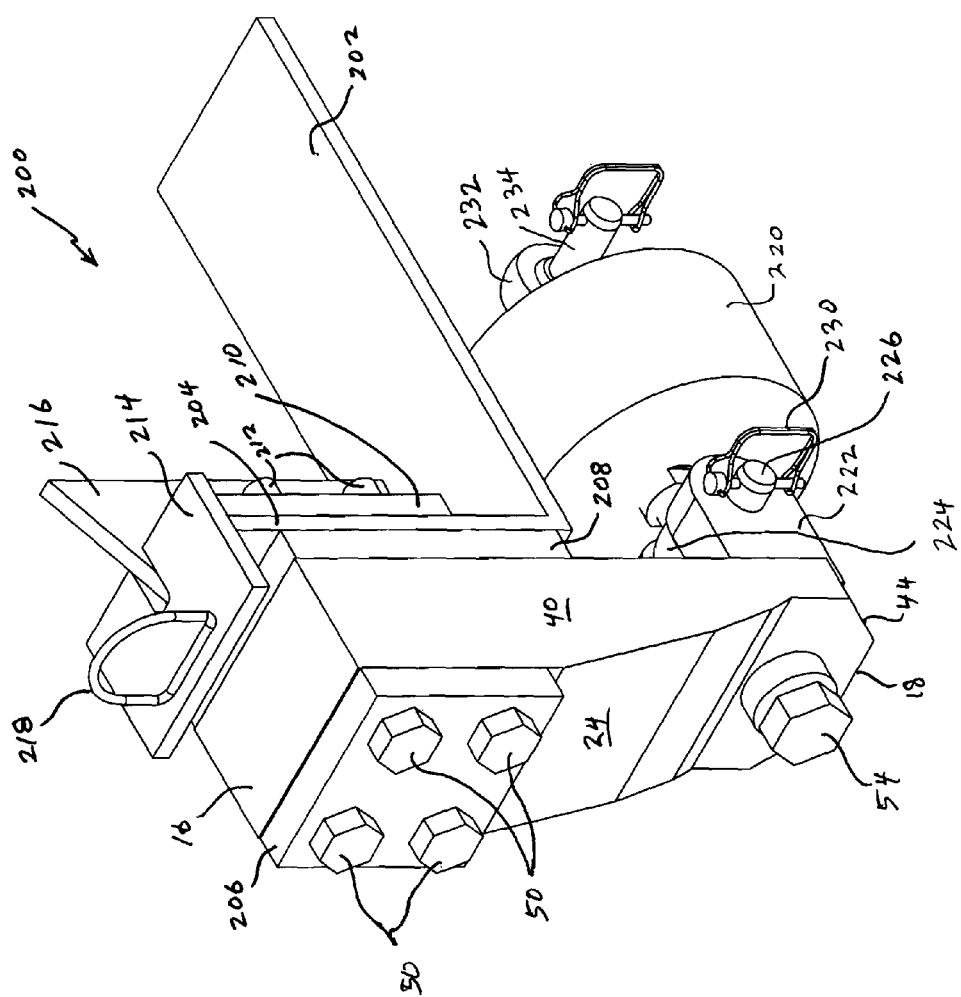
FIG. 7 is a perspective assembly view including the deflection plate of FIG. 1 coupled to a load cell in accordance with one preferred embodiment of the present invention.
Figure 8:
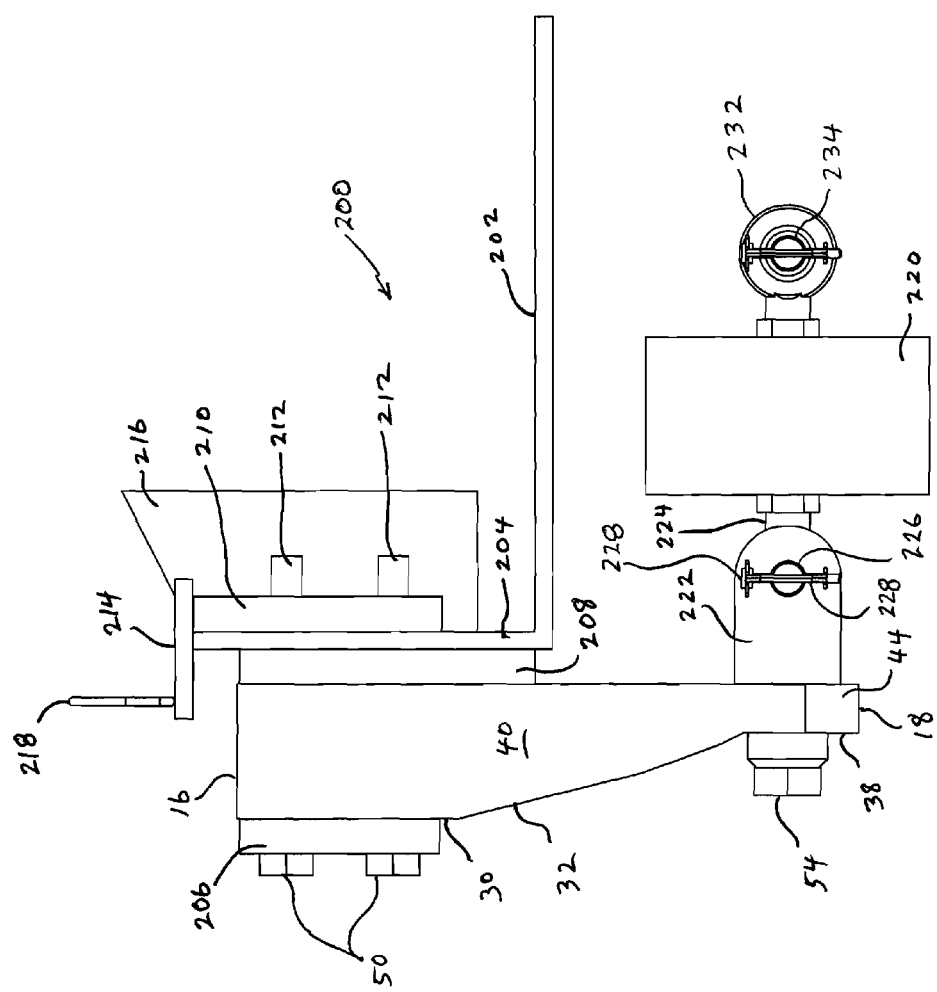
FIG. 8 is an assembly side view of the deflection plate of FIG. 7.
Figure 9:
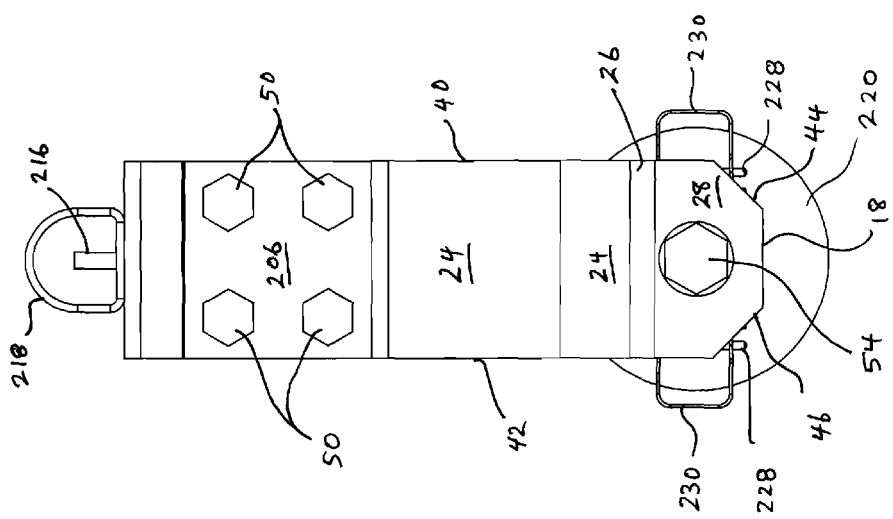
FIG. 9 is an assembly front view of the deflection plate of FIG. 7.

Referring now to the embodiment shown in FIGS. 7 through 9, the deflection plate 10 is mounted to a lower support plate 200 that includes an L shaped member having a horizontal portion 202 and a vertical portion 204. As shown in FIGS. 7 and 8, the deflection plate 10 is positioned between a front bushing or restraining plate 206 and a rear bushing or restraining plate 208 which is sandwiched between back surface 12 and the front surface of the vertical portion 204 of the L shaped member of lower support plate 200. An upper support plate 210 is positioned against the back surface of the vertical portion 204. These components are fastened together with the bolts 50 that extend through comparably sized and aligned holes (not shown) in each of these components and also bores 48 of deflection plate 10. The ends 212 of the bolts 50 extend past the back surface of the upper support plate 210. The holes of at least upper support plate 210 can have grooves to receive the grooves on the bolts 50 so as to fasten these components together with the deflection plate 10.

The upper support plate 210 can preferably be attached to a horizontal plate 214 and a transverse plate 216 as shown in FIGS. 7 and 8. These plates collectively form a nut fixture to received and secure the bolts 50. A semi-ring 218 can be affixed to the upper surface of horizontal plate 214.

As shown in FIG. 7, a load cell 220 is mounted to the deflection plate 10 through a front clevis 222 into which is positioned a front eye bolt 224 extending from the front of the load cell 220. A front mounting bolt 226 couples the front eye bolt 224 to the front clevis 222. The front mounting bolt 226 is kept in place by two cross pins 228 and corresponding catch rings 230 on opposite ends of the front mounting bolt 226 as shown in FIG. 9. The bolt 54 is secured to the clevis 222 which has a bore (not shown) to receive the bolt 54. A bushing 55 is positioned between bolt 54 and the front surface 38 of deflection plate 10.

Figure 10:
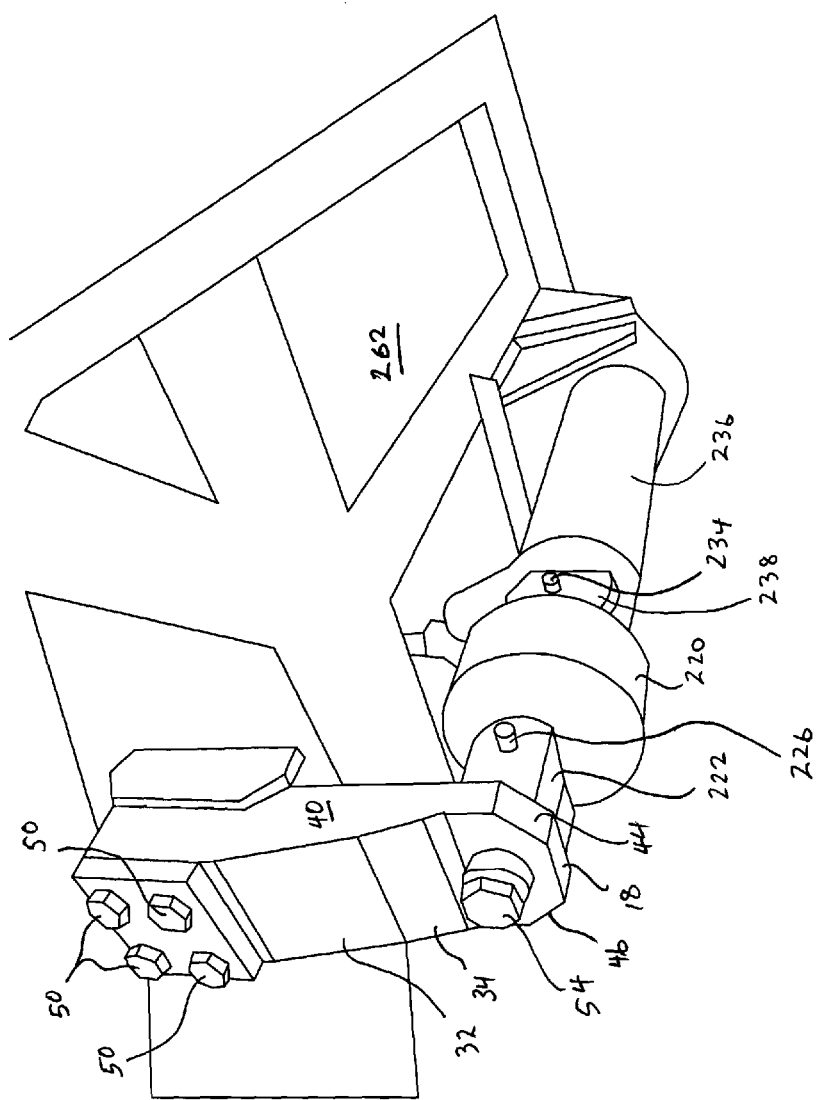
FIG. 10 is a perspective overall underneath view including the deflection plate of FIG. 7 coupled to a load cell.
Figure 11:
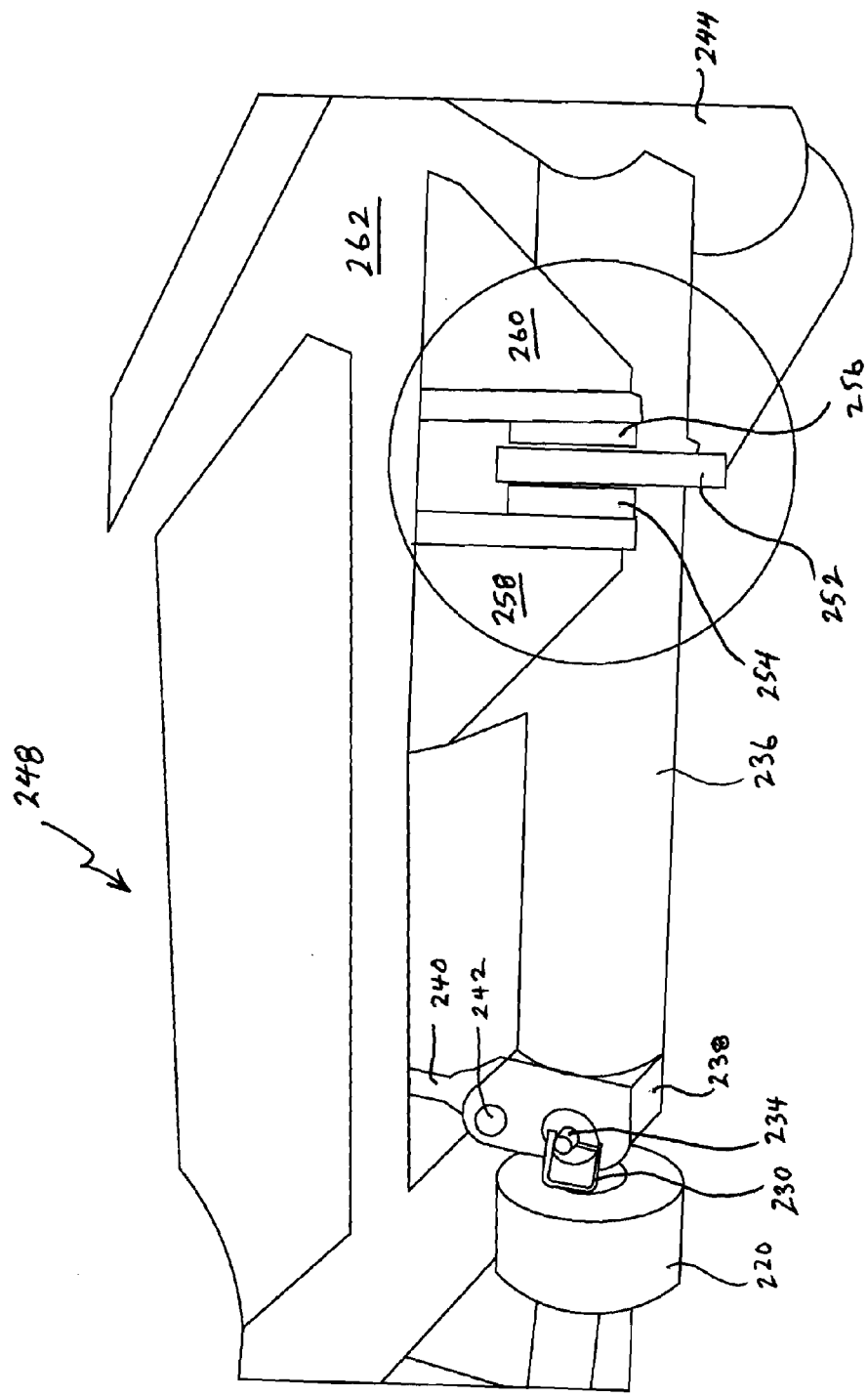
FIG. 11 is a perspective overall underneath view including the deflection plate of FIG. 7 coupled to a load cell which is coupled to a stopper.
Figure 12:
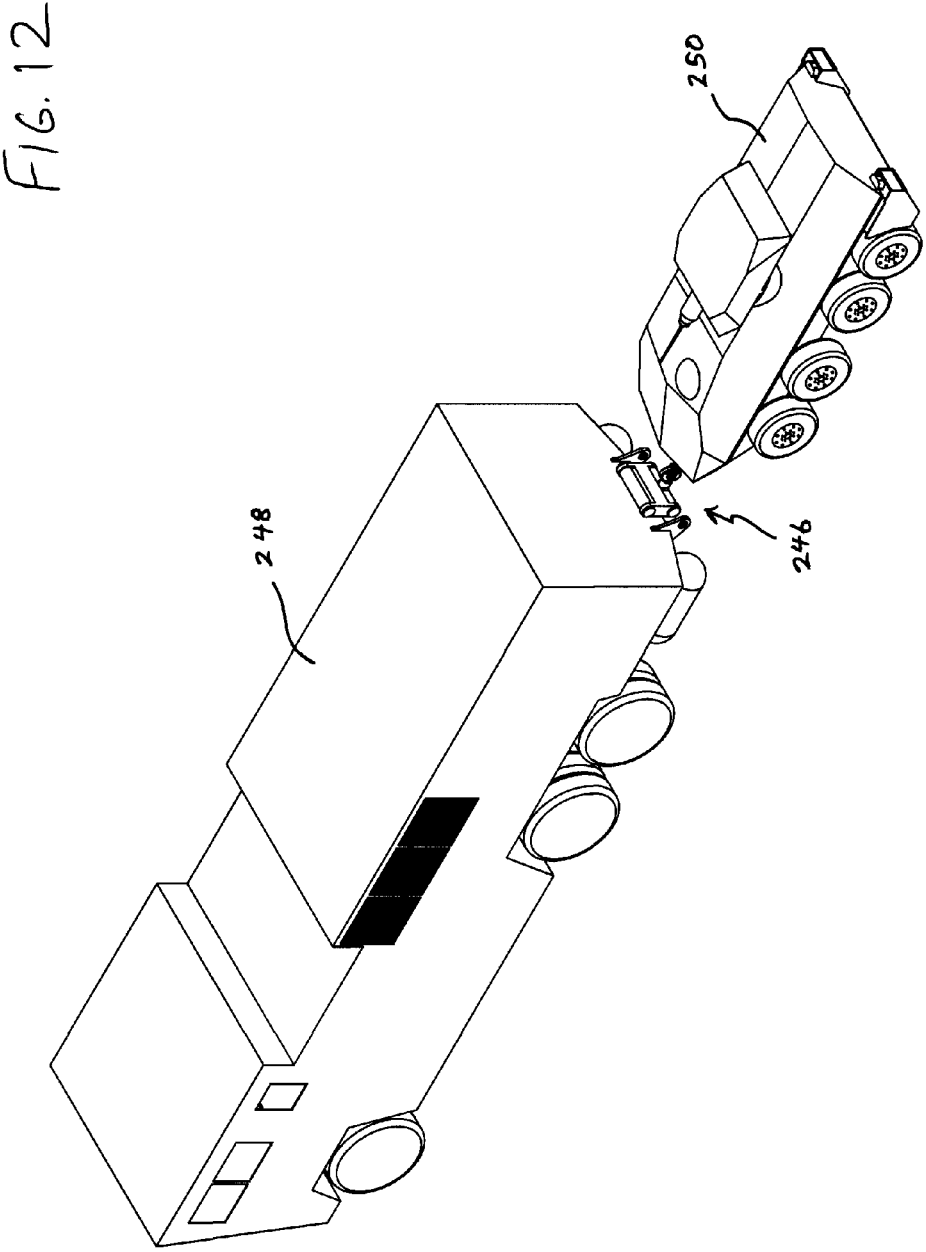
FIG. 12 is a perspective top view of a U.S. Army M16 Heavy Dynamometer coupled to a Stryker vehicle via a deflection plate in accordance with one preferred embodiment of the present invention.
Figure 13:
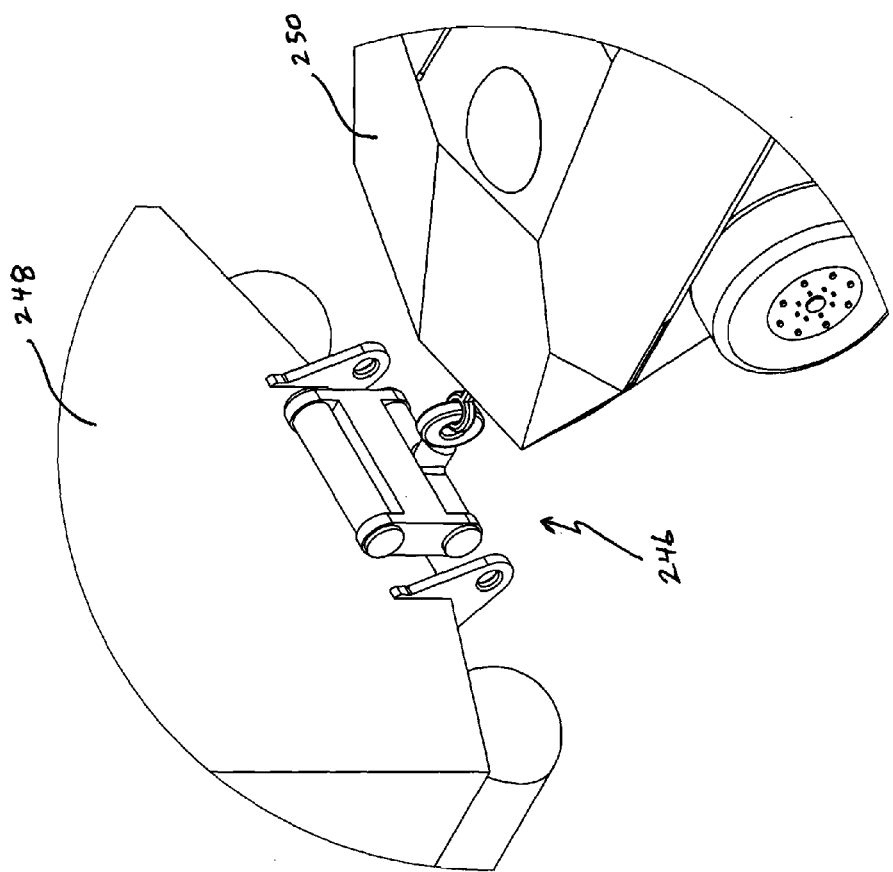
FIG. 13 is an enlarged close up perspective top view of the coupling of the U.S. Army M16 Heavy Dynamometer to the Stryker vehicle of FIG. 12.
Figure 14:
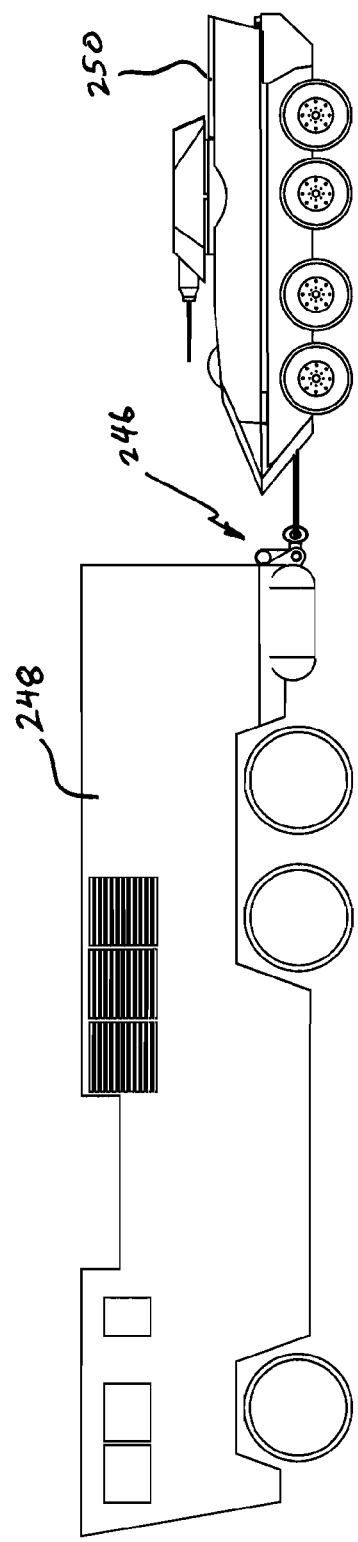
FIG. 14 is a side view of the coupling of the U.S. Army M16 Heavy Dynamometer to the Stryker vehicle of FIG. 12.
Figure 15:
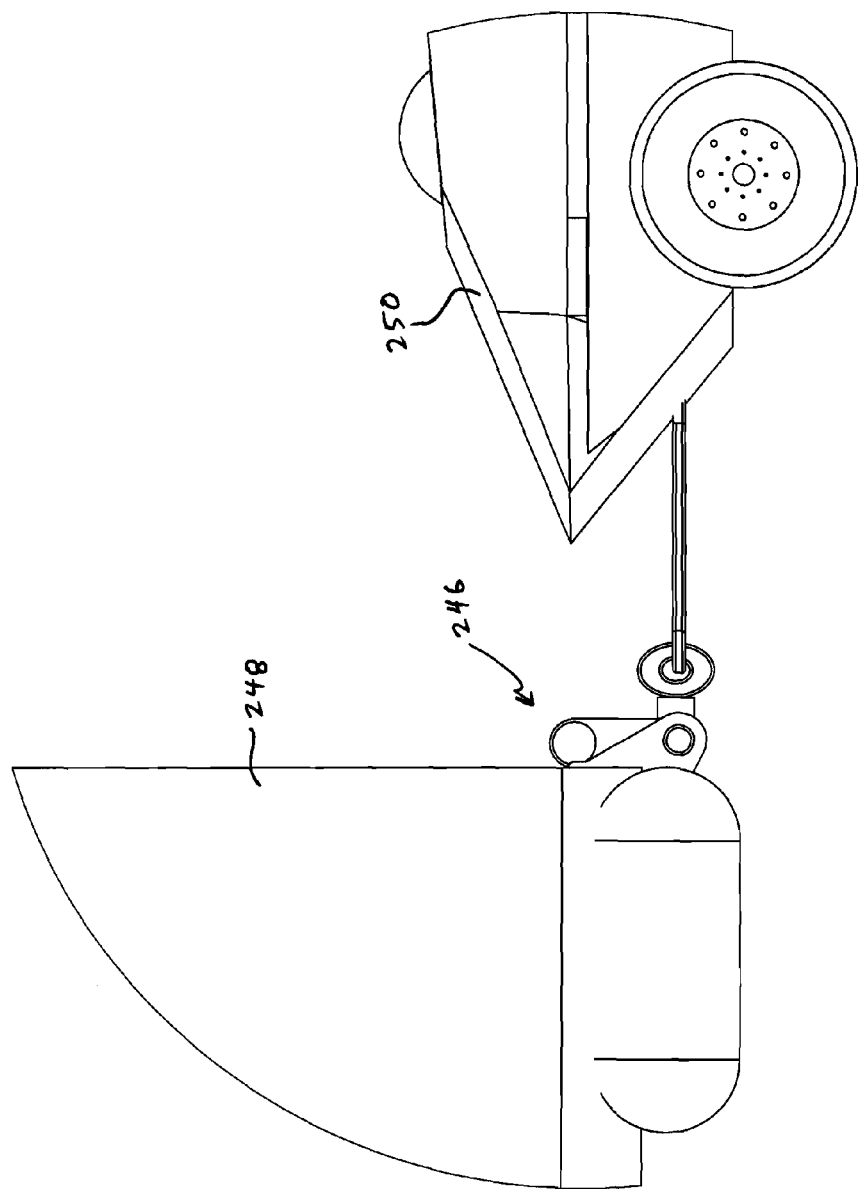
FIG. 15 is an enlarged close up side view of the coupling of the U.S. Army M16 Heavy Dynamometer to the Stryker vehicle of FIG. 12.

The load cell 220 also has a rear eye bolt or ball joint rod end 232 extending from the front of the load cell 220 as shown in FIG. 8. Threaded adapters 233 positioned on each side of the load cell 220 are used in coupling the load cell 220 to the clevis 222 and the rear eye bolt 232. The rear eye bolt 232 is configured to receive a rear mounting bolt 234. In this manner, the load cell 220 can be coupled to a sway bar or load beam 236 as shown in FIGS. 10 and 11. The sway bar or load beam 236 has a clevis 238 which allows for coupling the rear eye bolt 232 by the rear mounting bolt 234. The cross pins 228 and corresponding catch rings 230 help to maintain the rear mounting bolt in place. A rocker arm 240 is coupled to the clevis 238 with a retaining bolt 242. The load beam 236 is coupled at it rearward portion to a towbar cross-member 244 which is part of the tow mechanism 246 shown in FIGS. 12 through 15. These latter drawings demonstrate a US Army mobile Dynamometer 248 hooked up to and towing a Stryker vehicle 250.

Referring now to FIG. 11, the sway bar or load beam 236 includes a stopper plate 252 which is positioned between a front stop member 254 and a rear stop member 256. Both the front stop member 254 and rear stop member 256 are coupled or mounted on support members 258 and 260, respectively as shown in FIG. 11, and which are mounted to the undercarriage 262 of mobile Dynamometer 248. As shown in FIG. 11, the stopper plate 252 during the towing and testing operation can be spaced from the front stop member 254 and the rear stop member 256.

The high strength deflection plates 10 and 100 are designed such that they will not yield under the design force but can deflect, preferably 0.25 inches at the 100,000 pound capacity of the load cell 220. At this point the sway bar or load beam 236 can hit a mechanical stopper 256 directly attached to the frame or undercarriage 262 of the mobile dynamometer 248. In this manner, the load cell 220 is allowed to measure the towing force up to but not exceeding about 100,000 pounds. As noted above, the deflection plates 10 and 100 are tapered such that the stress remains approximately constant throughout most of the entire plate. This allows the maximum deflection possible since there is no unnecessary material. In one preferred embodiment, the material for high strength and low modulus of elasticity can be Aluminum 7075-T651.

As shown in FIGS. 16 and 17, the deflection plates are designed to generally have a safety factor (S.F.) between 1.1 and 1.2 in at least the upper four segments 20, 22, 24 and 26 of deflection plate 10 and the upper four segments 120, 122, 124 and 126 of deflection plate 100. The safety factor is the yield strength (shown as sigma in psi in FIGS. 16 and 17) divided by the design stress. In FIGS. 16 and 17, the topmost horizontal broken line shows a S.F. of 1.0. The next lower horizontal broken line represents a S.F. of 1.1 while the next lower horizontal broken line represents a S.F. of 1.2 as also indicated in the legend boxes in FIGS. 16 and 17. The larger the safety factor, the less likely the part will fail. The yield strength of aluminum 7075 is about 73,000 psi. For example a safety factor of 2 would be a design stress of 73,000/2=36,500 psi. In this case, the S.F.=1.1 corresponds to a design stress of 66,364 psi and the S.F.=1.2 corresponds to a design stress of 60,833 psi.

The design criteria which determine the thickness of the material and points of slope change of preferred embodiments of deflection plates 10 and 100 was for the stress generally throughout the part to be between a S.F. of 1.2 and 1.1 and all times. If the safety factor dropped below 1.1 the part would be in danger of failing and if the safety factor was greater than 1.2, there is more material than needed.

In FIGS. 16 and 17, the thicknesses of deflection plates 10 and 100 are shown in relative relation to the safety factors determined along the various segments of the deflection plates 10 and 100. However, the full vertical heights or lengths of the deflection plates are not shown. Basically, as can be seen from FIGS. 2A and 3A, the x axis in FIGS. 16 and 17 starts at the single main bolt hole 52 and 152 at the left. For deflection plate 10, from x=0 to x=1.25", the thickness is 1.4". At x=1.25", the slope changes and at x=2", the thickness is 1.78". At x=4.1.", the thickness is 2.55". At x=9.31", the thickness is 3.85". Finally at 9.81" the thickness remains 3.85" and the graphs in FIGS. 16 and 17 end. That is the point where the front bushing or restraining plate 206 begins as shown in FIG. 7.

Although a load cell can be employed as described above in a Mobile Dynamometer, load cells are not always available and they are not cost effective to directly measure the vehicle weights on a bridge by using load cells. However, strain gages can be employed to identify the magnitudes and locations of loads on slender beams using strain gage based methods with application to portable Army bridges.

According to this aspect of the present invention, unique strain gage based methods were developed to identify magnitudes and locations of loads on a non-continuous, non-homogenous, slender beam with variable cross sections, welded and bolted joints, and pinned, firm rest, soft rest, pinned-fixed, and fixed boundary conditions. Four uniaxial strain gages mounted to the bottom surface of the beam created a force transducer capable of identifying the magnitude and location of a load inside the weight area. By combining individually scaled strain gage outputs, the bending moment diagram was constructed. For the case of multiple loads separated by two or more strain gage locations, uniaxial strain gages forming multiple force transducers can still identify the magnitudes and locations of all the loads. A calibration method was developed to account for the discrepancies between the theoretical and actual scaling factors arising from stress concentrations and unpredictable stress patterns in the beams due to the presence of the joints. The strain gage based force transducer methodology was experimentally validated on prismatic beams with firm rest, soft rest, firm rest-fixed, and fixed boundary conditions; an aluminum beam with a bolted joint; and a half aluminum and half steel beam with two different cross sections and a bolted joint. It was also experimentally validated on a continuous aluminum beam with a linearly varying cross section and rest boundary conditions, a tapered aluminum beam with a series of welded joints, and a full scale portable army bridge at the US Army Aberdeen Test Center. The force transducer methodology is independent of the boundary conditions of the beam and the error from strain gage drift due to uniform thermal expansion on a prismatic beam can cancel out.

When there are multiple loads separated by only one strain gage location, the problem is posed for the force transducer methodology. Another method has been developed using two shear gages mounted on the neutral axis of the beam, one on each side of a load, to identify the magnitude of the load in this case. A combination of two uniaxial strain gages and two shear gages, with one uniaxial strain gage and one shear gage at the same location on each side of a load, can be used to identify the location of the load. The strain gage based methods were experimentally validated on a prismatic beam with rest boundary conditions.

Figure 18:
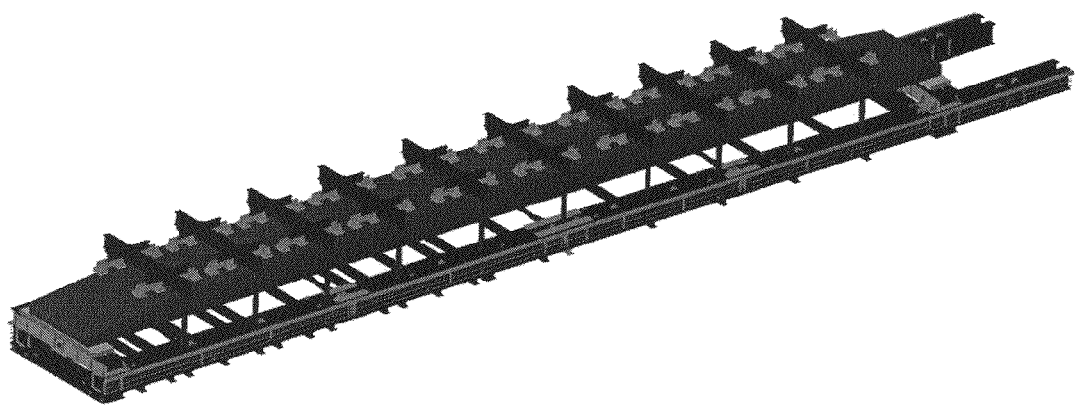
FIG. 18 is a picture of a portable army bridge on the BCS at the US Army Aberdeen Test Center.
Figure 19:
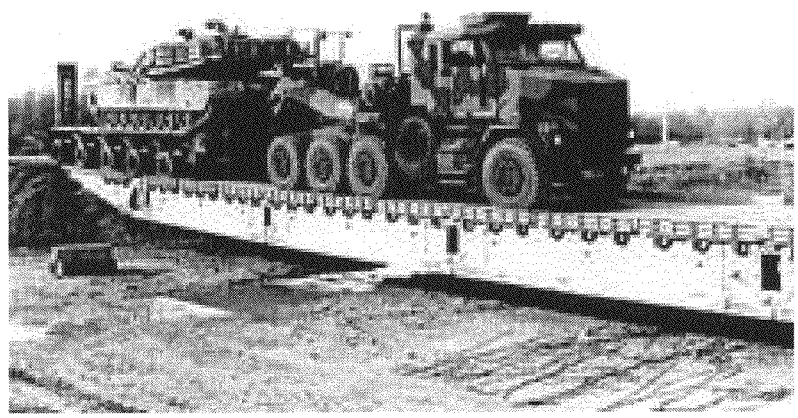
FIG. 19 is a picture of an army vehicle crossing a portable army bridge.

In the discussion which follows, the list of variables includes:

[$\epsilon$]: u×1 matrix that represents measured strains at candidate locations
u: number of rows in matrix [$\epsilon$]
[P]: v×1 matrix that represents independent input forces
v: number of rows in matrix [P]
[A] u×v coefficient matrix that depends on the geometric and material properties
F: force on a beam
x: horizontal position measured from left boundary
a and b: points where strain is measured on a cantilever beam
$d_a$: location of strain gage a measured from left boundary
$d_{ab}$: distance between strain gages a and b
$d_F$: location of force F measured from left boundary
$M_a$ and $M_b$: bending moments at points a and b
$\epsilon_a$ and $\epsilon_b$: measured strains at points a and b
V: shear force
M: bending moment
$\sigma$: stress
y: distance from the neutral axis of the beam to the point where stress is calculated
I: area moment of inertia of a cross section
E: Young's modulus
$\epsilon$: strain
A and B: left and right end abutments, respectively, of a beam supported at two ends
$R_A$ and $R_B$: reaction forces at left and right boundaries, respectively
n, h, i, j, and: strain gage number
$\epsilon_n$: measured strain at strain gage n
$F_n$: force located to the right of strain gage n
$p_n$: position of force $F_n$ measured from left boundary
$d_n$: position of strain gage n measured from left boundary
$f_n$: position of force $F_n$ measured from strain gage n
$d_{nj}$: distance between strain gages n and j
$\alpha_{nj}$: relative position of force $F_n$ between strain gages n and j
$\alpha_n$: notation for relative position of force $F_n$ between strain gages n and j when the two strain gages are adjacent
$M_n$: bending moment at strain gage n
$V_n$: shear force at strain gage n
$E_n$: Young's modulus at strain gage n
$I_n$: area moment of inertia of a cross section at strain gage n
$y_n$: distance from the neutral axis of the beam to the point where stress is calculated at strain gage n
$\gamma_n$: scaling factor at strain gage n
$\gamma$: global scaling factor
$\beta_n$: calibration factor at strain gage n
$\beta$: global calibration factor
$FT_{hijk}$: force transducer formed from strain gages h, i, j, and k
$FT_i$: notation for force transducer $FT_{hijk}$ when the four strain gages are adjacent
d: distance between two adjacent strain gages when all are equally spaced
w: uniformly distributed force
$d_w$: length of uniformly distributed force w
$F_w$: resultant force of uniformly distributed force w
$d_L$ and $d_R$: distances between the force F and the left and right boundaries, respectively
$d_A$ and $d_B$: distances between the left and right reaction forces $R_A$ and $R_B$, and the edges of the soft abutments, respectively
$D_A$ and $D_B$: lengths of the beam sitting on the left and right soft abutments, respectively
$M_A$ and $M_B$: reaction moments at left and right boundaries, respectively
L: span of beam N: number of forces on a beam
[F]: q×1 matrix that represents all the known forces
q: number of rows in matrix [F]
[Y]: m×1 matrix that represents the scaling factors
m: number of rows in matrix [Y]
[ε] q×m matrix that represents the measured strains from strain gages forming the force transducers
$\lambda_F$: maximum force error
$\lambda_0$: maximum zero error
$\lambda_T$: total error
C: user defined positive parameter to calculate total error $\lambda_T$
$\Delta p_n$: difference between a known force position and the calculated one
τ: shear stress
$\sigma_1$ and $\sigma_2$: principal stresses
$\epsilon_1$ and $\epsilon_2$: principal strains
v: Poisson's ratio
Q: first moment of area
t: thickness of cross section
D: shear gage output
k: constant that changes the bending moment and strain relationship
T: bolt torque
P: tensile load in a bolt
K: bolt torque constant
Φ: major bolt diameter 1.1 Motivation Load identification on large scale bridges has many applications in both the public and military sectors. The Bridge Crossing Simulator (BCS), which is operated by the US Army Aberdeen Test Center at Aberdeen Proving Ground in Maryland, USA (FIG. 18), tests portable army bridges for fatigue failure by simulating thousands of vehicle crossings. The current methodology involves setting up a bridge on dirt abutments and measuring strains from the bridge that are collected from vehicles with various crossing speeds (FIG. 19). Next, the bridge is set up on the BCS with wood abutments and straps, and hydraulic cylinders are used to apply loads to the bridge through multiple load application devices, referred to as "Whiffles". The strain time history is used in a control system feedback loop for each corresponding cylinder in order to simulate various crossing speeds of vehicles on the bridge. This method can be subject to uncertainties since the actual vehicle loads are not known from the field data. A new load identification methodology can be used to identify cylinder loads that need to be applied, from measured strains from live crossings of vehicles.

1.2 Previous Work

A load identification methodology can also be used to determine the life span of a commercial bridge given the strain gage data of vehicles that cross it [1] (Numbers within brackets refer to the References listed beginning at page 96). The frequency and the weights of vehicles that cross a bridge are often an estimated quantity by structural designers. Load cells are not always available and it is not cost effective to directly measure the vehicle weights using load cells [2]. By developing a measurement technique using strain gages, one can identify specific axle loads of a vehicle without using a scale [3]. Previous methods transform a bridge into a dynamic scale when multiple vehicles were crossing it [1-9]. This is primarily an inverse problem since the loads are unknown, but the response is known [10].

By measuring strain at one location, the system "AXWAY" in Ref. [4] develops an influence line by summing the individual strain curves from known vehicle axle weights and performing a best fit analysis. The influence line is dependent on vehicle speed, axle spacing, axle weights, and gross vehicle weight [4]. A limitation of this method is that a bridge can only have one vehicle on it at a time. Deflection measurements can also be used, where the dynamic beam response is calculated [11]. According to the previous studies, the load identification method using deflection data is more prone to error than that using bending moment data [5]. Another approach involves modeling a vehicle/bridge system and using acceleration measurements to calculate the dynamic response of the system [6]. However, when comparing the strain model to the acceleration model, lower error was obtained from the strain model [12]. A limitation of deflection based methods and acceleration based methods is that the boundary conditions must be accurately known.

A Reaction Force Detection (RFD) system to detect lameness in cows was developed by measuring four reaction forces on a plate using load cells [13]. Calibration is performed along with statistical methods to determine when forces are reduced in a limb of a lame cow. When a single limb is on a plate, the RFD calculates the magnitude and position of the force. A limitation of the method is that when multiple limbs are on the plate, the RFD calculates the magnitude and position of the resultant force, and cannot decipher individual forces.

Figure 20:
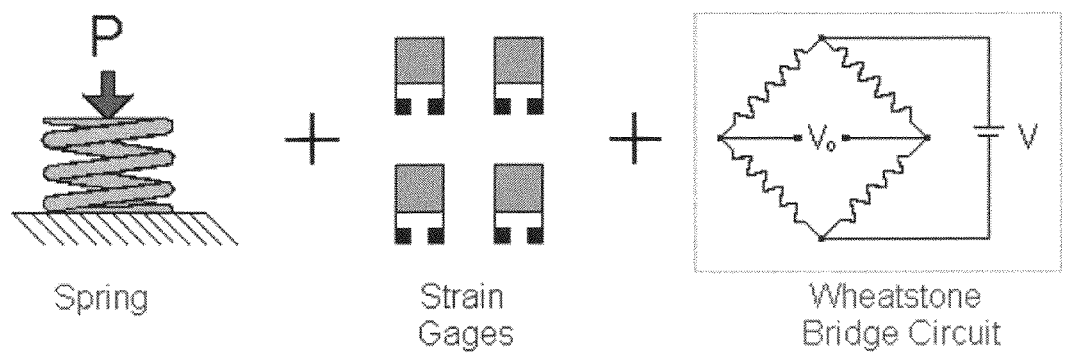
FIG. 20 illustrates the components of a strain gage based transducer, the illustration courtesy of Vishay Measurements.
Figure 21:
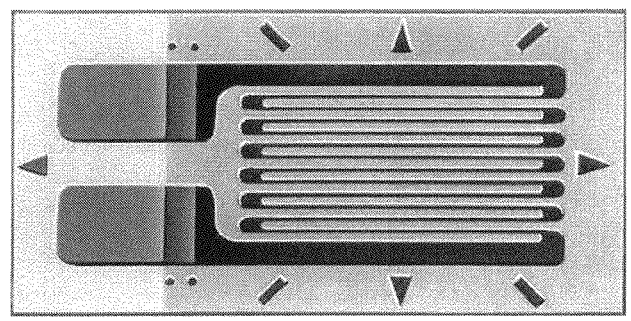
FIG. 21 shows a uniaxial strain gage consisting of one continuous wire, the illustration courtesy of Vishay Measurements.

A transducer converts one form of energy to another [14]. The interest here is to convert mechanical energy to an electrical signal that represents the load applied. Components of a force transducer include an applied load, the spring response, strain gages, and a Wheatstone bridge circuit, as shown in FIG. 20 (illustration courtesy of Vishay Measurements) [15, 17]. Strain gages are useful when stress measurements are desired, since stress cannot be directly measured, but strain can be measured [16]. Strain is defined as the change in length over original length, and does not Shave units [16]. A strain gage consists of a continuous wire that is bonded to a material for measurement through a rigorous application procedure, with a uniaxial strain gage that measures strain in one direction shown in FIG. 21 (illustration courtesy of Vishay Measurements) [17]. When the material deforms, each leg of the wire also deforms. The wire changes its cross section and, more importantly, electrical resistance. When the strain gage is connected to a Wheatstone bridge, the voltage amplifies the resistance change, which can be converted to a strain measurement. Typical strain measurements are very small and reported in microstrain (με). One με is defined as one unit of deformation per 1,000,000 units of original length [14]. Even though strain is unitless, the precision of the measurement is high, since for a strain gage with an active strain gage length of 6.35 millimeters, one με is a deformation of 6.35 nanometers. Strain gages are a useful measurement technique for most metal structures such as aluminum and steel. Because of the porous nature of concrete, it is difficult to correctly bond a strain gage. However, it is possible to measure strains on large scale concrete bridges by mounting aluminum members to concrete and applying strain gages to the aluminum members [10].

A general challenge of an inverse problem, is that it is often ill-posed [8]. Given measurement quantities can often lead to multiple solutions for input loads [18]. Hence a final design of a force transducer should be robust enough to pinpoint a unique solution. It has been shown multiple times that a structure itself can be turned into a force transducer using strain measurements [4,5,10]. A general formulation is given by Masroor and Zachary [19]:

$$[\epsilon]=[A][P] \quad (1.1)$$

where [ε] is a u×1 matrix that represents measured strains at candidate locations, [P] is a v×1 matrix that represents independent input forces, and [A] is a u×v coefficient matrix that depends on the geometric and material properties. The coefficient matrix is determined experimentally through known inputs P and outputs ϵ. The inverse problem associated with Eq. (1.1) can be solved:

$$[P]=[A]^{-1}[\epsilon] \tag{1.2}$$

where $[A]^{-1}$ is the generalized inverse of [A]. The challenge of properly setting up this method is to first determine appropriate strain and load locations so that Eq. (1.2) is well-posed, since not all locations can provide independent information.

1.3 New Methods

Novel strain gage based methods are developed to identify the magnitudes and locations of loads on beams. Chapter 2 introduces a new force transducer methodology that will calculate the magnitude and location of a single load on a beam using four uniaxial strain gages mounted on the bottom surface of the beam. Section 2.1 discusses a cantilever beam force transducer developed by Vishay using two strain gages [20]. Section 2.2.1 introduces a new force transducer methodology to determine the magnitude of a load on a beam. The load can be a concentrated load, distributed load, or any combination of concentrated and distributed loads. The concept of firm and soft rest boundary conditions is discussed along with pinned, pinned-fixed and fixed boundary conditions, where the methodology is independent of boundary conditions. Section 2.2.2 utilizes the force transducer methodology to determine the location of a load. Section 2.2.3 discusses causes of error in strain gage based transducers and how the methodology developed here mitigates the errors. A novel calibration procedure is developed to systematically determine the scaling factors of strain gages on a beam. Section 2.3 applies the force transducer methodology to four different experiments. Section 2.3.1 shows the force transducer methodology applied to a prismatic steel beam with rest boundary conditions to accurately determine the magnitude and location of a load. Section 2.3.2 shows the results for various boundary conditions for a prismatic aluminum beam. Section 2.3.3 shows a distributed load on a prismatic aluminum beam with rest boundary conditions. Section 2.3.4 shows the force transducer methodology applied to a continuously tapered aluminum beam with rest boundary conditions.

Chapter 3 expands the force transducer methodology to multiple loads separated by two strain gage locations (Sec. 3.2.1), and introduces a new strain gage based method using shear gages mounted on the neutral axis of a beam and the uniaxial strain gages (Sec. 3.2.2). The corresponding experimental results for a prismatic aluminum box beam with rest boundary conditions are shown for the force transducer methodology (Sec. 3.3.1) and strain gage methodology using shear gages and uniaxial strain gages (Sec. 3.3.2).

Chapter 4 applies the force transducer methodology to beams with welded and bolted joints with application to a portable army bridge. Section 4.2.1 discusses the effect of welded or bolted joints on strain gages in close proximity to joints. The previously developed calibration method accounts for stress concentrations due to joints (Sec. 4.2.2). Section 4.3.1 shows the experimental results for a continuously tapered aluminum beam with a series of welded joints. Section 4.3.2 shows the experimental results for an aluminum beam with a bolted joint in the middle. Section 4.3.3 shows the experimental results for a beam that is half aluminum and half steel. Section 4.3.4 shows the application of the force transducer methodology to a portable army bridge on the BCS.

Chapter 5 reviews the force transducer methodology and the strain gage based methodology using shear gages and uniaxial strain gages developed and provides future research directions. Section 5.1 summarizes the experimental results for Chapters 2 through 4. Section 5.2 describes the contributions, advantages, and limitations of the methods. Section 5.3 discusses future work for the methods developed here.

Chapter 2: Identifying the Magnitude and Location of a Load on a Slender Beam Using a Strain Gage Based Force Transducer Abstract A unique strain gage based method is developed to identify the magnitude and location of a load on a slender beam with non-homogeneous material, variable cross sections, and pinned, firm rest, soft rest, pinned-fixed, and fixed boundary conditions. Four uniaxial strain gages are mounted to the bottom surface of the beam, and the bending moment diagram of the beam can be constructed using measured strains on the beam. By combining individually scaled strain gage outputs, the magnitude and location of the load can be accurately identified. The strain gage based force transducer methodology is experimentally validated on prismatic beams with firm rest, soft rest, firm rest-fixed, and fixed boundary conditions, and a continuously tapered beam with rest boundary conditions. The force transducer methodology is independent of the boundary conditions of the beam and the error from strain gage drift due to uniform thermal expansion on a prismatic beam can cancel out.

2.1 Introduction

Figure 22:
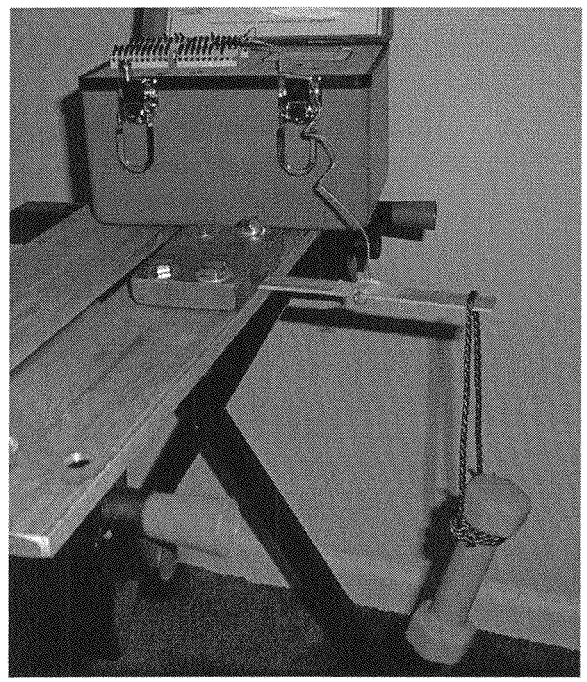
FIG. 22 is a picture of an experimental setup of a cantilever beam strain gage based force transducer in Ref. [20]
Figure 23:
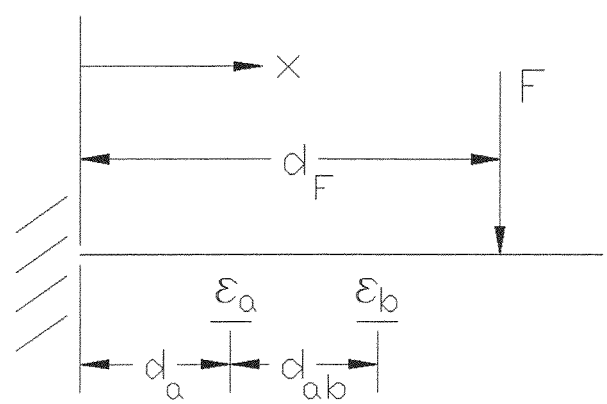
FIG. 23 is a side view of the beam in FIG. 22 that can determine the magnitude of the force F using two strain gages at points a and b.
Figure 24:
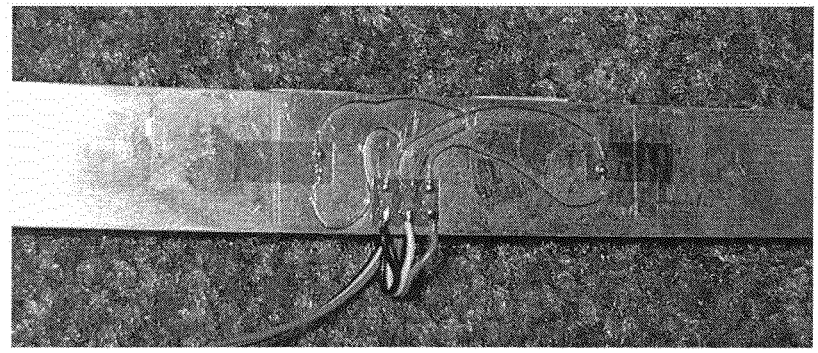
FIG. 24 is a picture of the strain gages for the beam in FIG. 22.

A strain gage based force transducer has been used to identify the magnitude of a force F on a slender cantilever beam [20], as shown in FIGS. 22 to 24. Two uniaxial strain gages, which measure strains along the x direction, are located between the load and the fixed boundary, as shown in FIGS. 23 and 24. For an Euler-Bernoulli beam, the relationship between the shear force V and the bending moment M is [21]

$$\frac{dM(x)}{dx} = V(x) \tag{2.1}$$

The bending stress in the beam can be calculated from $$\sigma = \frac{My}{I} \tag{2.2}$$

where y is the distance from the neutral axis of the beam to the point where stress is calculated, and I is the area moment of inertia of the cross section [22]. The stress σ is proportional to the strain ϵ through the Young's modulus ϵ [23]:

$$\sigma = E\epsilon \tag{2.3}$$

Hence the bending moment M is proportional to the strain ϵ:

$$M = \frac{EI}{y}\varepsilon \tag{2.4}$$

Since v(x)=F and dM(x)/dx can be calculated using the finite difference method, which is an exact method here since the corresponding bending moment curve is a line, by Eq. (2.1), one has $$\frac{M_b - M_a}{d_{ab}} = F \quad (2.5)$$

where $M_a$ and $M_b$ are the bending moments at points a and b, respectively, and $d_{ab}$ is the distance between strain gages a and b (FIG. 23). Applying Eq. (2.4) at points a and b and using Eq. (2.5) yield $$F = \frac{EI}{y d_{ab}}(\varepsilon_b - \varepsilon_a) \quad (2.6)$$

where $\varepsilon_a$ and $\varepsilon_b$ are the measured strains at points a and b, respectively. Equation (2.6) indicates that the force F can be calculated using the measured strains at points a and b. Note that it is not necessary to measure the strains of the cantilever beam from the applied load to the free end, since there is no strain in that section. Hence only two strain gages are needed to identify the magnitude of a load on the cantilever beam. The concept of the cantilever beam strain gage based force transducer is extended in this work to slender beams with non-homogeneous materials, variable cross sections, and pinned, firm rest, soft rest, pinned-fixed, and fixed boundary conditions. In addition, methods to identify the location of a load on a slender beam are developed.

2.2 Theory 2.2.1 Identification of the Magnitude of a Load

Figure 26:
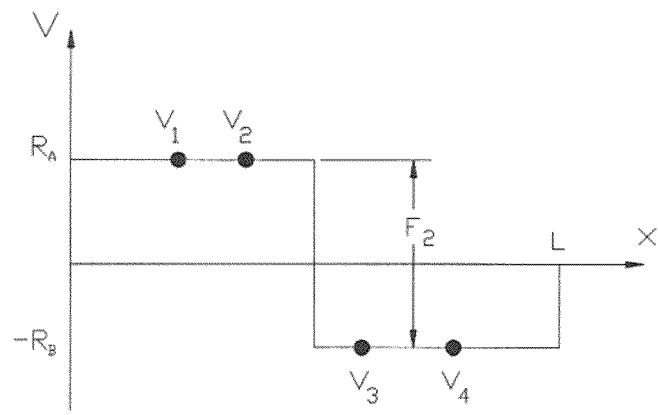
FIG. 26 is a shear force diagram for the beam in FIG. 25.
Figure 27:
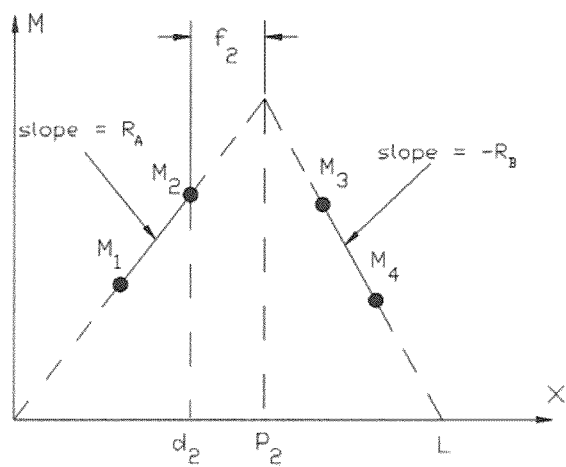
FIG. 27 shows calculated (solid lines) and actual (dashed lines) bending moment curves for the beam in FIG. 25, where the force F2 is located inside the weight area.

Consider a beam with non-homogeneous material, variable cross sections, and pinned boundary conditions. While a strain gage based force transducer for the cantilever beam has only two strain gages, that for a beam with reaction forces at two boundaries has four strain gages, with two strain gages on each side of a load to calculate the slopes of the bending moment curves on the two sides of the load. The free body diagram shown in FIG. 25 has a force $F_2$ located inside a designated weight area between strain gages 2 and 3, where $R_A$ and $R_B$ are the reaction forces at the two boundaries; in this work, the index n for a force $F_n$ denotes the force is located to the right of strain gage $\varepsilon_n$, where n=1, 2, 3, 4 is the strain gage number. The standard sign conventions for the shear force and bending moment diagrams are used [21]. The left shear force curve in FIG. 26 has a constant value $R_A$, and the right shear force curve has a constant value $-R_B$. Since a bending moment curve is the integral of a shear force curve, the slope of the left bending moment curve is $R_A$, and that of the right bending moment curve is $-R_B$, as shown in FIG. 27. Subtracting the latter from the former, and using the force equilibrium equation and Eq. (2.1), yield $$\text{Slope}_{Left} - \text{Slope}_{Right} = R_A + R_B = F_2 \quad (2.7)$$

$$\frac{M_2 - M_1}{d_{12}} - \frac{M_4 - M_3}{d_{34}} = F_2 \quad (2.8)$$

where $M_1$ through $M_4$ are the bending moments at strain gages 1 through 4, $d_{12}$ is the distance between strain gages 1 and 2, and $d_{34}$ is the distance between strain gages 3 and 4. Note that Eqs. (2.2) through (2.4) apply to both prismatic and non-prismatic beams. Using Eq. (2.4) in Eq. (2.8) yields the general force transducer equation:

$$FT_{1234} = \quad (2.9)$$
$$FT_2 = F_2 = -\varepsilon_1\left(\frac{E_1 I_1}{y_1 d_{12}}\right) + \varepsilon_2\left(\frac{E_2 I_2}{y_2 d_{12}}\right) + \varepsilon_3\left(\frac{E_3 I_3}{y_3 d_{34}}\right) - \varepsilon_4\left(\frac{E_4 I_4}{y_4 d_{34}}\right)$$

where $F_{1234}$ denotes the output of the force transducer formed by strain gages 1 through 4, and it can also be denoted by $FT_2$, in which the subscript is the strain gage number immediately to the left of the force $F_2$, when the four strain gages are adjacent to each other; this notation is used consistently elsewhere. One can define an individual scaling factor $\gamma_n$ for strain gage $\varepsilon_n$, and apply it to Eq. (2.9):

$$\gamma_n = \frac{E_n I_n}{y_n} \quad (2.10)$$

$$FT_2 = F_2 = -\varepsilon_1\left(\frac{\gamma_1}{d_{12}}\right) + \varepsilon_2\left(\frac{\gamma_2}{d_{12}}\right) + \varepsilon_3\left(\frac{\gamma_3}{d_{34}}\right) - \varepsilon_4\left(\frac{\gamma_4}{d_{34}}\right) \quad (2.11)$$

Figure 28:
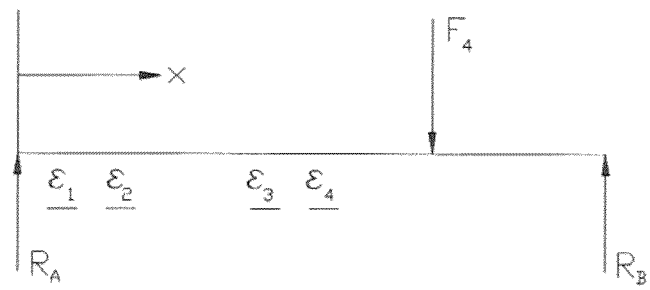
FIG. 28 is a free body diagram for a case where the force F4 is located outside the force transducer.
Figure 29:
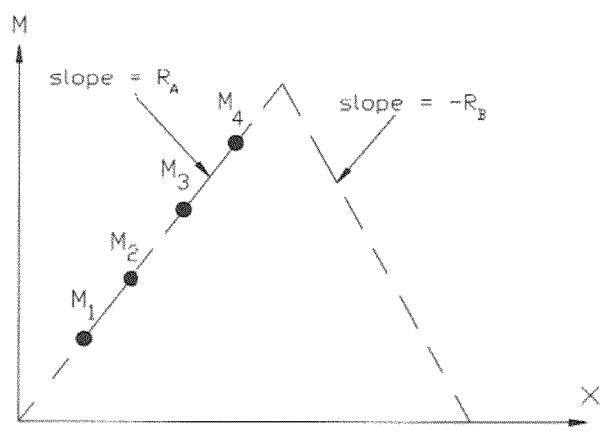
FIG. 29 shows calculated (solid lines) and actual (dashed lines) bending moment curves for the case in FIG. 28, where the force F4 is located outside the force transducer.

One can also define a calibration factor $\beta_n$ corresponding to the scaling factor $\gamma_n$:

$$\beta_n = \frac{\gamma_n}{d_{nj}} \text{ for } n < j, \beta_n = \frac{\gamma_n}{d_{jn}} \text{ for } n > j \quad (2.12)$$

where j is also the strain gage number, and $d_{nj}$ or $d_{jn}$ is the distance between adjacent strain gages that are not at the end points of the weight area. Note that the distance between strain gages 2 and 3, denoted by $d_{23}$, does not appear in Eqs. (2.9) and (2.11); hence it does not affect determination of the magnitude of the force. Furthermore, as long as the force $F_2$ is located inside the weight area, Eqs. (2.9) and (2.11) hold true. When the force $F_4$ is outside the force transducer, as shown in FIG. 28, the force transducer will read zero since the slopes measured from the two pairs of strain gages are the same and will cancel out when subtracted (FIG. 29).

Figure 30:
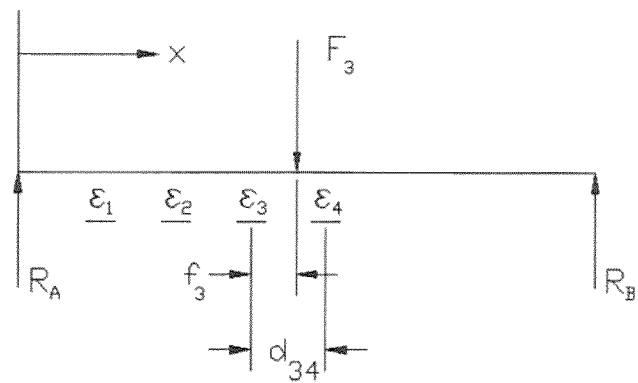
FIG. 30 is a free body diagram for a case where the force F3 is outside the weight area, but inside the force transducer.
Figure 31:
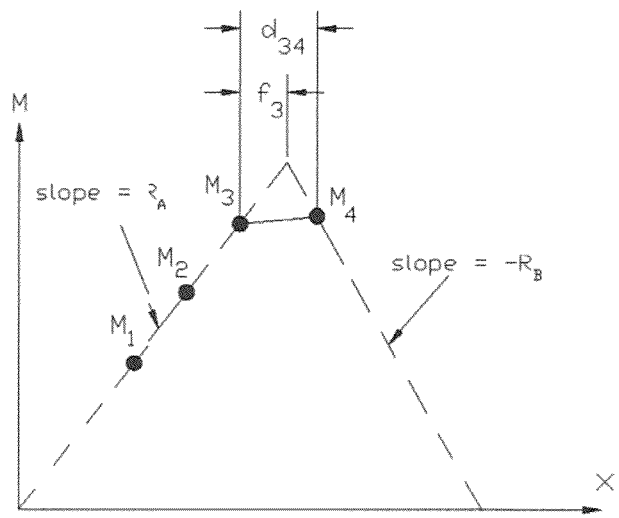
FIG. 31 shows calculated (solid lines) and actual (dashed lines) bending moment curves for the case in FIG. 30, where the force F3 is outside the weight area, but inside the force transducer.

The last possibility is for a force located outside the weight area, but inside the force transducer, i.e., the force is between strain gages 1 and 2 or between strain gages 3 and 4; FIG. 30 shows the case when the force is between strain gages 3 and 4. The strain measurements lead to a partially correct measured bending moment diagram, as shown in FIG. 31. Let $$\alpha_{nj} = \frac{f_n}{d_{nj}} \quad (2.13)$$

be the relative position of the force, where $f_n$ is the position of the force measured from the left adjacent strain gage, and $d_{nj}$ is the distance between strain gages n and j. When j=n+1, $\alpha_{nj}$ can be denoted as $\alpha_n$. For the case in FIG. 30, when $\alpha_3$=0, the output of $FT_2$ is $F_3$, and when $\alpha_3$=1, the output of $FT_2$ is 0. The calculated magnitude of the force varies linearly with the position of the force between strain gages 3 and 4. A similar method applies if the force is between strain gages 1 and 2. Since $\alpha_n$ is defined from left to right and not symmetrically outward from the weight area, one has $$FT_2 = (1 - \alpha_3) F_3 \quad (2.14)$$

$$FT_2 = \alpha_1 F_1 \quad (2.15)$$

If the position of the force is known, the magnitude of the force can be calculated from Eq. (2.14) or (2.15), and vice versa.

For the case of a homogenous, prismatic beam with unequal strain gage spacing, $\gamma_1=\gamma_2=\gamma_3=\gamma_4=\gamma$, where $\gamma$ is the global scaling factor for all the strain gages, and Eq. (2.11) becomes $$FT_2 = F_2 = \gamma\left(\frac{-\varepsilon_1 + \varepsilon_2}{d_{12}} + \frac{\varepsilon_3 - \varepsilon_4}{d_{34}}\right) \quad (2.16)$$

When $d_{12}=d_{34}=d$, $\beta_1=\beta_2=\beta_3=\beta_4=\beta$, where $\beta$ is the global calibration factor, and Eq. (2.16) becomes $$FT_2=F_2=\beta(-\varepsilon_1+\varepsilon_2+\varepsilon_3-\varepsilon_4) \quad (2.17)$$

Figure 25:
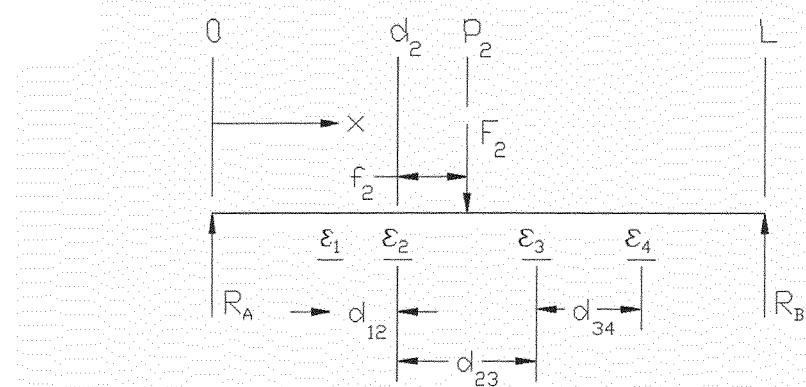
FIG. 25 is a free body diagram of a beam with pinned boundary conditions, and two strain gages on each side of the force F2.
Figure 32:
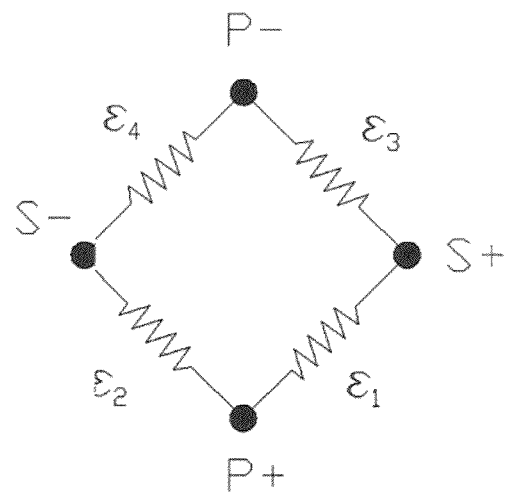
FIG. 32 illustrates a Wheatstone bridge from the strain gages in FIG. 25.

The output measurements of the strain gages on the beam in FIG. 25 can be combined within one circuit via a Wheatstone bridge, as shown in FIG. 32. Opposite legs of the bridge add together and adjacent legs subtract [15]. While in theory a single output of the circuit is possible, it will not be used for this methodology. If one strain gage is not functioning properly or one wire is damaged, the entire circuit is destroyed. This makes troubleshooting difficult [3]. It is better practice to combine the strain gage outputs algebraically.

It should be noted that a beam can have many strain gages, and the four strain gages of a force transducer do not have to be adjacent to each other for Eq. (2.11). Any combination of strain gages $\varepsilon_h$, $\varepsilon_i$, $\varepsilon_j$, and $\varepsilon_k$, can form a force transducer:

$$FT_{hijk} = F_i = -\varepsilon_h\left(\frac{\gamma_h}{d_{hi}}\right) + \varepsilon_i\left(\frac{\gamma_i}{d_{hi}}\right) + \varepsilon_j\left(\frac{\gamma_j}{d_{jk}}\right) - \varepsilon_k\left(\frac{\gamma_k}{d_{jk}}\right) \quad (2.18)$$

where the subscript of $FT_{hijk}$ is the combination of the strain gage numbers since the strain gages forming the force transducer are not adjacent to each other. The first two strain gages of a force transducer, measuring the left half slope of a bending moment diagram, and the next two strain gages, measuring the right half slope of the bending moment diagram, should be adjacent to each other, since a load outside the weight area, but inside the force transducer, can only yield a partially correct calculated force.

Figure 33:
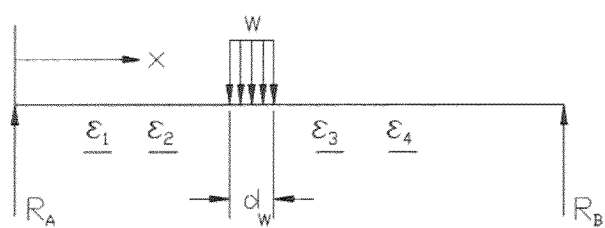
FIG. 33 is a free body diagram for a beam with a uniformly distributed force within the weight area and pinned boundary conditions.
Figure 34:
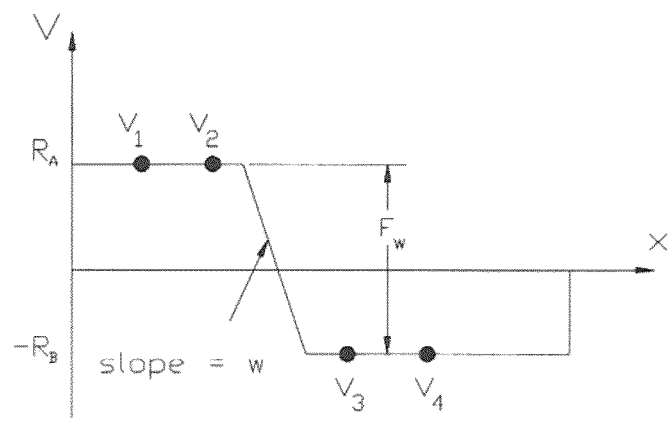
FIG. 34 is a shear force diagram for the case in FIG. 33.
Figure 35:
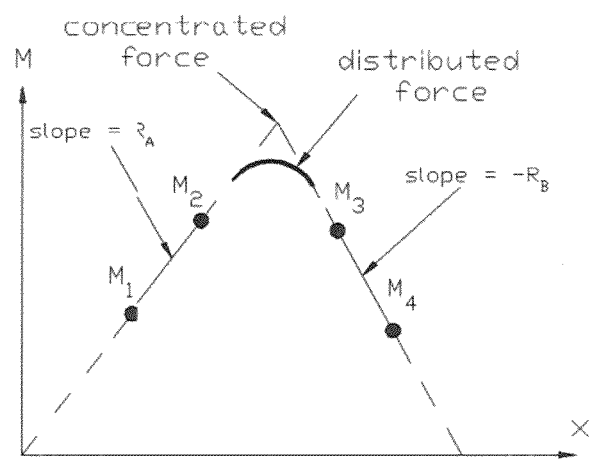
FIG. 35 shows calculated (solid lines) and actual (dashed lines) bending moment curves, and the bending moment curve over the length of the distributed force (bold line), for the case in FIG. 33, where the distributed force is within the weight area.

The methodology developed in this work is also applicable to a distributed load within the weight area, as shown in FIG. 33, where a uniformly distributed force w is applied over a length $d_w$. The shear force diagram in FIG. 34 shows that the slope of the shear force curve over the length $d_w$ is equal to the distributed force w. The drop in the shear force curves across the distributed force is equal to the resultant force $F_w=wd_w$, which is the same as that for the case of a concentrated force $F_2$, as shown in FIG. 26. The comparison of the bending moment diagrams for the concentrated force and the distributed force, whose centroid is located at the same position as the concentrated force, is shown in FIG. 35. It can be seen from FIG. 27 that the intersection of the left and right bending moment curves is the position of the concentrated force $F_2$, and it is also the position of the centroid of the distributed force w, as shown in FIG. 35. This concept can be extended to a distributed load of any shape. A distributed load outside the force transducer can be treated as the case in FIG. 28, and a distributed load between strain gages 1 and 2 or between strain gages 3 and 4 can be treated as the case in FIG. 30. A distributed load that crosses a strain gage boundary is in effect a multiple load problem, which is beyond the scope of the current chapter and will be discussed in Chapter 3. Finally, a combination of concentrated and distributed loads follows the same methodology as that for a single load case as long as they do not cross a strain gage boundary.

Figure 36:
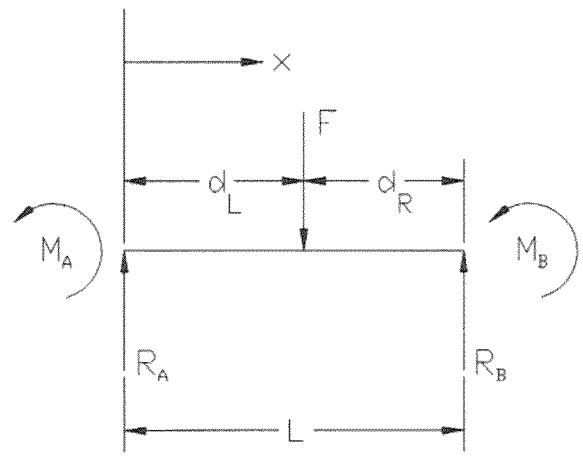
FIG. 36 is a free body diagram for pinned, firm rest, soft rest, pinned-fixed, and fixed boundary conditions.
Figure 37:
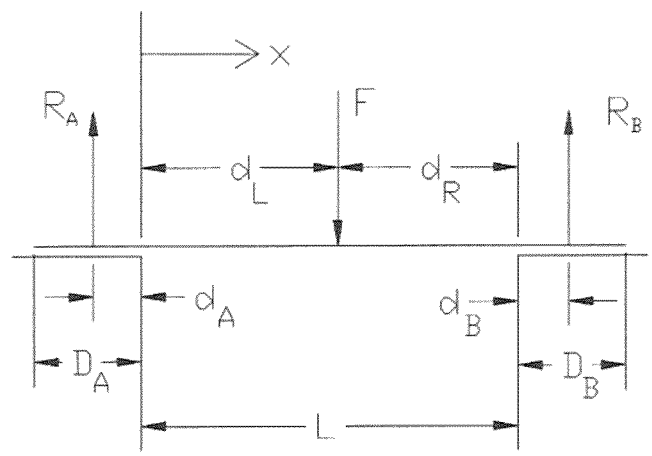
FIG. 37 is a free body diagram for a beam with soft rest boundary conditions.

Let $d_L$ and $d_R$ be the distances between the force F and the left and right boundaries, respectively, as shown in FIG. 36. There are two types of a rest boundary condition: a firm rest boundary condition, where the reaction force acts at the edge of a firm abutment, and a soft rest boundary condition (FIG. 37) [24], where the reaction force is distributed over a soft abutment, which can be represented by a concentrated reaction force at the edge of the abutment and a reaction moment (FIG. 36). The distances between the left and right reaction forces $R_A$ and $R_B$, and the edges of the soft abutments, are $d_A$ and $d_B$, respectively, and the lengths of the beam sitting on the left and right soft abutments are $D_A$ and $D_B$, respectively (FIG. 37). In this study, a firm rest boundary is similar to a pinned boundary, and a soft rest boundary is similar to a fixed boundary, except that the direction of the reaction moment for the soft rest boundary is opposite to that of the fixed boundary, and the slope of a fixed boundary is zero while that of a soft rest boundary may not be zero. With a positive external force in the upward direction and a positive external moment in the counterclockwise direction, the reaction forces and moments for pinned, firm rest, soft rest, pinned-fixed, and fixed boundary conditions are shown in Table 2.1, where a statically indeterminate analysis for the pinned-fixed and fixed boundary conditions is used [25].

TABLE 2.1

Reaction forces and moments for pinned, firm rest, soft rest, pinned-fixed, and fixed boundary conditions

| Boundary Conditions | $R_A$ | $R_B$ | $M_A$ | $M_B$ | $R_A + R_B$ |
|---|---|---|---|---|---|
| Pinned or Firm Rest | $\dfrac{Fd_R}{L}$ | $\dfrac{Fd_L}{L}$ | 0 | 0 | F |
| Soft Rest | $\dfrac{F(d_R + d_B)}{L + d_A + d_B}$ | $\dfrac{F(d_L + d_A)}{L + d_A + d_B}$ | $-\dfrac{Fd_A(d_R + d_B)}{L + d_A + d_B}$ | $\dfrac{Fd_B(d_L + d_A)}{L + d_A + d_B}$ | F |
| Pinned-Fixed | $\dfrac{Fd_R^2}{2L^3}(d_L + 2L)$ | $\dfrac{Fd_L}{2L^3}(3L^2 - d_L^2)$ | 0 | $-\dfrac{Fd_L d_R}{2L^2}(d_L + L)$ | F |
| Fixed | $\dfrac{Fd_R^2}{L^3}(3d_L + d_R)$ | $\dfrac{Fd_L^2}{L^3}(d_L + 3d_R)$ | $\dfrac{Fd_L d_R^2}{L^2}$ | $-\dfrac{Fd_L^2 d_R}{L^2}$ | F |

Figure 38:
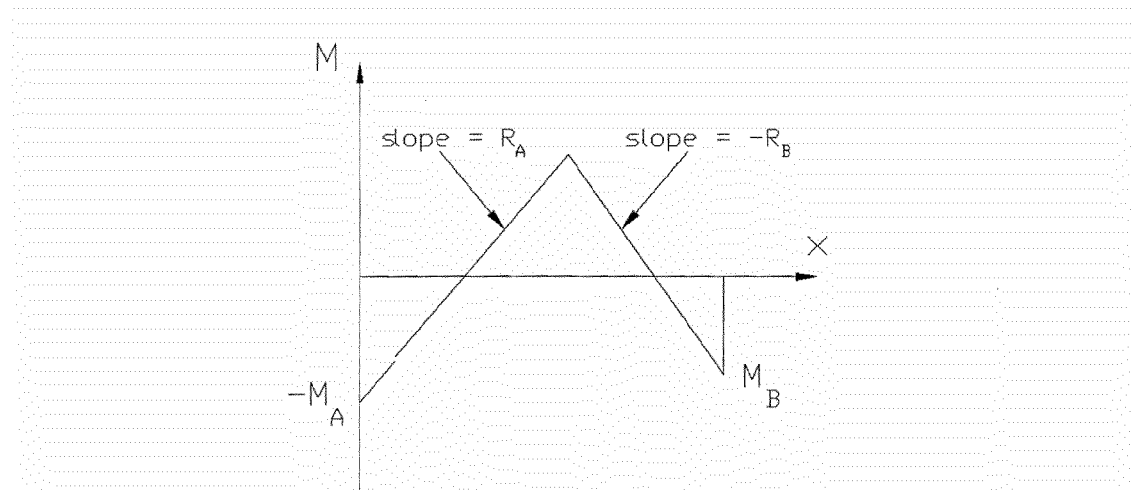
FIG. 38 is a bending moment diagram for pinned, firm rest, soft rest, pinned-fixed, and fixed boundary conditions.

The shear force diagrams for the firm rest, soft rest, pinned-fixed and fixed boundary conditions are the same as that for the pinned boundary conditions in FIG. 26. Similarly, the slopes of the left and right bending moment curves are still $R_A$ and $-R_B$, respectively, as shown in FIG. 38. Positive and negative strains are expected at the bottom surfaces of the beams near the soft rest and fixed boundaries due to the positive and negative (FIG. 38) bending moments there, respectively. The sum of the reaction forces $R_A$ and $R_B$ will always equal the applied force, as shown in Table 2.1; hence Eqs. (2.7) through (2.18) still apply regardless of the boundary conditions. While inaccurate boundary conditions can create a discrepancy in the strains, the magnitude of the load can still be accurately calculated.

2.2.2 Identification of the Location of a Load

When a force is located inside a weight area, the position of the force can be identified using the strain gage readings. Since the position of the intersection point of the left and right bending moment curves in FIG. 27 corresponds to the position of the force, the relative position $\alpha_2$ of the force $F_2$ can be calculated by simultaneously solving the equations for the left and right bending moment curves:

$$\alpha_2 = \frac{f_2}{d_{23}} = \frac{d_{12}d_{23}(\gamma_3\varepsilon_3 - \gamma_4\varepsilon_4) + d_{12}d_{34}(\gamma_3\varepsilon_3 - \gamma_2\varepsilon_2)}{d_{23}d_{34}(\gamma_2\varepsilon_2 - \gamma_1\varepsilon_1) + d_{12}d_{23}(\gamma_3\varepsilon_3 - \gamma_4\varepsilon_4)} \quad (2.19)$$

The position of the force is not affected by the boundary conditions. Since the shear force diagram in FIG. 26 is the same for pinned, firm rest, soft rest, pinned-fixed, and fixed boundary conditions, the discontinuity in the shear force diagram due to the presence of a concentrated force always occurs at the intersection point of the two bending moment curves. The position of the centroid of a distributed force can also be calculated from Eq. (2.19), a potential application of which is to identify the longitudinal center of gravity of a vehicle on a bridge. For the case of a homogenous, prismatic beam with unequal strain gage spacing, Eq. (2.19) becomes $$\alpha_2 = \frac{d_{12}d_{23}(\varepsilon_3 - \varepsilon_4) + d_{12}d_{34}(\varepsilon_3 - \varepsilon_2)}{d_{23}d_{34}(\varepsilon_2 - \varepsilon_3) + d_{12}d_{23}(\varepsilon_3 - \varepsilon_4)} \quad (2.20)$$

When $d_{12}=d_{23}=d_{34}=d$, Eq. (2.20) becomes $$\alpha_2 = \frac{-\varepsilon_2 + 2\varepsilon_3 - \varepsilon_4}{-\varepsilon_1 + \varepsilon_2 + \varepsilon_3 - \varepsilon_4} \quad (2.21)$$

The absolute position of the force $p_n$ can be obtained from Eq. (2.13) (FIG. 2.4):

$$p_n = d_n + \alpha_n d_{nj} \quad (2.22)$$

where $d_n$ is the absolute position of the strain gage immediately to the left of the force, measured from the left boundary.

Similarly, the location of a load on a cantilever beam in FIG. 23 can be identified. Let $d_a$ be the distance between the strain gage at point a to the fixed boundary. The absolute position of the force F, measured from the fixed end, is $$d_F = d_a + \frac{\varepsilon_a d_{ab}}{\varepsilon_a - \left(\frac{E_b I_b y_a}{E_a I_a y_b}\right)\varepsilon_b} \quad (2.23)$$

For the case of a homogenous, prismatic beam, Eq. (2.23) becomes $$d_F = d_a + \frac{\varepsilon_a d_{ab}}{\varepsilon_a - \varepsilon_b} \quad (2.24)$$

2.2.3 Error Mitigation and Calibration

It is known that strain gages will drift when temperature changes within the material [14]. In fact, this is typically the main cause for error when dealing with strain gages [26]. For an outdoor setup, the ambient temperature can change over 10° C. throughout the course of the day. Depending on the material, this can cause a change of 1° C. or more for the actual material temperature through convection. Aluminum 6061-T6 has a coefficient of thermal expansion of 23.6 µε/° C. Hence a 1° C. shift in temperature of the material can introduce a 23.6 µε drift in all the strain gages simultaneously. If this happens, the force transducer will still respond correctly. When combining four strain gages in a typical strain gage based transducer in a Wheatstone bridge or mathematically, the temperature effects can cancel out when uniform strain gage drift occurs [27]. For the force transducer in Eq. (2.11), when $\gamma_1=\gamma_2$ and $\gamma_3=\gamma_4$, the same shift in all four strain gages cancels out. Non-uniform thermal expansion often occurs when the sun causes a part of a structure to expand more than some other part due to radiation. For non-uniform thermal expansion or when $\gamma_1=\gamma_2$ and $\gamma_3=\gamma_4$ are not satisfied, such as the case of a non-homogeneous and/or non-prismatic beam, error can be eliminated by zeroing strain gages before readings are taken.

One of the inherent features of the force transducer methodology is that it possesses an absolute error instead of a relative error for the strain gages, which is due to the accuracy of the equipment and the sensitivity of measurements. For example, each strain gage is accurate to within 2 to 3 µε regardless of whether it is reading 5 or 500 µε. It is recommended to use optimal strain readings between 1,000 and 1,500 µε when designing a force transducer to increase the signal to noise ratio [15]. A method to increase the output signal is to introduce local notching near a strain gage [28].

As with any transducer design, calibration is expected and plays a vital role in developing a methodology [29]. The geometric and material properties can deviate from theoretical values. In the case of extreme temperatures, the Young's Modulus can change by 1 to 3% [14]. An accepted calibration method for an over-determined problem is to minimize the least squares error between the experimental and calculated magnitudes of loads [8]. Another accepted method is to reduce the maximum error.

Figure 39:
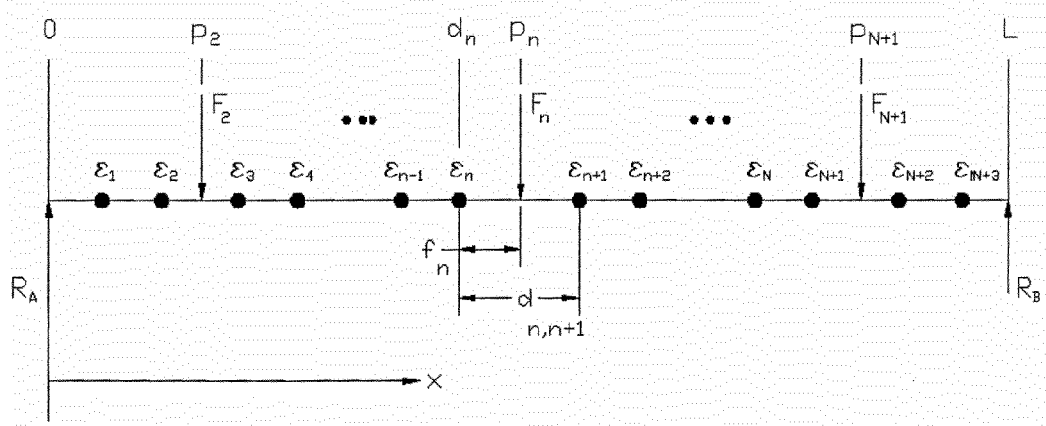
FIG. 39 shows a known nonzero force Fn placed immediately after strain gage epsilon sub n with all the other forces on the beam being zero.

The calibration procedure is set up so that a single known nonzero force $F_n$, where n=2, 3, ..., N+1, is placed between strain gages $\epsilon_n$ and $\epsilon_{n+1}$, which is inside the weight area of the force transducer $FT_n$ that consists of strain gages $\epsilon_{n-1}$ through $\epsilon_{n+2}$, and all the other forces on the beam are zero; all the strains are recorded (FIG. 39). There are N+3 strain gages on the beam that create N force transducers, each of which consists of four adjacent strain gages, in order to identify the magnitudes of the N nonzero forces. Equations (2.11) and (2.12) are modified to reflect the N force transducers created:

$$FT_n = F_n = \quad (2.25)$$
$$-\varepsilon_{n-1}\left(\frac{\gamma_{n-1}}{d_{n-1,n}}\right) + \varepsilon_n\left(\frac{\gamma_n}{d_{n-1,n}}\right) + \varepsilon_{n+1}\left(\frac{\gamma_{n+1}}{d_{n+1,n+2}}\right) - \varepsilon_{n+2}\left(\frac{\gamma_{n+2}}{d_{n+1,n+2}}\right)$$

For each applied force $F_n$, the N force transducers $FT_n$ (n=2, 3, ..., N+1), each involving four scaling factors $\gamma_{n-1}$ through $\gamma_{n+2}$, are used. It should be noted that the goal of the force transducer here is not only to identify a load inside the weight area, but also to identify a zero load outside the force transducer. Hence both the loaded and unloaded zones are used in calibration. All the force transducers used, except $FT_n$, are expected to read zero. The force transducer $FT_{n-1}$ and $FT_{n+1}$ are not used because the force $F_n$ is outside their weight areas, but inside the force transducers, which can only provide a partial response. The calibration equation is $$[F]=[\epsilon][\gamma] \quad (2.26)$$

where [F] is a q×1 matrix, in which $q=N^2-2N+2$, that represents all the known forces, [$\epsilon$] is a q×m matrix, in which m=N+3, that represents the measured strains from strain gages forming the force transducers, and [$\gamma$] is an m×1 matrix that represents the scaling factors. An example of Eq. (2.26) for N=5 is $$\begin{bmatrix} F_2 \\ F_4=0 \\ F_5=0 \\ F_6=0 \\ \hline F_3 \\ F_5=0 \\ F_6=0 \\ \hline F_2=0 \\ F_4 \\ F_6=0 \\ \hline F_2=0 \\ F_3=0 \\ F_5 \\ \hline F_2=0 \\ F_3=0 \\ F_4=0 \\ F_6 \end{bmatrix} = \begin{bmatrix} -\epsilon_1/d_{12} & \epsilon_2/d_{12} & \epsilon_3/d_{34} & -\epsilon_4/d_{34} & 0 & 0 & 0 & 0 \\ 0 & 0 & -\epsilon_3/d_{34} & \epsilon_4/d_{34} & \epsilon_5/d_{56} & -\epsilon_6/d_{56} & 0 & 0 \\ 0 & 0 & 0 & -\epsilon_4/d_{45} & \epsilon_5/d_{45} & \epsilon_6/d_{67} & -\epsilon_7/d_{67} & 0 \\ 0 & 0 & 0 & 0 & -\epsilon_5/d_{56} & \epsilon_6/d_{56} & \epsilon_7/d_{78} & -\epsilon_8/d_{78} \\ \hline 0 & -\epsilon_2/d_{23} & \epsilon_3/d_{23} & \epsilon_4/d_{45} & -\epsilon_5/d_{45} & 0 & 0 & 0 \\ 0 & 0 & 0 & -\epsilon_4/d_{45} & \epsilon_5/d_{45} & \epsilon_6/d_{67} & -\epsilon_7/d_{67} & 0 \\ 0 & 0 & 0 & 0 & -\epsilon_5/d_{56} & \epsilon_6/d_{56} & \epsilon_7/d_{78} & -\epsilon_8/d_{78} \\ \hline -\epsilon_1/d_{12} & \epsilon_2/d_{12} & \epsilon_3/d_{34} & -\epsilon_4/d_{34} & 0 & 0 & 0 & 0 \\ 0 & 0 & -\epsilon_3/d_{34} & \epsilon_4/d_{34} & \epsilon_5/d_{56} & -\epsilon_6/d_{56} & 0 & 0 \\ 0 & 0 & 0 & 0 & -\epsilon_5/d_{56} & \epsilon_6/d_{56} & \epsilon_7/d_{78} & -\epsilon_8/d_{78} \\ \hline -\epsilon_1/d_{12} & \epsilon_2/d_{12} & \epsilon_3/d_{34} & -\epsilon_4/d_{34} & 0 & 0 & 0 & 0 \\ 0 & -\epsilon_2/d_{23} & \epsilon_3/d_{23} & \epsilon_4/d_{45} & -\epsilon_5/d_{45} & 0 & 0 & 0 \\ 0 & 0 & 0 & -\epsilon_4/d_{45} & \epsilon_5/d_{45} & \epsilon_6/d_{67} & -\epsilon_7/d_{67} & 0 \\ \hline -\epsilon_1/d_{12} & \epsilon_2/d_{12} & \epsilon_3/d_{34} & -\epsilon_4/d_{34} & 0 & 0 & 0 & 0 \\ 0 & -\epsilon_2/d_{23} & \epsilon_3/d_{23} & \epsilon_4/d_{45} & -\epsilon_5/d_{45} & 0 & 0 & 0 \\ 0 & 0 & -\epsilon_3/d_{34} & \epsilon_4/d_{34} & \epsilon_5/d_{56} & -\epsilon_6/d_{56} & 0 & 0 \\ 0 & 0 & 0 & 0 & -\epsilon_5/d_{56} & \epsilon_6/d_{56} & \epsilon_7/d_{78} & -\epsilon_8/d_{78} \end{bmatrix} \begin{bmatrix} \gamma_1 \\ \gamma_2 \\ \gamma_3 \\ \gamma_4 \\ \gamma_5 \\ \gamma_6 \\ \gamma_7 \\ \gamma_8 \end{bmatrix}$$

(2.27)

where the partitions show five loading scenarios, and the measured strains within each partition are given different signs and divided by the distances between the strain gages according to Eq. (2.25). In Eq. (2.27), the nonzero force $F_2$ is used first to calibrate force transducer $FT_2$; zero forces are simultaneously used in other weight areas to calibrate force transducers $FT_4$, $FT_5$, and $FT_6$. The nonzero force $F_3$ is used next to calibrate force transducer $FT_3$, with zero forces in other weight areas used to calibrate force transducers $FT_5$ and $FT_6$. This procedure is repeated through the nonzero force $F_6$. Equation (2.26) is under-determined when N<4, and over-determined when N≥4. The calibration procedure should be set up so that Eq. (2.26) is over-determined. The absolute value of the difference between the known force and the output of the force transducer with the force inside its weight area, divided by the known force, is referred to as the force error. The absolute values of the outputs of the other force transducers with the force outside the force transducers, which are expected to read zero, divided by the known force, are referred to as the zero errors. The maximum force error is denoted by $\lambda_F$, and the maximum zero error is denoted by $\lambda_0$. The total error $\lambda_T$ is defined by $$\lambda_T = C\lambda_F + \lambda_0 \quad (2.28)$$

where C is a user defined positive parameter. The theoretical $\gamma_n$ (n=1, 2, ..., N+3) are used as the starting point for calibration, and the Microsoft Excel Solver is used to adjust all $\gamma_n$ to minimize $\lambda_T$ with the constraints $\gamma_n>0$. The program can be run several times by adjusting C to achieve desired force and zero errors. Acceptable error limits must be defined given economic considerations, sensitivity of measurement equipment, and specific application [30]. The goal for the experimental data in Sec. 2.3 was for the force errors to be within 5%, and the zero errors within 10%. The position error is defined by $|\Delta p_n|/L$, where $\Delta p_n$ is the difference between a known force position and the calculated one. By applying the calibration procedure for the magnitudes of the forces, the position errors usually do not need to be calibrated and are usually within 5%. The position of a force can also be calibrated for a non-homogeneous and/or non-prismatic beam using Eq. (2.19). However, the position cannot be calibrated for a homogeneous, prismatic beam, since no geometric and material properties (i.e., $\gamma_n$) appear in Eqs. (2.20) and (2.21). Once the scaling factors $\gamma_n$ for all strain gages are determined using known loads, they can be used to calculate the magnitudes and locations of unknown loads.

For the case of a single force transducer on a homogenous, prismatic beam, the magnitude of one known force inside the weight area is needed to determine the global scaling factor $\gamma$ in Eq. (2.16), as shown in Sec. 2.3.1. For the case of multiple force transducers on the beam, the above calibration procedure can also be used to determine $\gamma$, with $\gamma_n$ in Eq. (2.26) replaced by $\gamma$. Alternatively, one force transducer on the beam can be used to determine $\gamma$ with a known force, and the same scaling factor can be used in another force transducer to calculate an unknown force, as shown in Sec. 2.3.2. When the strain gages are equally spaced, $\gamma_n$ in Eq. (2.26) can be replaced by $\beta_n$.

Figure 40:
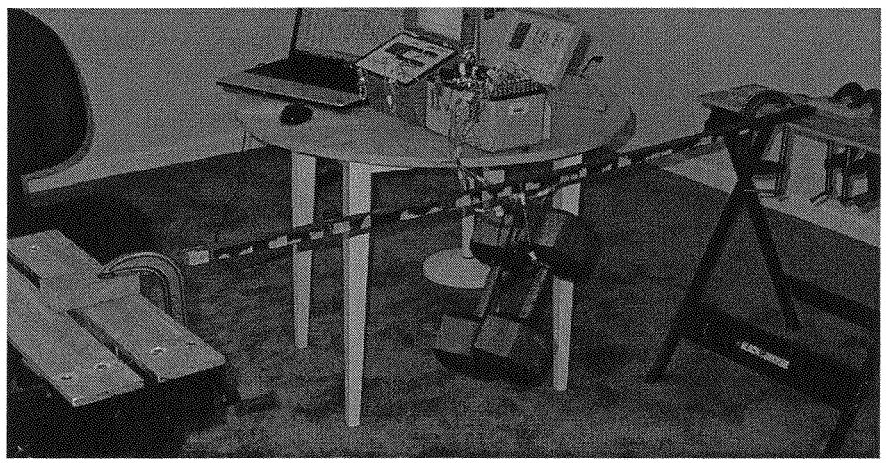
FIG. 40 is a picture of an experimental setup of a steel beam with rest boundary conditions.
Figure 41:
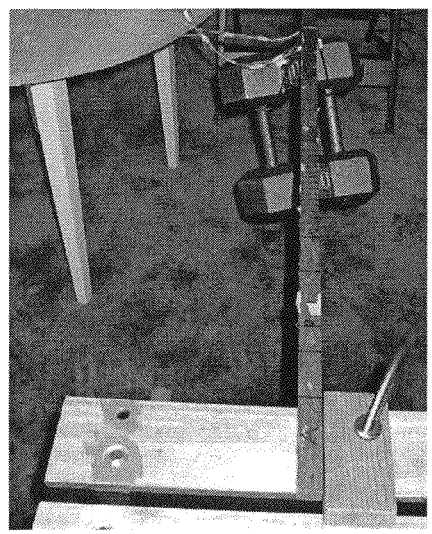
FIG. 41 is a picture of a close-up of guide block at end abutment for the beam in FIG. 40.
Figure 42:
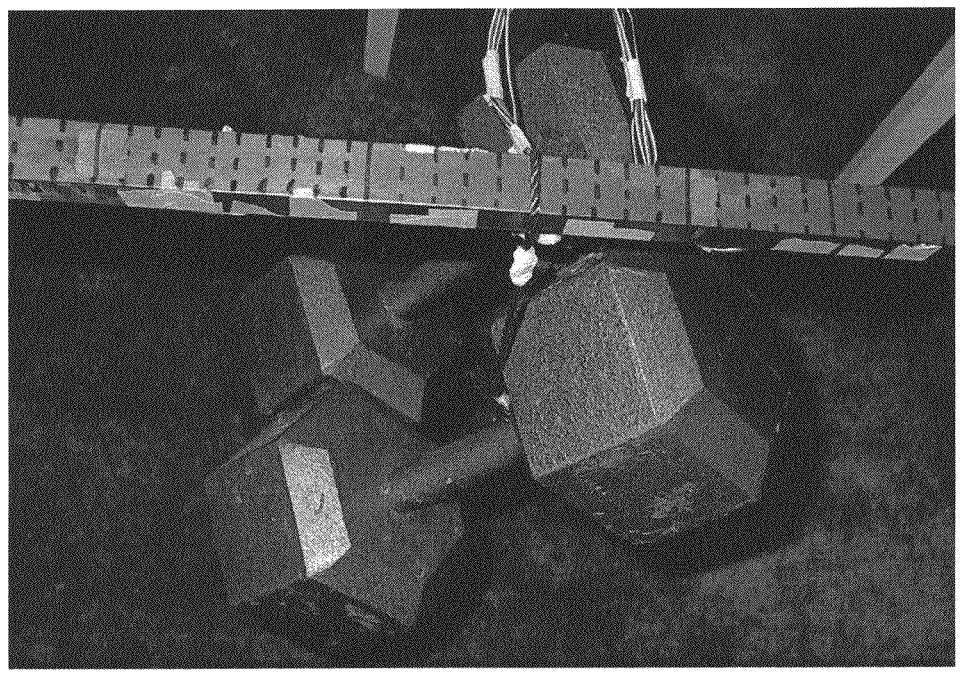
FIG. 42 is a picture of a load applied via thin string on beam in FIG. 40.
Figure 43:
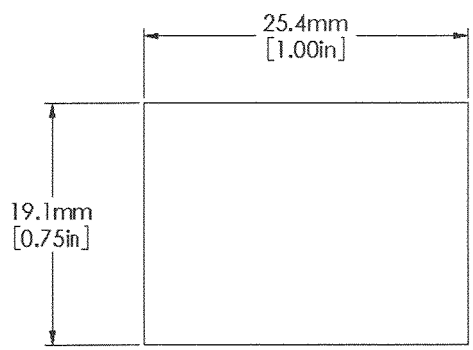
FIG. 43 shows a cross section of the steel beam in FIG. 40.
Figure 44:
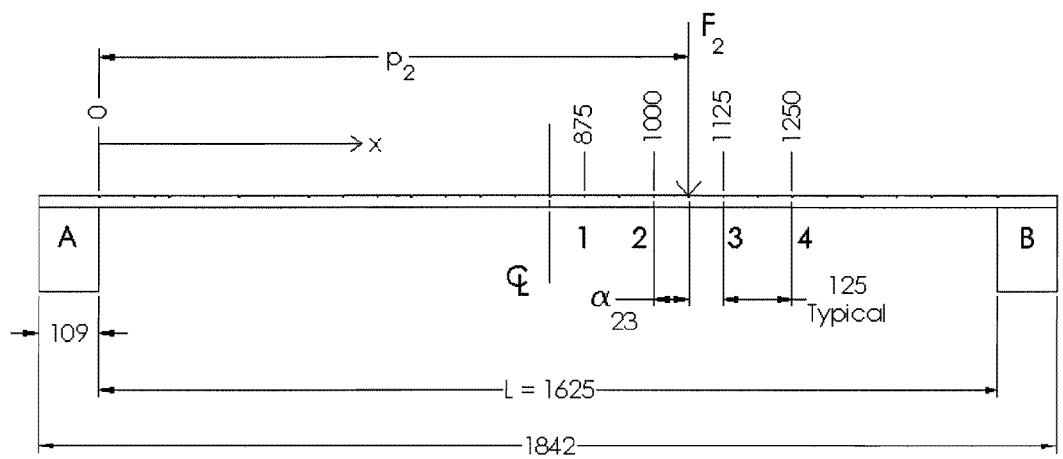
FIG. 44 is a side view of the steel beam in FIG. 40 with four numbered strain gage locations.

2.3 Experimental Results 2.3.1 Identifying the Magnitude and Location of a Load on a Steel Beam with Rest Boundary Conditions A quantity of four uniaxial Vishay strain gages (part number CEA-06-250UN-350) were bonded, with equal spacing, along the bottom surface of a steel A36 beam with rest boundary conditions, where the supports for the beam were made of aluminum, as shown in FIG. 40. It should be noted that the blocks on the end abutments are only a guide for the beam and does not create fixed boundary conditions, as shown in FIG. 41. The weight was applied via dumbbells, supported by a thin string to accurately apply a force at a given position, as shown in FIG. 42. The nominal weight of the dumbbells was used, whose weights were within 1.2% of their nominal values. The weight was moved to different positions inside the weight area. A Vishay P3 strain indicator and a Vishay SB-10 switch unit were used to display the strain gage outputs. Since strain is directly proportional to the Young's modulus, and steel is three times stiffer than aluminum, the strain readings will be one-third the values from a comparable aluminum beam. The theoretical Young's modulus for aluminum is 69 GPa and that for steel is 200 GPa. Unlike the design range of an aluminum beam force transducer, which is between 1,000 to 1,500 µε, that of a steel beam force transducer is between 300 to 500 µε, which can reduce the signal to noise ratio. The cross section of the steel beam is 19.1 mm by 25.4 mm (FIG. 43) and its side view with strain gage locations is shown in FIG. 44.

Figure 45:
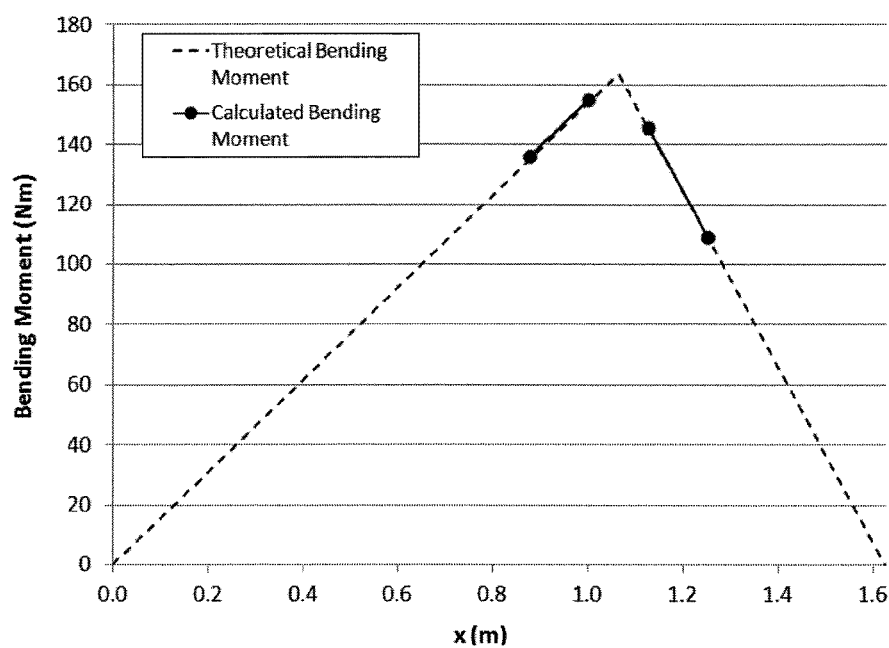
FIG. 45 is a comparison of the theoretical and calculated bending moment diagrams for the beam in FIG. 40.

The errors for the uncalibrated magnitude of the force were within 2.2%. Since there is one force transducer on a homogeneous, prismatic beam, there is one global scaling factor γ. A known force $F_2$=445 N at $\alpha_{23}$=0.5 was used to determine γ in Eq. (2.16). The errors for the calibrated magnitudes of all the unknown forces were within 0.6%. The position errors for all the forces were within 0.1%, as shown in Table 2.2. The adjusted global scaling factor was 102% of the theoretical global scaling factor. The bending moment diagram was also calculated using measured strains and compared with the theoretical bending moment diagram for the firm rest boundary conditions, as shown in FIG. 45.

Figure 48:
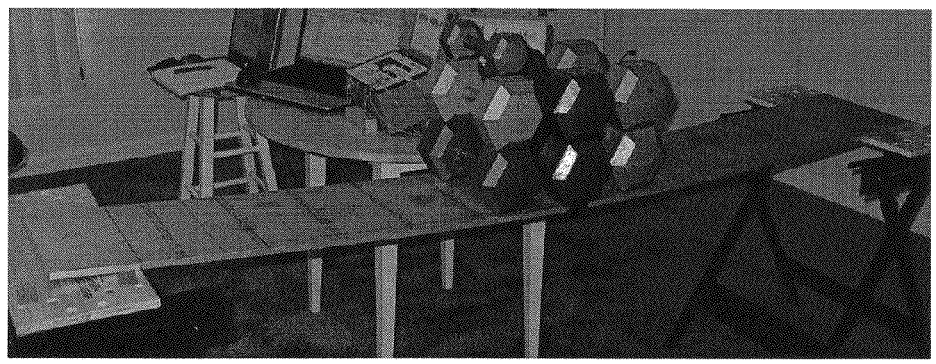
FIG. 48 is a picture of an experimental setup of an aluminum beam with a distributed load and rest boundary conditions.
Figure 49:
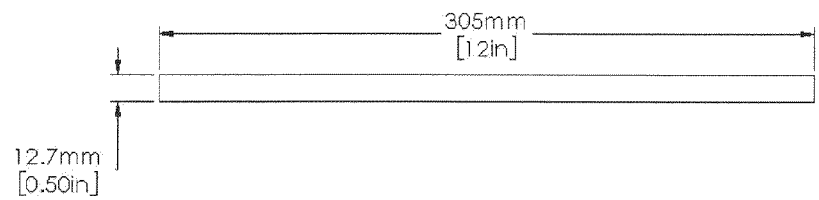
FIG. 49 is a cross section of the beam in FIG. 48.
Figure 50:
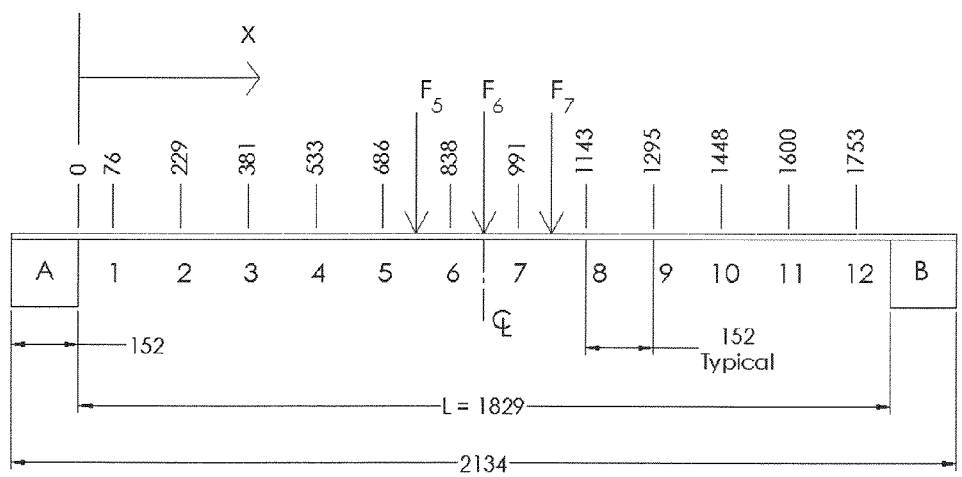
FIG. 50 is a side view of the beam in FIG. 48 with numbered strain gage locations.
Figure 51:
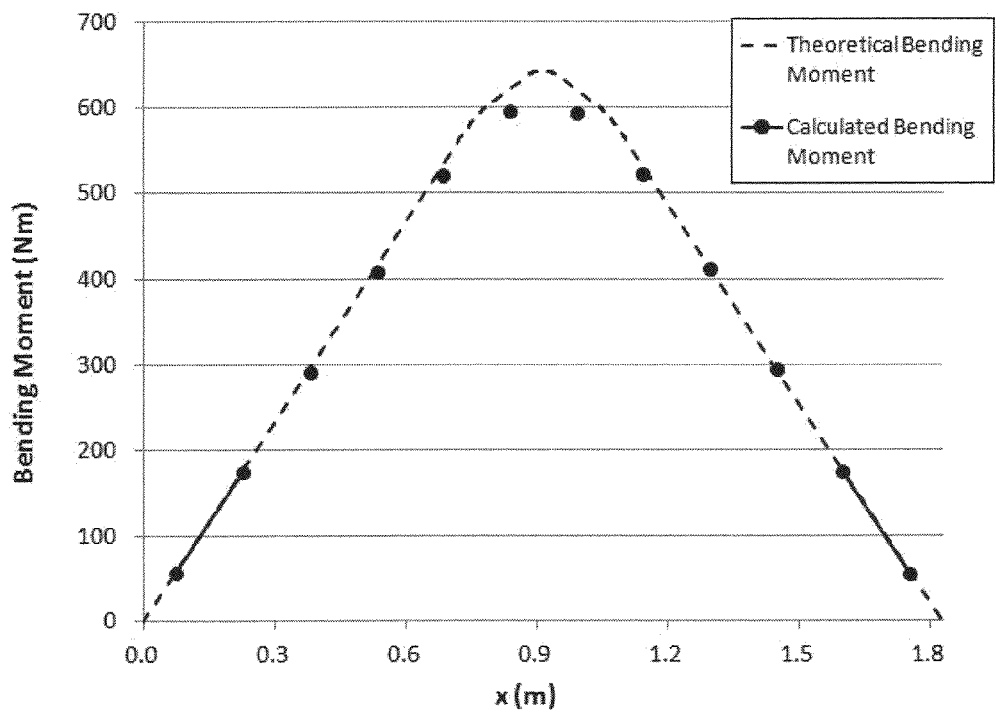
FIG. 51 is a comparison of the theoretical and calculated bending moment diagrams for the beam in FIG. 48 with firm rest boundary conditions.

2.3.2 Identifying the Magnitude and Location of a Distributed Load on an Aluminum Beam with Rest Boundary Conditions A quantity of twelve uniaxial Vishay strain gages (part number CEA-13-250UN-350) were bonded, with equal spacing, along the bottom surface of an aluminum 6061-T6 beam, as shown in FIG. 48, where multiple dumbbells created a distributed load on the beam. The cross section of the beam is 12.7 mm by 305 mm (FIG. 49) and its side view with strain gage locations is shown in FIG. 50. A known force $F_6$=445 N at $\alpha_{67}$=0.5 was used to determine the global calibration factor γ, which was 97.5% of its theoretical value. A distributed load was placed within the weight area of $FT_{12BC}$, with the results shown in Table 2.4. The magnitude and position of the resultant force were calculated from the magnitudes and positions of forces $F_5$, $F_6$, and $F_7$ (FIG. 50). The force errors were within 0.8% and the position errors were within 2.3%. The bending moment diagram was calculated using measured strains and compared with the theoretical bending moment diagram for firm rest boundary conditions, for a 1,557 N distributed force at the center of the beam, as shown in FIG. 51.

TABLE 2.2

Calculated magnitudes and positions of a force on the steel beam

| Experimental Force (N) | Experimental $\alpha_{23}$ | Uncalibrated $FT_2$ (N) | Uncalibrated $FT_2$ Error | Calibrated $FT_2$ (N) | Calibrated $FT_2$ Error | Calculated $\alpha_{23}$ | Position Error |
|---|---|---|---|---|---|---|---|
| 445 | 0.10 | 438 | 1.6% | 445 | 0.0% | 0.10 | 0.0% |
| 445 | 0.20 | 440 | 1.1% | 447 | 0.6% | 0.22 | 0.1% |
| 445 | 0.30 | 435 | 2.2% | 442 | 0.6% | 0.31 | 0.0% |
| 445 | 0.40 | 435 | 2.2% | 442 | 0.6% | 0.41 | 0.1% |
| 445 | 0.50 | 438 | 1.6% | 445 | 0.0% | 0.50 | 0.0% |
| 445 | 0.60 | 435 | 2.2% | 442 | 0.6% | 0.60 | 0.0% |
| 445 | 0.70 | 435 | 2.2% | 442 | 0.6% | 0.70 | 0.0% |
| 445 | 0.80 | 438 | 1.6% | 445 | 0.0% | 0.80 | 0.0% |
| 445 | 0.90 | 440 | 1.1% | 447 | 0.6% | 0.90 | 0.0% |

Figure 46:
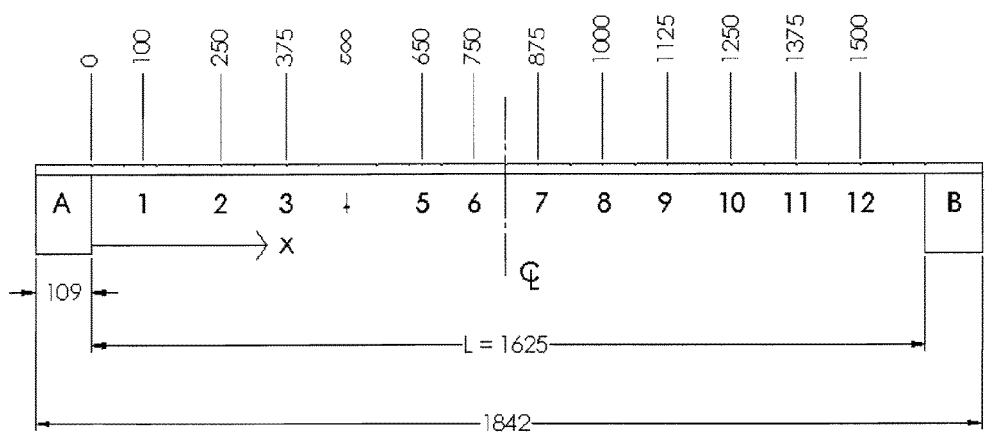
FIG. 46 is a side view of the steel beam in FIG. 40 with 12 numbered strain gage locations.
Figure 47:
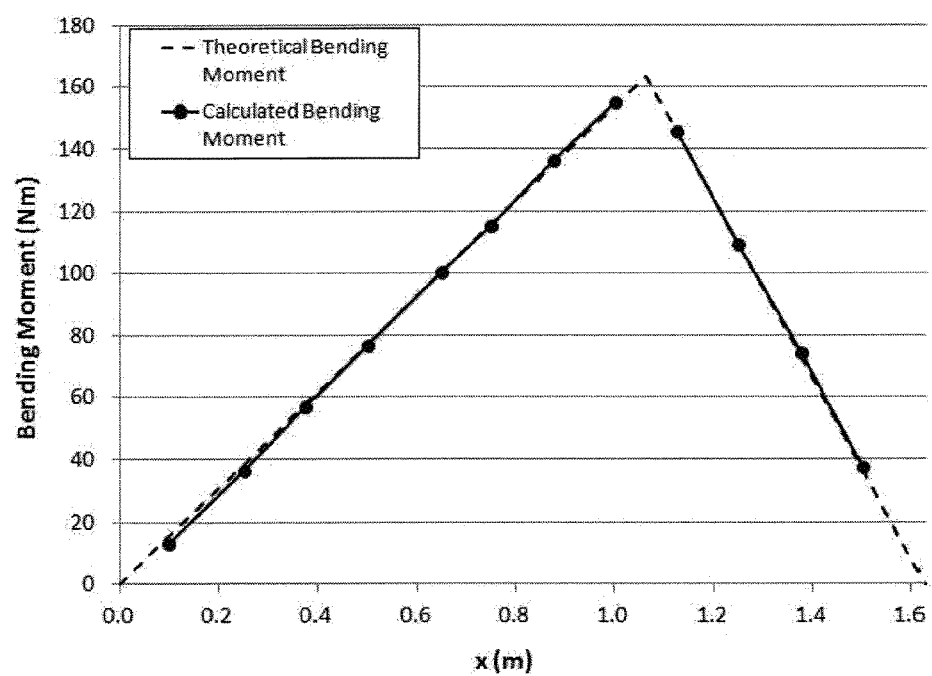
FIG. 47 is a comparison of the theoretical and calculated bending moment diagrams for the beam in FIG. 46.

While the four strain gages in FIG. 44 demonstrated the application of a single force transducer, the beam in FIG. 40 was also used for multiple force transducers, where 12 strain gages were bonded along the bottom surface of the beam as shown in FIG. 46. The adjusted global scaling factor from the single force transducer in FIG. 44 was used, with calculated magnitudes and positions of the forces shown in Table 2.3. The position of a force is the strain gage number n directly to the left of the force added to the corresponding $\alpha_{nj}$. The maximum force error was 3.7%, the maximum zero error was 5.1%, and the maximum position error was 0.6%. The bending moment diagram for a 445 N force at position 8.5 was calculated using measured strains and compared with the theoretical bending moment diagram for the firm rest boundary conditions, as shown in FIG. 47.

TABLE 2.4

Calculated magnitudes and positions of forces for a distributed force within the weight area of $FT_{12BC}$

| Experimental Resultant Force (N) | Experimental $F_5$ (N) | Experimental $F_6$ (N) | Experimental $F_7$ (N) | $FT_{12BC}$ (N) | Force Error $FT_{12BC}$ | Position Error |
|---|---|---|---|---|---|---|
| 1,246 | 400 | 445 | 400 | 1,248 | 0.2% | 2.3% |
| 1,401 | 400 | 601 | 400 | 1,396 | 0.4% | 1.0% |
| 1,557 | 400 | 756 | 400 | 1,544 | 0.8% | 0.6% |

TABLE 2.3

Calculated magnitudes and positions of forces for the beam in FIG. 46

| Experimental Force (N) | Experimental Position | Experimental Position (m) | Calculated Force (N) | Calculated Position (m) | Force Error | Maximum Zero Error | Position Error |
|---|---|---|---|---|---|---|---|
| 445 | 2.50 | 0.313 | 448 | 0.306 | 0.7% | 1.1% | 0.4% |
| 445 | 3.50 | 0.438 | 456 | 0.440 | 2.4% | 2.8% | 0.2% |
| 445 | 4.50 | 0.575 | 455 | 0.575 | 2.4% | 3.4% | 0.0% |
| 445 | 5.50 | 0.700 | 439 | 0.691 | 1.4% | 5.1% | 0.6% |
| 445 | 6.50 | 0.813 | 461 | 0.820 | 3.7% | 4.5% | 0.5% |
| 445 | 7.50 | 0.938 | 455 | 0.931 | 2.2% | 1.8% | 0.4% |
| 445 | 8.50 | 1.063 | 445 | 1.063 | 0.0% | 2.1% | 0.0% |
| 445 | 10.50 | 1.313 | 432 | 1.319 | 2.8% | 3.4% | 0.4% |

Figure 52:
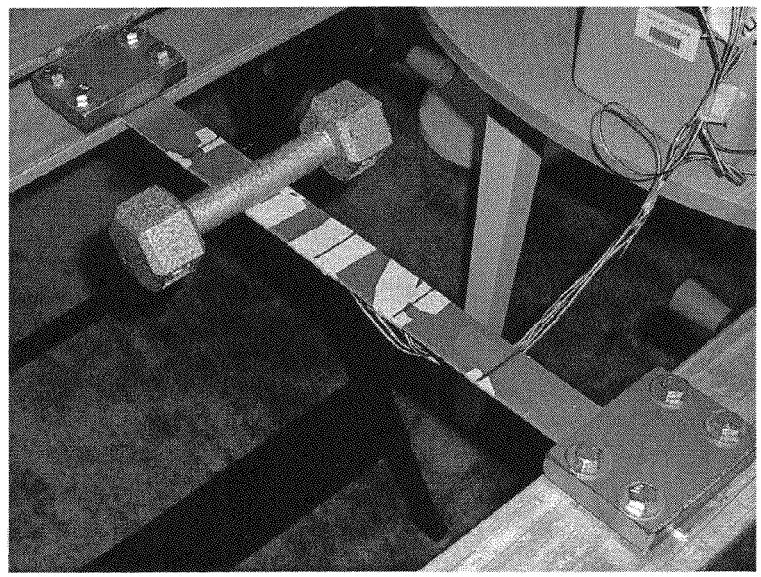
FIG. 52 is a picture of an experimental setup of an aluminum beam with fixed boundary conditions.
Figure 53:
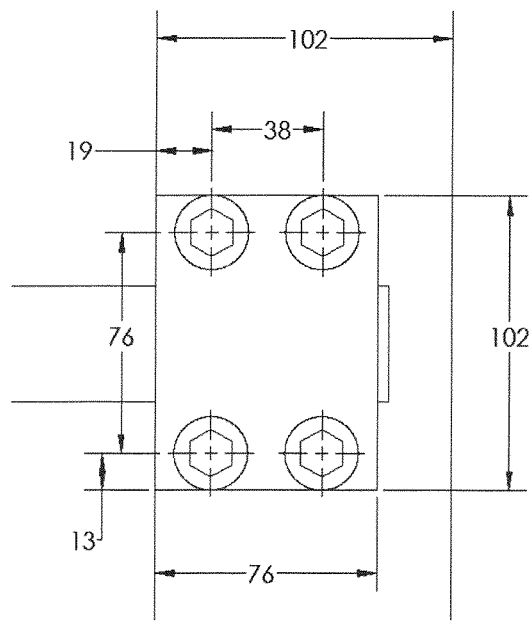
FIG. 53 is a top view of bolted clamp at end abutment for the beam in FIG. 52.
Figure 54:
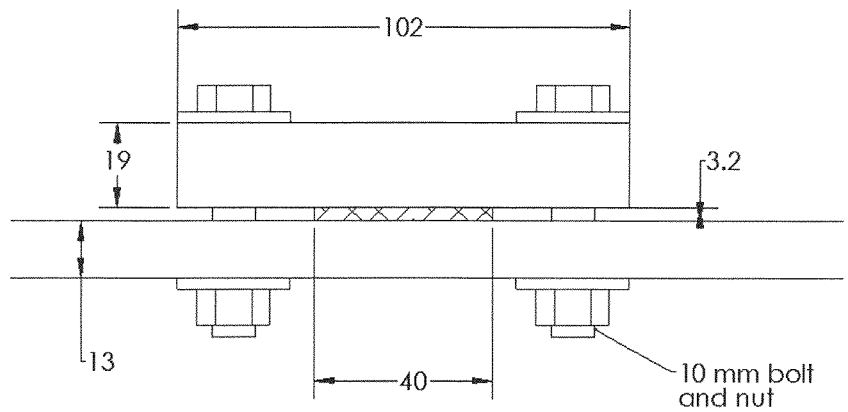
FIG. 54 is an end view showing cross section of the beam in FIG. 52 along with bolted clamp assembly.
Figure 55:
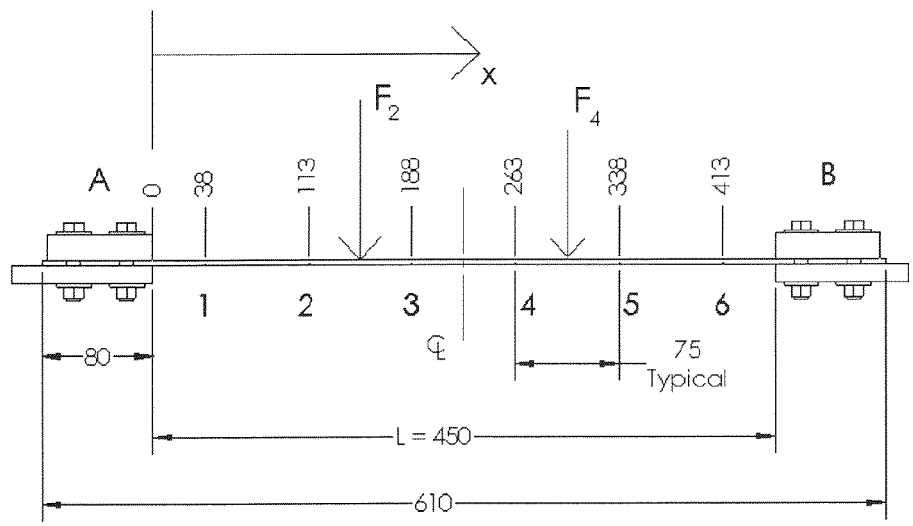
FIG. 55 is a side view of the aluminum beam in FIG. 52 with numbered strain gage locations.

2.3.3 Identifying the Magnitude and Location of a Load on an Aluminum Beam with Firm Rest, Soft Rest, Firm Rest-Fixed, and Fixed Boundary Conditions A quantity of six uniaxial Vishay strain gages (part number CEA-13-250UN-350) were bonded, with equal spacing, along the bottom surface of an aluminum 6061-T6 beam, as shown in FIG. 52, where the fixed boundary conditions were approximated by bolted clamps (FIGS. 53 and 54). A dumbbell was directly placed on the beam. While the deformation of the beam can cause the load to be distributed over a small area, it has been shown in Sec. 2.2.1 that the magnitude of a distributed load within a weight area can be calculated using the same methodology as that for a concentrated load. The cross section of the aluminum beam is 3.2 mm by 40 mm (FIG. 54) and its side view with strain gage locations is shown in FIG. 55. The force transducer $FT_3$ was not used because the load was outside the weight area, but inside the force transducer.

Figure 56:
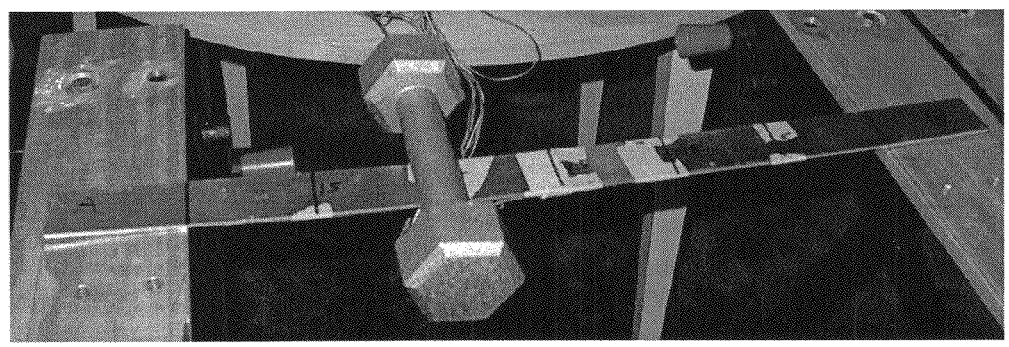
FIG. 56 is a picture of an experimental setup of the aluminum beam with firm rest boundary conditions.
Figure 57:
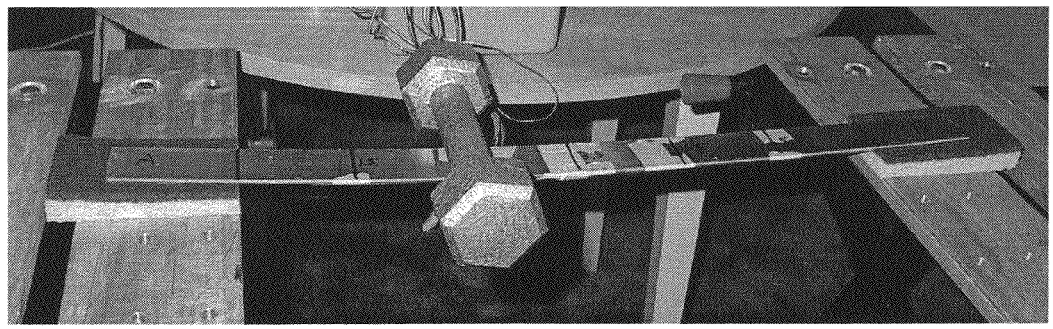
FIG. 57 is a picture of an experimental setup of the aluminum beam with soft rest boundary conditions.
Figure 58:
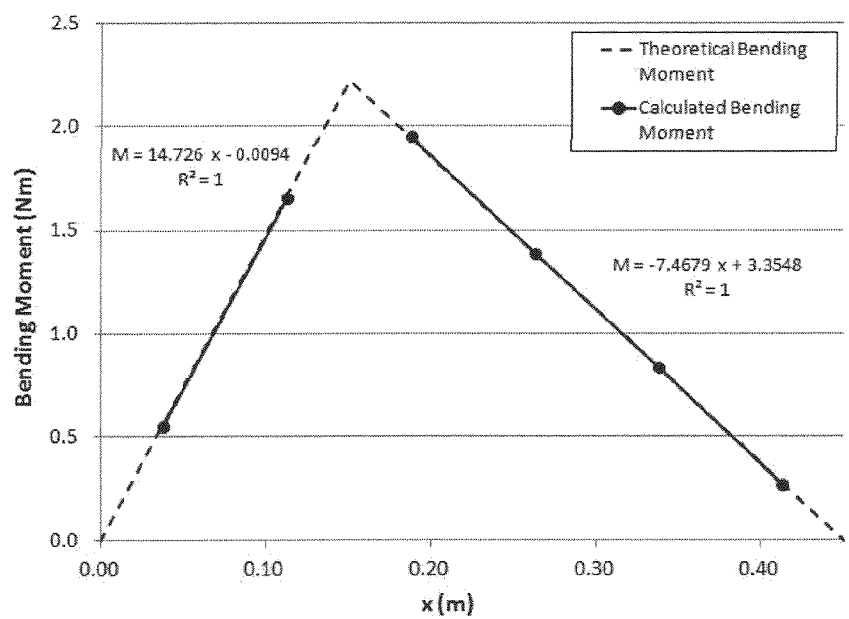
FIG. 58 is a comparison of the theoretical and calculated bending moment diagrams for the beam in FIG. 56 with firm rest boundary conditions.
Figure 59:
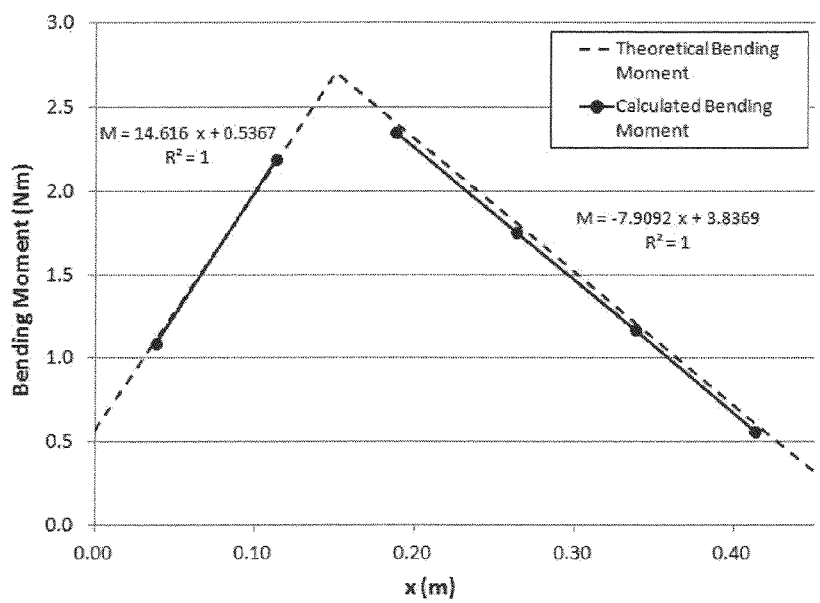
FIG. 59 is a comparison of the theoretical and calculated bending moment diagrams for the beam in FIG. 57 with soft rest boundary conditions.

The beam with firm rest and soft rest boundary conditions is shown in FIGS. 56 and 57, respectively, where sponges were used to simulate the soft rest boundaries. The bending moment diagram was calculated using measured strains and compared with the theoretical bending moment diagram for the firm rest boundary conditions, as shown in FIG. 58. The accuracy of the experimental firm rest boundary conditions can be quantitatively determined from the equations of the calculated left and right bending moment curves. The equations for the curves are determined by adding trend lines to the calculated bending moments using Microsoft Excel, with a reported coefficient of determination $R^2$, where $R^2=1$ indicates a perfect correlation to a line. The equation of the left bending moment curve is $M=R_A x+M_A$, where $M_A=0$ for a firm rest boundary, and that of the right bending moment curve is $M=-R_B x+b_B$, where $b_B=R_B L$ for a firm rest boundary. The equations of the two bending moment curves can be used to calculate the reaction moments $M_A$ and $M_B$ in FIG. 58, which can show whether a rest boundary was a firm rest boundary or a soft rest boundary. The left reaction moment is determined by setting $x=0$ for the left trend line equation, and the right reaction moment is determined by setting $x=L$ for the right trend line equation. The calculated left and right reaction moments are −0.009 Nm and −0.006 Nm, respectively, which are within 0.4% of the largest bending moment value. The calculated $d_A$ from FIG. 2.37 is −0.6 mm; consequently $d_A/D_A=-0.8\%$. The calculated $d_B$ is −0.8 mm; consequently $d_B/D_B=1.0\%$. The discrepancies between the theoretical and calculated bending moments near a boundary indicate that either the boundary was not an ideal boundary or there was a measurement error. Given that the calculated $d_A$ and $d_B$ were negative, the latter was most likely the case. Since the absolute values of $d_A/D_A$ and $d_B/D_B$ were within 1%, the rest boundaries were indeed firm rest boundaries, which can also be seen from FIG. 56, where the beam contacted the aluminum supports at their edges. Similarly, the theoretical and calculated bending moment diagrams for the soft rest boundary conditions are shown in FIG. 59, where evenly distributed reaction forces were assumed for the theoretical bending moment diagram, with $d_A/D_A=d_B/D_B=50\%$. The calculated left reaction moment is 0.537 Nm compared with the theoretical value of 0.569 Nm from Table 2.1. The calculated right reaction moment is 0.278 Nm compared with the theoretical value of 0.319 Nm from Table 2.1. The calculated $d_A/D_A$ and $d_B/D_B$ are 46% and 44%, respectively, which are close to the theoretical values of 50%. A triangular distributed, reaction force with a maximum value at the edge of an abutment would give $d_A/D_A=d_B/D_B=33.3\%$; the experimental boundary conditions were closer to evenly distributed reaction forces.

Figure 60:
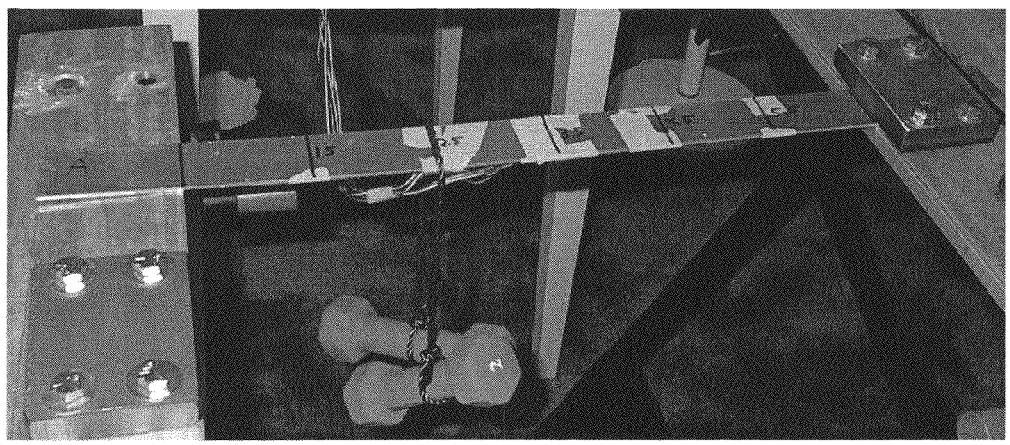
FIG. 60 is a picture of an experimental setup of the aluminum beam with firm rest-fixed boundary conditions.
Figure 61:
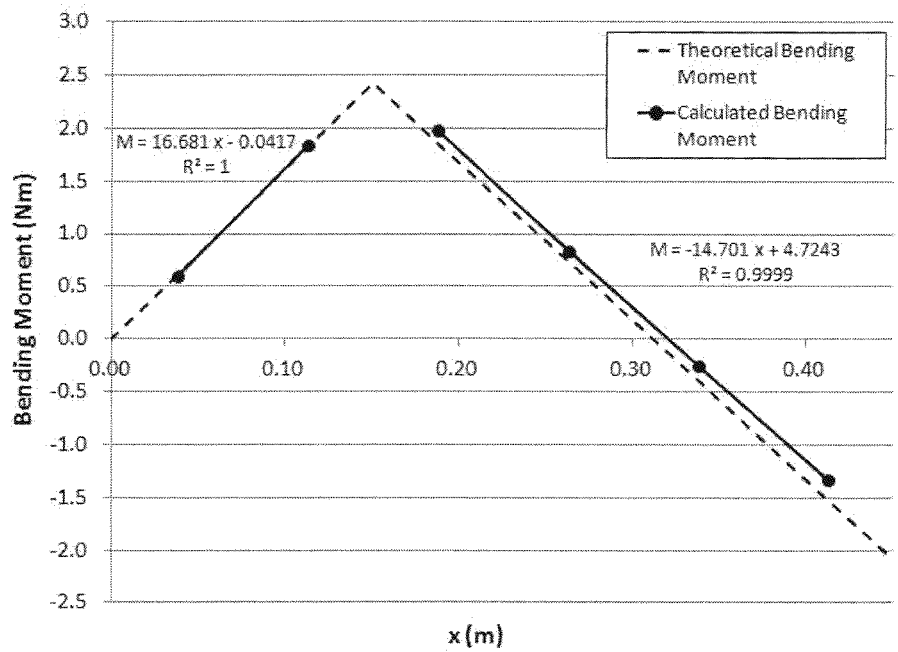
FIG. 61 is a comparison of the theoretical and calculated bending moment diagrams for the beam in FIG. 60 with firm rest-fixed boundary conditions.
Figure 62:
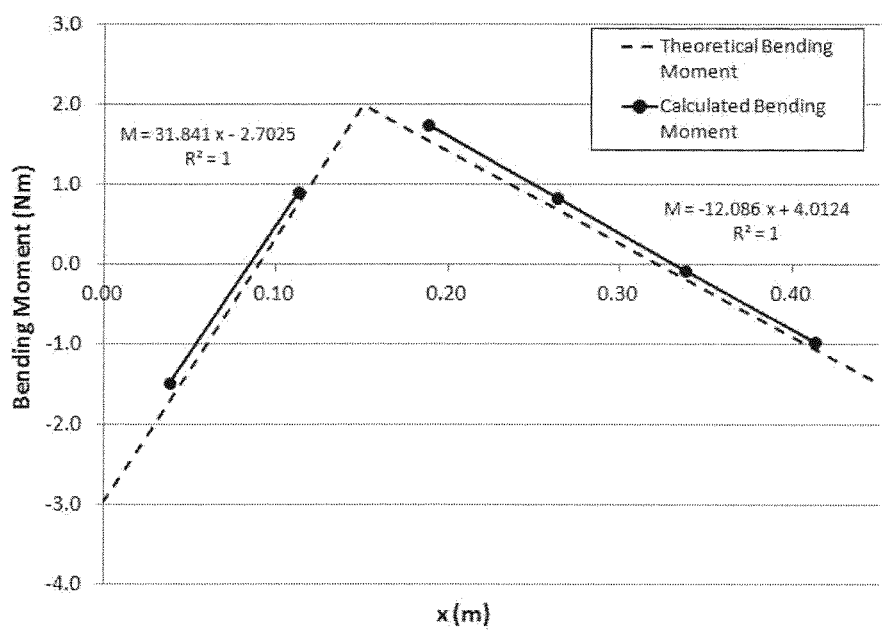
FIG. 62 is a comparison of the theoretical and calculated bending moment diagrams for the beam in FIG. 60 with fixed boundary conditions.

The experimental setup for the firm rest-fixed boundary conditions are shown in FIG. 60. Comparisons of the theoretical and calculated bending moment diagrams for the firm rest-fixed, and fixed boundary conditions are shown in FIGS. 61 and 62, respectively. The bolted clamps for the fixed boundaries were designed to be much larger than the test beam (FIG. 52); negative strains were observed near the fixed boundaries, as expected. The calculated left reaction moment for the firm rest-fixed beam in FIG. 2.40 is −0.04 Nm, which is 0.9% of the largest bending moment value, and the calculated right reaction moment is −1.89 Nm, which is 9.1% lower in magnitude than the reaction moment of the fixed boundary (−2.08 Nm from Table 2.1). The calculated left reaction moment for the fixed beam in FIG. 62 is −2.70 Nm compared to −2.97 Nm for the left fixed boundary from Table 2.1, and the calculated right reaction moment is −1.43 Nm compared to −1.49 Nm for the right fixed boundary from Table 2.1. The discrepancies between the theoretical and calculated reaction moments in FIGS. 61 and 62 indicate that the bolted clamps did not completely apply the theoretical reaction moments. While the errors between the theoretical and calculated bending moments are not directly related to those between the theoretical and calculated magnitudes and positions of the forces, they would affect the accuracy in determining the reaction moments at the boundaries.

The scaling factors for firm rest, soft rest, firm rest-fixed, and fixed boundary conditions were determined by applying a known force $F_4$ at position 4.5, and used to calculate the unknown force $F_2$ at position 2.5. While the scaling factors for the four types of boundary conditions were determined separately for each type of boundary conditions, they were within a tight range of 88.4 to 90.7% of the theoretical γ, showing that the geometric and material properties are independent of the boundary conditions. The calculated magnitudes and positions of the unknown forces are shown in Table 2.5. The errors for the magnitudes of the forces were within 2.3% when the force was inside the weight area of the force transducer $FT_2$. When the force was outside the force transducer $FT_4$, the force transducer output should read zero, and the zero errors were within 2.5%. The position errors were within 2.3%.

TABLE 2.5

Calculated magnitudes and positions of forces on an aluminum beam with four types of boundary conditions

| Boundary Condition | Experimental Force (N) | Experimental Position | $FT_2$ (N) | $FT_2$ Error | $FT_4$ (N) | $FT_4$ Error | Calculated Position | Position Error |
|---|---|---|---|---|---|---|---|---|
| Firm Rest | 8.9 | 2.50 | 8.7 | 2.3% | 0.1 | 0.6% | 2.55 | 0.8% |
| | 13.3 | 2.50 | 13.2 | 1.3% | −0.1 | 0.8% | 2.53 | 0.4% |
| | 17.8 | 2.50 | 17.5 | 1.4% | 0.0 | 0.0% | 2.49 | 0.2% |
| | 22.2 | 2.50 | 22.4 | 0.6% | 0.0 | 0.0% | 2.52 | 0.3% |
| Soft Rest | 8.9 | 2.50 | 8.7 | 1.7% | 0.0 | 0.0% | 2.46 | 0.6% |
| | 13.3 | 2.50 | 13.2 | 1.2% | 0.1 | 0.4% | 2.44 | 1.0% |
| | 17.8 | 2.50 | 17.6 | 1.4% | 0.1 | 0.3% | 2.50 | 0.0% |
| | 22.2 | 2.50 | 22.4 | 0.6% | 0.1 | 0.5% | 2.45 | 0.9% |
| Firm Rest-Fixed | 13.3 | 2.50 | 13.2 | 0.8% | −0.1 | 0.4% | 2.64 | 2.3% |
| | 17.8 | 2.50 | 17.8 | 0.0% | −0.2 | 1.2% | 2.53 | 0.5% |
| | 22.2 | 2.50 | 22.7 | 2.2% | −0.2 | 0.7% | 2.44 | 1.0% |
| | 31.1 | 2.50 | 31.9 | 2.3% | −0.8 | 2.5% | 2.53 | 0.5% |
| Fixed | 31.1 | 2.50 | 31.2 | 0.1% | 0.1 | 0.2% | 2.51 | 0.1% |
| | 35.6 | 2.50 | 35.9 | 0.8% | −0.1 | 0.3% | 2.47 | 0.4% |
| | 40.0 | 2.50 | 40.0 | 0.0% | 0.1 | 0.3% | 2.49 | 0.1% |
| | 44.5 | 2.50 | 43.9 | 1.2% | 0.0 | 0.0% | 2.53 | 0.5% |

Figure 63:
FIG. 63 is a picture of an experimental setup of a continuously tapered aluminum beam with rest boundary conditions.
Figure 64:
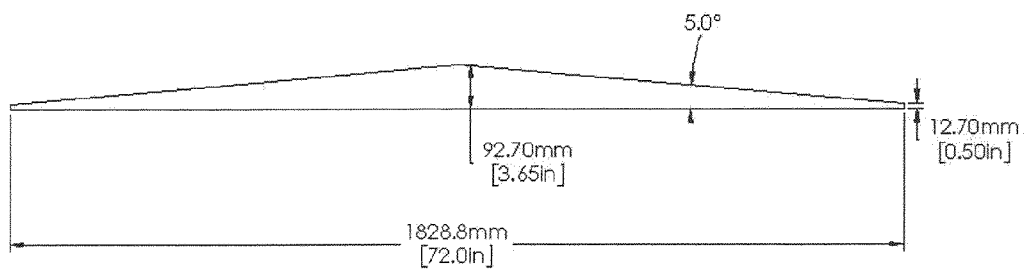
FIG. 64 is a side view of the continuously tapered aluminum beam in FIG. 63.
Figure 65:
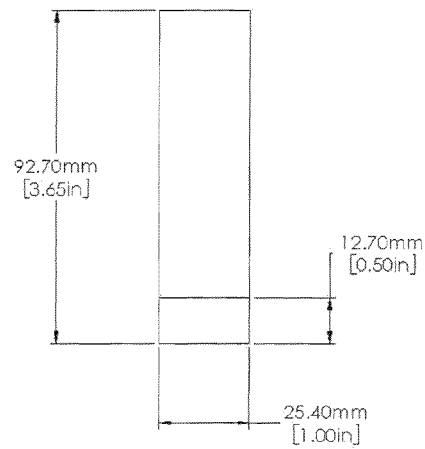
FIG. 65 is an end view of the continuously tapered aluminum beam in FIG. 63.
Figure 66:
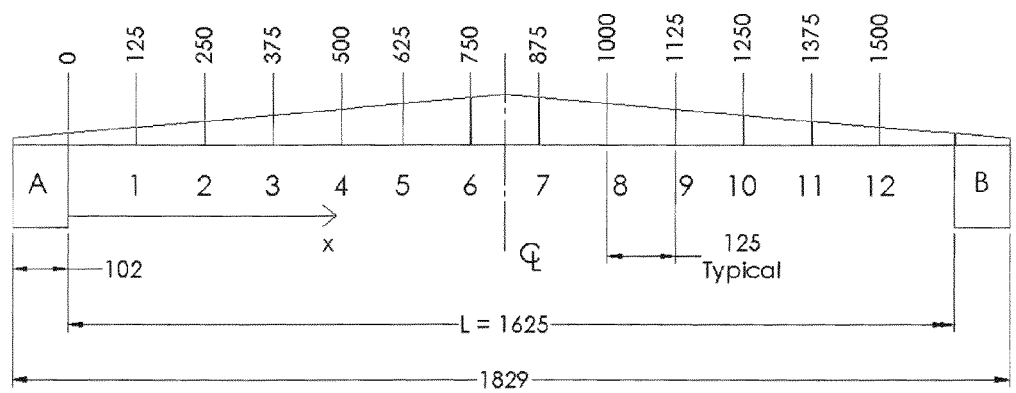
FIG. 66 is a side view of the continuously tapered aluminum beam in FIG. 63 with numbered strain gage locations.

2.3.4 Identifying the Magnitude and Location of a Load on a Continuously Tapered Aluminum Beam with Rest Boundary Conditions A continuously tapered aluminum 6061-T6 beam with rest boundary conditions, is shown in FIG. 63. The beam has a taper angle of 5°, and a width of 25.4 mm as shown in FIGS. 64 and 65. A quantity of 12 uniaxial Vishay strain gages (part number CEA-13-250UN-350) were bonded, with equal spacing, along the bottom surface of the beam, and the strain gage locations are shown in FIG. 66. The hexadecimal numbering system is used, where the force transducer formed by strain gages 9 through 12 is $FT_{9ABC}$ Or $FT_A$. Equation (2.11) was used to calculate the theoretical scaling factor for each strain gage at different positions, which have different cross sections.

The calibration procedure in Sec. 2.2.3 was used, where a known force of 845 N was applied inside the weight areas of all nine possible force transducers. An unknown force of 1,201 N was then applied inside all the weight areas and calculated using the adjusted individual scaling factors determined from the calibration procedure. The theoretical and adjusted scaling factors for all the loading scenarios are shown in Table 2.6; the average force error was reduced from 5.7% to 2.2% after calibration, and the average zero error was reduced from 6.6% to 4.1% after calibration. The adjusted scaling factors ranged from 67 to 100% of their theoretical values.

A possible source of error was hysteresis and/or temperature drift in the beam. After unloading the beam, it sometimes did not return to zero strain. Another possible source of error is the low signal to noise ratio, since the maximum strain gage reading of 626 µε was below the recommended range of 1,000 to 1,500 µε. A third source of error was that the vertical cross sections used for the theoretical scaling factors are not perpendicular to the neutral axes, which is in violation of the Euler-Bernoulli beam theory [21]. The reason that this shape was chosen was to more accurately represent the shapes of army bridges. A fourth source of error was due to horizontal reaction forces at the boundaries that were not considered in the analysis. While the above sources of error arise before calibration, a fifth possible source of error for a continuously tapered beam was that there were many scaling factors; the prismatic beams in Secs. 2.3.1 through 2.3.3 had only one scaling factor. It is observed from Table 2.6 that the highest scaling factor is almost an order of magnitude greater than the lowest scaling factor, which demonstrates the range of applicability of Eq. (2.11) for a continuously tapered beam.

The calibrated magnitudes and positions of the forces from several force transducers are shown in Table 2.7, where the

TABLE 2.6

Theoretical and adjusted scaling factors for the continuously tapered aluminum beam with average force and zero errors

| Strain Gage | 1 | 2 | 3 | 4 | 5 | 6 | 7 | 8 | 9 | 10 | 11 | 12 | Average Force Error | Average Zero Error |
|---|---|---|---|---|---|---|---|---|---|---|---|---|---|---|
| Theoretical | 0.31 | 0.55 | 0.86 | 1.25 | 1.70 | 2.22 | 2.22 | 1.70 | 1.25 | 0.86 | 0.55 | 0.31 | 5.7% | 6.6% |
| Adjusted | 0.25 | 0.52 | 0.81 | 1.21 | 1.60 | 2.21 | 2.22 | 1.69 | 1.23 | 0.80 | 0.47 | 0.27 | 2.2% | 4.1% |

Figure 67:
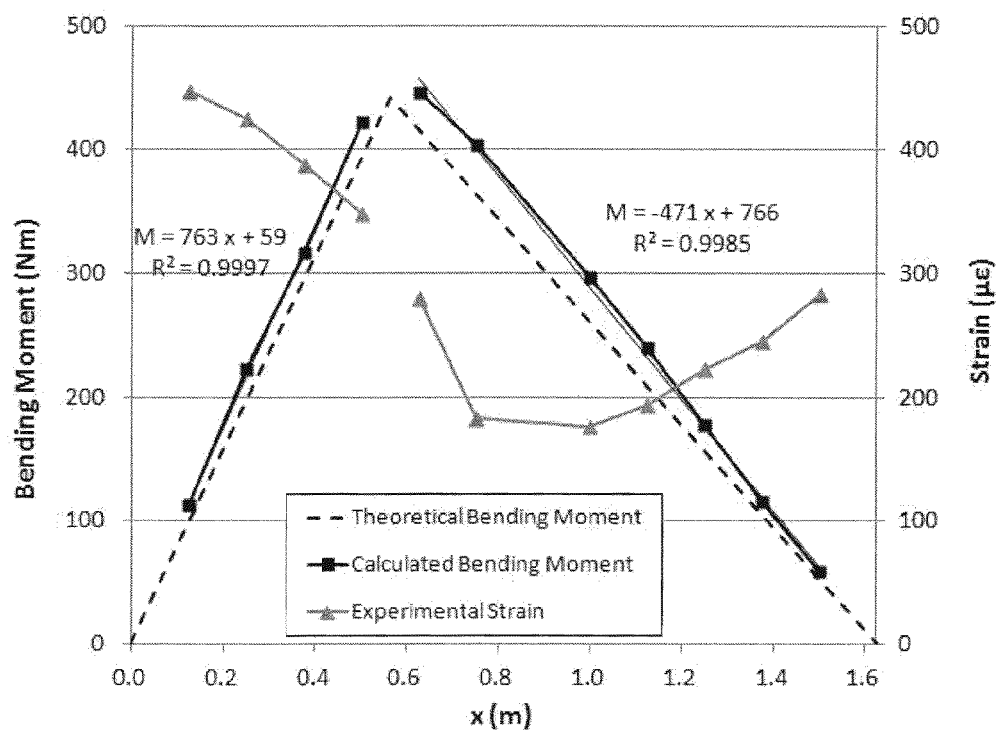
FIG. 67 shows measured strains, the theoretical bending moment diagram, and the calculated bending moment diagram for a 1,201 N force located at position 4.5.

While an experimental strain curve for a 1,201 N force at position 4.5 in FIG. 67 is not a line, after applying Eq. (2.4), the calculated bending moment diagram is similar to the theoretical one for the firm rest boundary conditions. The calculated left and right reaction moments are 13 Nm and 8 Nm, respectively, which are within 2.8% of the largest bending moment value. The calculated $d_A$=16.6 mm with $d_A/D_A$=16.3%, and the calculated $d_B$=19.2 mm with $d_B/D_B$=18.8%, indicate that the boundary conditions were between firm and soft rest boundary conditions. Any discrepancies between the theoretical and calculated bending moments are not necessarily reflective of the errors of the calculated magnitude and position of a force.

force errors were within 4.0%, the zero errors were within 5.7%, and the position errors were within 2.0%. The force error in each row in Table 2.7 corresponds to the error for the force transducer with the force inside its weight area, and the zero error is the maximum error for the remaining force transducers that are expected to read zero. The force transducers with the forces outside the weight areas, but inside the force transducers, were not used and indicated as "N/A" in Table 2.7. Note that the middle two strain gages of a force transducer can be spaced any distance apart and still accurately calculate the magnitude and position of a force, as shown with $FT_{459A}$.

TABLE 2.7

Calculated magnitudes and positions of forces for a continuously tapered aluminum beam

| Experimental Force (N) | Experimental Position | $FT_2$ (N) | $FT_3$ (N) | $FT_4$ (N) | $FT_{459A}$ (N) | $FT_9$ (N) | $FT_A$ (N) | Force Error | Zero Error | Position Error |
|---|---|---|---|---|---|---|---|---|---|---|
| 845 | 2.50 | 850 | N/A | 48 | 42 | 48 | −48 | 0.6% | 5.7% | 0.3% |
| 1,201 | 2.50 | 1,199 | N/A | 45 | 35 | 59 | −60 | 0.1% | 5.0% | 0.1% |
| 845 | 3.50 | N/A | 826 | N/A | 34 | 13 | −5 | 2.3% | 4.1% | 0.2% |
| 1,201 | 3.50 | N/A | 1,211 | N/A | 39 | 41 | −43 | 0.9% | 3.6% | 1.3% |
| 845 | 4.50 | 36 | N/A | 812 | N/A | 15 | −11 | 3.9% | 4.3% | 0.4% |
| 1,201 | 4.50 | 19 | N/A | 1,190 | N/A | 29 | −35 | 0.9% | 2.9% | 0.4% |
| 845 | 5.50 | 42 | −6 | N/A | 879 | 12 | −3 | 4.0% | 5.0% | 1.0% |
| 1,201 | 5.50 | 31 | 13 | N/A | 1,243 | 33 | −26 | 3.5% | 2.8% | 2.0% |
| 845 | 6.50 | −1 | 48 | −6 | 812 | −8 | 16 | 4.0% | 5.6% | 0.6% |
| 1,201 | 6.50 | −16 | 65 | −9 | 1,155 | −22 | 25 | 3.9% | 5.4% | 1.1% |
| 845 | 7.50 | 12 | 21 | −14 | 848 | −29 | 17 | 0.4% | 3.4% | 1.5% |
| 1,201 | 7.50 | −3 | 33 | −9 | 1,203 | −30 | 21 | 0.1% | 2.7% | 1.6% |
| 845 | 8.50 | 3 | 23 | 5 | 813 | N/A | 48 | 3.8% | 5.7% | 0.9% |

TABLE 2.7-continued

Calculated magnitudes and positions of forces for a continuously tapered aluminum beam

| Experimental Force (N) | Experimental Position | $FT_2$ (N) | $FT_3$ (N) | $FT_4$ (N) | $FT_{459.4}$ (N) | $FT_9$ (N) | $FT_4$ (N) | Force Error | Zero Error | Position Error |
|---|---|---|---|---|---|---|---|---|---|---|
| 1,201 | 8.50  |  0 | 33 | −16 | 1,198 | N/A   | 37    | 0.3% | 3.1% | 0.3% |
| 845   | 9.50  |  1 | 22 |   5 | N/A   | 813   | N/A   | 3.8% | 2.6% | 0.9% |
| 1,201 | 9.50  | 12 | 26 | −18 | N/A   | 1,171 | N/A   | 2.5% | 2.2% | 0.8% |
| 845   | 10.50 | 16 | −5 |   6 | 33    | N/A   | 878   | 3.9% | 3.9% | 1.1% |
| 1,201 | 10.50 | 10 | 11 |  −1 | 59    | N/A   | 1,221 | 1.7% | 4.9% | 0.7% |

2.4 Conclusion

A unique method has been developed to identify the magnitude and location of a load on a slender beam that is supported at both ends, using four uniaxial strain gages mounted to the bottom surface of the beam. When the load is located inside the weight area, the magnitude and location of the load can be accurately identified. The force transducer can also identify a zero load outside the force transducer. When the load is outside the weight area, but inside the force transducer, the magnitude of the load can be calculated if its location is known and vice versa. The force transducer methodology can be applied to a distributed load and a combination of concentrated and distributed loads that do not cross a strain gage boundary. While the boundary conditions at the two ends can affect the strain measurements, they do not affect the calculated magnitude and location of a load. The experimental results can be used to determine whether a fixed boundary is an ideal fixed boundary, and whether a rest boundary is a firm rest boundary or a soft rest boundary. A calibration procedure has been developed to globally and individually adjust the scaling factors of the strain gages in calculating the magnitude of a load for prismatic and non-prismatic beams, respectively. Calibration can be performed for the location of a load on a non-homogenous and/or non-prismatic beam, but not on a homogeneous, prismatic beam.

Experiments on a prismatic steel beam with rest boundary conditions, a prismatic aluminum beam with firm rest, soft rest, firm rest-fixed, and fixed boundary conditions, and a continuously tapered aluminum beam with rest boundary conditions validated the force transducer methodology. The force errors were within 3.7% after calibration for the prismatic beams and within 4.0% for the continuously tapered beam. The zero errors were within 5.1% for the prismatic beams and within 5.7% for the continuously tapered beam. The location of the load was accurately calculated with an error within 0.1% for the steel beam with a precise string loading. The locations of the loads for the other cases were within an error of 2.3%.

Chapter 3: Identifying Magnitudes and Locations of Multiple Loads on a Slender Beam Using Strain Gage Based Methods

Abstract

Unique strain gage based methods are developed to identify magnitudes and locations of multiple loads on a slender beam. Four uniaxial strain gages mounted to the bottom surface of the beam create a force transducer capable of identifying the magnitude and location of a load inside the weight area. For the case of multiple loads separated by two or more strain gage locations, uniaxial strain gages forming multiple force transducers can still identify the magnitudes and locations of all the loads. However, this creates an ill-posed problem for loads separated by only one strain gage location. A new method has been developed using two shear gages mounted on the neutral axis of the beam, one on each side of a load, to identify the magnitude of the load in this case. A combination of two uniaxial strain gages and two shear gages, with one uniaxial strain gage and one shear gage at the same location on each side of a load, can be used to identify the location of the load. The strain gage based methods are experimentally validated on a prismatic beam with rest boundary conditions.

3.1 Introduction

The load identification problem is very important to bridge designers since the weights of vehicles that cross a bridge are not always known [2]. Using a structure itself to measure magnitudes and locations of loads is an inverse problem, where the response is measured and the magnitudes and locations of the loads are identified [10]. Many different approaches, such as measurements from accelerations, deflections, and strains, have been used [1-12, 18, 19, 27-31]. Bending moment data from strain gages are less prone to error than deflection data according to a previous study [5]. Likewise, the strain model has been proven better than the acceleration model [12]. For the case of a vehicle crossing a bridge, strain readings from the bridge provide the information to identify the magnitude of the load [3, 4, 9].

It has been previously shown in Chapter 2 that four uniaxial strain gages mounted to the bottom surface of a slender beam can form a force transducer, which can accurately identify the magnitude and location of a single load on the beam [31]. An inverse problem is often ill-posed, where the measurements do not lead to a unique solution [7, 18]. The force transducer methodology is robust enough to pinpoint a desired solution when the load is located inside the weight area, which is defined as a location between the two middle strain gage locations [31]. When the load is a distributed load or a combination of distributed and concentrated loads, the force transducer can identify the magnitude and location of the resultant load. The methodology has been demonstrated for firm rest, soft rest, firm rest-fixed, and fixed boundary conditions as well as on a continuously tapered beam.

The force transducer methodology causes many types of error to cancel out. In the design of a strain gage based transducer, temperature drift usually causes the largest error [26]. Since four uniaxial strain gages are combined to form a force transducer, the temperature drift is negated for the case of a prismatic beam [31]. Another source of error in load identification is inaccurate modeling of the boundary conditions, which is also negated with the methodology [31].

This work extends the single load problem in Ref. [31] to a multiple load problem, since a vehicle always consists of more than one load on the bridge due to multiple axles of the vehicle. Section 3.2.1 examines the theory for the case where there are two or more strain gage locations between two adjacent loads, with the corresponding experimental data shown in Sec. 3.3.1. Section 3.2.2 examines the theory for the case where there is only one strain gage location between two adjacent loads, with the corresponding experimental data shown in Sec. 3.3.2. When there is no strain gage location between two adjacent loads, the magnitude and location of the resultant load can be identified, as indicated in Ref. [31].

Figure 69:
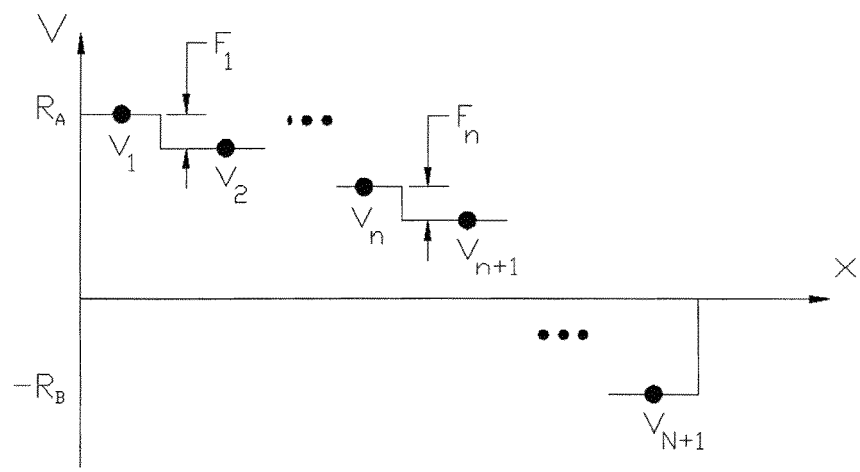
FIG. 69 is a shear force diagram for the beam in FIG. 68.
Figure 70:
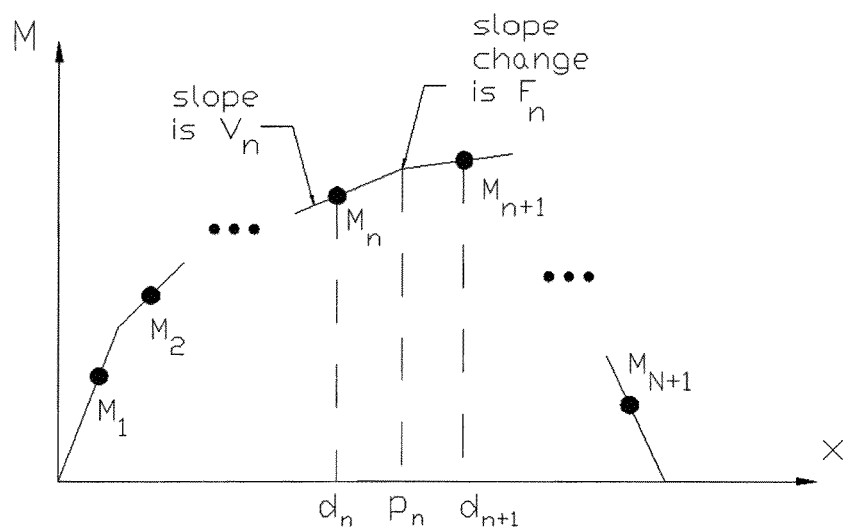
FIG. 70 is a bending moment diagram for the beam in FIG. 68.

3.2 Theory 3.2.1 Identification of Magnitudes and Locations of Loads Separated by Two or More Strain Gage Locations Consider a slender beam with pinned boundary conditions, whose reaction forces at the two boundaries are denoted by $R_A$ and $R_B$, with non-homogeneous material, variable cross sections, and N forces $F_n$ on the beam, where n=1, 2, ..., N, as shown in FIG. 3.1. There are N+1 uniaxial strain gages $\epsilon_n$ mounted to the bottom surface of the beam, where n=1, 2, ..., N+1, with N strain gages immediately to the left of each force and one to the right of the last force. For an Euler-Bernoulli beam, the shear force V (FIG. 69) and the bending moment M (FIG. 70) are related through [21]

$$\frac{dM(x)}{dx} = V(x) \quad (3.1)$$

where x is measured from the left reaction force. Let $V_n$ and $M_n$ be the shear forces and bending moments at the strain gage locations, respectively (FIGS. 69 and 70). Furthermore, the bending moment M is proportional to the strain $\epsilon$ [22]:

$$M = \frac{EI}{y}\varepsilon \quad (3.2)$$

where y is the distance from the neutral axis of the beam to the point where the strain is measured, I is the area moment of inertia of the cross section, and E is the Young's modulus.

Figure 68:
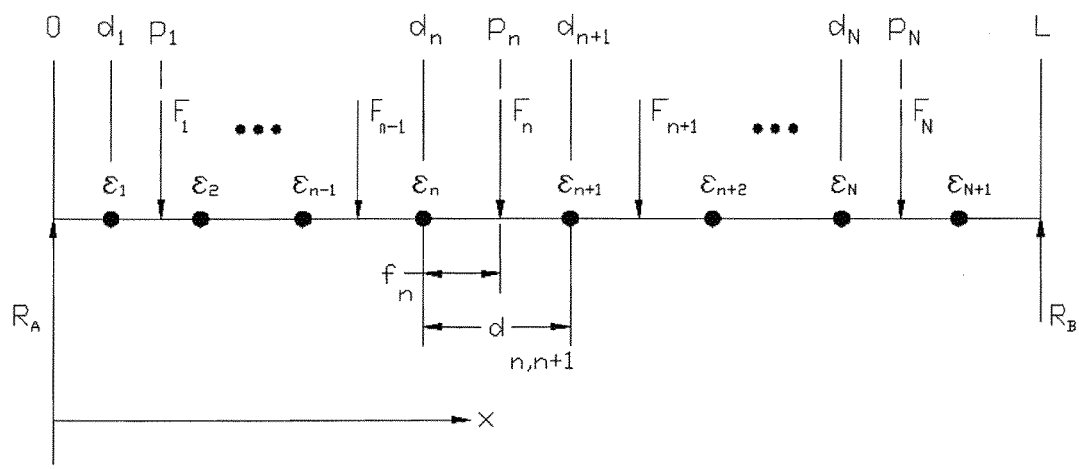
FIG. 68 is a free body diagram of a beam with multiple forces on the beam.

The force transducer $FT_n$ formed by adjacent strain gages $\epsilon_{n-1}$ through $\epsilon_{n+2}$ in FIG. 68 contains the weight area located between strain gages $\epsilon_n$ and $\epsilon_{n+1}$. One can define a scaling factor $\gamma_n$, where n=1, 2, ..., N+1 is the strain gage number, and the corresponding calibration factor $\beta_n$ for each strain gage [31]:

$$\gamma_n = \frac{E_n I_n}{y_n} \quad (3.3)$$

$$\beta_n = \frac{\gamma_n}{d_{nj}} \text{ for } n < j, \beta_n = \frac{\gamma_n}{d_{jn}} \text{ for } n > j \quad (3.4)$$

where j=1, 2, ..., N+1 is also the strain gage number, and $d_{nj}$ or $d_{jn}$ is the distance between adjacent strain gages that are not at the end points of the weight area. By subtracting the slopes of adjacent bending moment curves, the formulation of the force transducer is obtained [31]:

$$FT_n = -\beta_{n-1}\epsilon_{n-1} + \beta_n\epsilon_n + \beta_{n+1}\epsilon_{n+1} - \beta_{n+2}\epsilon_{n+2} \quad (3.5)$$

The relative position $\alpha_{nj}$ of each force measured from the left strain gage in FIG. 3.1 is [31]

$$\alpha_{nj} = \frac{f_n}{d_{nj}} \quad (3.6)$$

When j=n+1, i.e., the strain gages are adjacent to each other, $\alpha_{nj}$ can be denoted by $\alpha_n$. From Eqs. (3.1) and (3.5), the force $F_n$ inside the weight area can be calculated from the force transducer. For the case where the force is outside the weight area, but inside the force transducer, the calculated force varies linearly with the distance between the force and an end point of the weight area [31]. By combining the three forces inside the force transducer, one has [31]

$$FT_n = \alpha_{n-1}F_{n-1} + F_n + (1-\alpha_{n+1})F_{n+1} \quad (3.7)$$

When $F_{n-1} = F_{n+1} = 0$, by Eqs. (3.5) and (3.7), one has $$FT_n = F_n = -\beta_{n-1}\epsilon_{n-1} + \beta\beta_n\epsilon_n + \epsilon_{n+1}\epsilon_{n+1} - \beta_{n+2}\epsilon_{n+2} \quad (3.8)$$

It can be seen from Eq. (3.8) that other forces on the beam do not affect the output of $FT_n$. Hence by extending Eq. (3.8) to multiple force transducers, multiple forces can be calculated from the corresponding equations as long as the forces are separated by two or more uniaxial strain gage locations.

It was shown in Ref. [31] that the position of the force $F_n$ can be calculated when $F_n$ is inside the weight area and the other forces are outside the force transducer $FT_n$, by finding the position of the intersection point of two adjacent bending moment curves:

$$\alpha_n = \frac{d_{n,n+1}(\beta_{n+1}\varepsilon_{n+1} - \beta_{n+2}\varepsilon_{n+2}) + \gamma_{n+1}\varepsilon_{n+1} - \gamma_n\varepsilon_n}{d_{n,n+1}(FT_n)} \quad (3.9)$$

The absolute position of the force $p_n$ can be obtained from the position of the left adjacent strain gage $d_n$ in FIG. 3.1 and Eq. (3.6):

$$p_n = d_n + \alpha_n d_{n,n+1} \quad (3.10)$$

The positions of multiple forces on the beam can be calculated using Eq. (3.10) as long as two uniaxial strain gage locations are on both sides of a force and there are no other forces inside the corresponding force transducer.

It should be noted that the four uniaxial strain gages of a force transducer do not have to be adjacent to each other for Eq. (3.8). Any combination of strain gages $\epsilon_h$, $\epsilon_i$, $\epsilon_j$, and $\epsilon_k$, can form a force transducer:

$$FT_{hijk} = -\varepsilon_h\left(\frac{\gamma_h}{d_{hi}}\right) + \varepsilon_i\left(\frac{\gamma_i}{d_{hi}}\right) + \varepsilon_j\left(\frac{\gamma_j}{d_{jk}}\right) - \varepsilon_k\left(\frac{\gamma_k}{d_{jk}}\right) \quad (3.11)$$

where the subscript of $FT_{hijk}$ is the combination of the strain gage numbers since the strain gages forming the force transducer are not adjacent to each other. For a homogeneous, prismatic beam, $\gamma_h = \gamma_i = \gamma_j = \gamma_k = \gamma$, where $\gamma$ is the global scaling factor for all the strain gages, and Eq. (3.11) becomes $$FT_{hijk} = \gamma\left(\frac{-\varepsilon_h + \varepsilon_i}{d_{hi}} + \frac{\varepsilon_j - \varepsilon_k}{d_{jk}}\right) \quad (3.12)$$

For equal strain gage spacing, $d_{hi} = d_{jk} = d$, and Eq. (3.12) becomes $$FT_{hijk} = \beta(-\epsilon_h + \epsilon_i + \epsilon_j - \epsilon_k) \quad (3.13)$$

where $\beta = \gamma/d$ is the global calibration factor.

Figure 71:
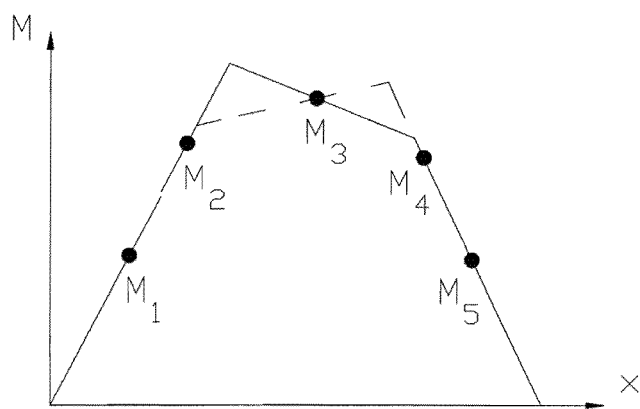
FIG. 71 shows two possible bending moment diagrams for two forces separated by one uniaxial strain gage location, as shown with solid and dashed lines.

3.2.2 Identification of Magnitudes and Locations of Loads Separated by One Strain Gage Location When two loads are separated by only one strain gage location, the methodology in Sec. 3.2.1 is ill-posed. There exists an infinite number of loading scenarios in reconstructing the bending moment diagram; two possible bending moment diagrams are shown in FIG. 71. A force transducer calculates the slopes of two adjacent bending moment curves using two uniaxial strain gages for each curve [31]. The slope of the left bending moment curve in FIG. 71 is calculated with $M_1$ and $M_2$, and the slope of the right bending moment curve is calculated with $M_4$ and $M_5$. However, the slope of the middle bending moment curve in FIG. 71 cannot be calculated, because only one point on the curve $M_3$ is known, and the problem is ill-posed.

Figure 72:
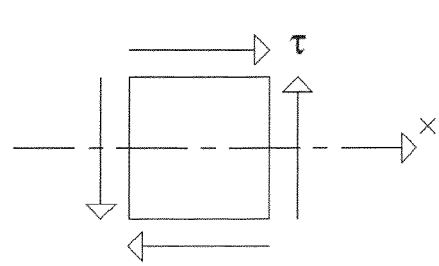
FIG. 72 illustrates a stress element at a 0 degree angle from the x axis.
Figure 73:
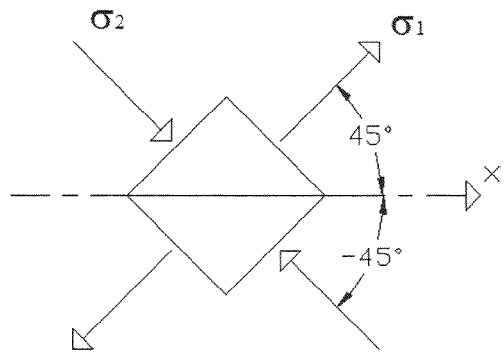
FIG. 73 illustrates a stress element at a 45 degree angle from the x axis.

A uniaxial strain gage mounted to the bottom surface of the beam enables one to calculate the point on the bending moment diagram $M_n$ in FIG. 3.3 from Eq. (3.2). For most beams, the shear stress has the maximum value at the neutral axis, but can deviate from that if the thickness is significantly smaller at other locations [21]. For a stress element that is aligned with the x axis (FIG. 72), when the shear stress has a maximum value, the bending stress vanishes [14]. The shear strain cannot be directly measured, since the stress element under a pure shear stress r does not stretch (FIG. 72) [20]. A shear gage consists of two strain gages mounted at ±45° from the x axis [32]. The two principal stresses, $\sigma_1$ and $\sigma_2$, can be calculated from the measured principal strains, $\epsilon_1$ and $\epsilon_2$, respectively, at this configuration via Mohr's circle, as shown in FIG. 73:

$$\varepsilon_1 = \frac{\sigma_1 - v\sigma_2}{E}, \varepsilon_2 = \frac{\sigma_2 - v\sigma_1}{E} \tag{3.14}$$

$$\sigma_1 = -\sigma_2 = \tau \tag{3.15}$$

where v is the Poisson's ratio.

The shear stress $\tau$ is proportional to the shear force V [21]:

$$\tau = \frac{VQ}{It} \tag{3.16}$$

where Q is the first moment of area, and t is the thickness of the cross section at the point where the shear stress is calculated. The shear gage is mounted on the neutral axis of the beam in order to get a high signal to noise ratio [15]. The shear gage output D is the difference of the two measured strains:

$$D = \epsilon_1 - \epsilon_2 \tag{3.17}$$

By Eqs. (3.14)-(3.17), the shear force V is related to the shear gage output D:

$$V = \left[\frac{EIt}{2Q(1+v)}\right]D \tag{3.18}$$

A shear gage mounted on the neutral axis of the beam enables one to calculate the point on the shear force diagram $V_n$ in FIG. 69 from Eq. (3.18). The magnitude of the force Fn can be obtained from the calculated shear forces to the left and right of the force, $V_n$ and $V_{n+1}$, respectively:

$$F_n = V_n - V_{n+1} \tag{3.19}$$

While the magnitude of the force for this loading scenario can be calculated with two adjacent shear gages, the position of the force can be calculated by also using the two corresponding uniaxial strain gages. FIG. 70 illustrates how the intersection of the bending moment curves' to the left and right of the force $F_n$ gives the position $p_n$. The bending moments $M_n$ and $M_{n+1}$ are calculated using the measurements from the corresponding uniaxial strain gages and Eq. (3.2). The shear forces $V_n$ and $V_{n+1}$, which give the slopes of the left and right bending moment curves, are calculated using the corresponding shear gage measurements and Eq. (3.18). By simultaneously solving the equations for two adjacent bending moment curves, the position $p_n$ of the force $F_n$ can be calculated:

$$p_n = \frac{V_n d_n - V_{n+1} d_{n+1} - M_n + M_{n+1}}{V_n - V_{n+1}} \tag{3.20}$$

The strain gage based methods are independent of the boundary conditions of the beam, as demonstrated for the case of a single load on a beam with pinned, firm rest, soft rest, pinned-fixed, and fixed boundary conditions [31]. This is the case because the difference between the slopes of the bending moment curves to the right and left of the position $p_n$ of the force $F_n$ in FIG. 70 is not affected by other forces. Changes in the boundary conditions do not affect load identification just as the other loads on the beam do not either.

Figure 74:
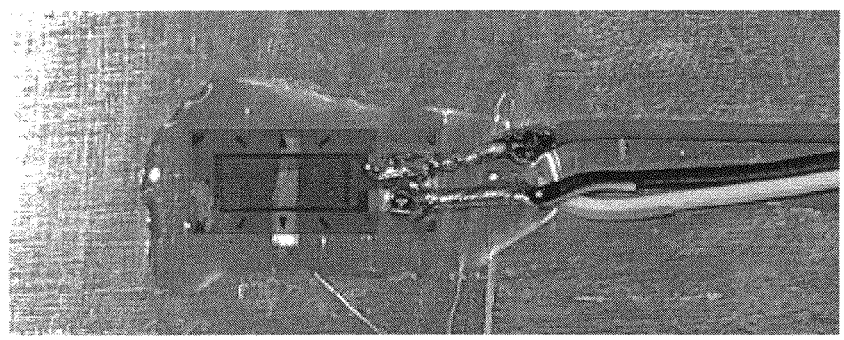
FIG. 74 is a picture of a uniaxial strain gage mounted on the bottom surface of a beam.
Figure 75:
FIG. 75 is a picture of an experimental setup of an aluminum beam with rest boundary conditions.
Figure 76:
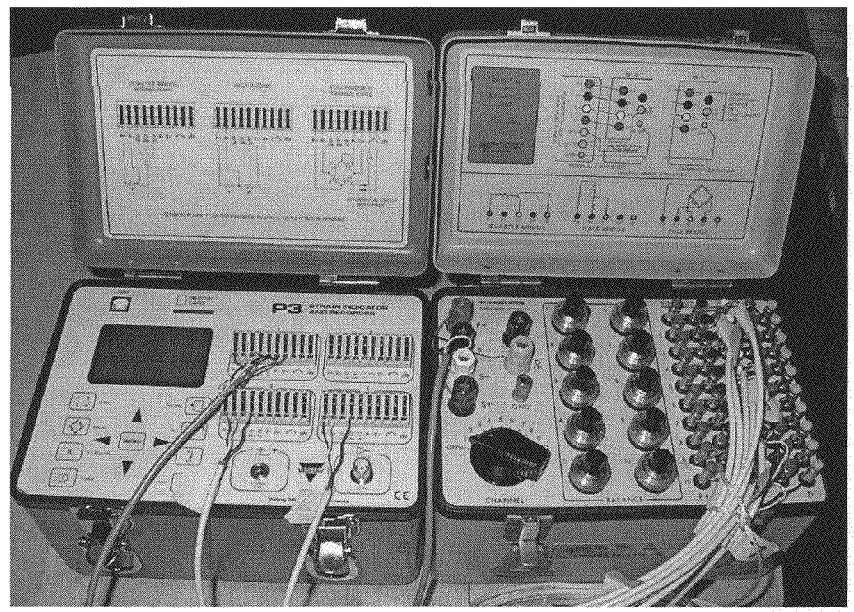
FIG. 76 is a picture of a Vishay P3 strain indicator (left) and a Vishay SB-10 switch unit (right)
Figure 77:
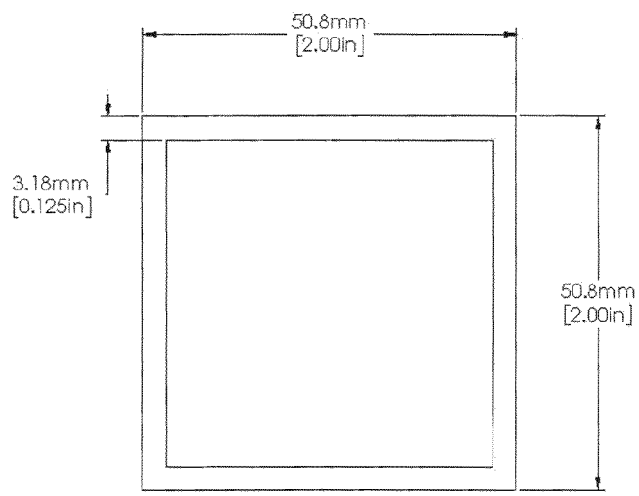
FIG. 77 is a cross section of the aluminum beam in FIG. 75.
Figure 78:
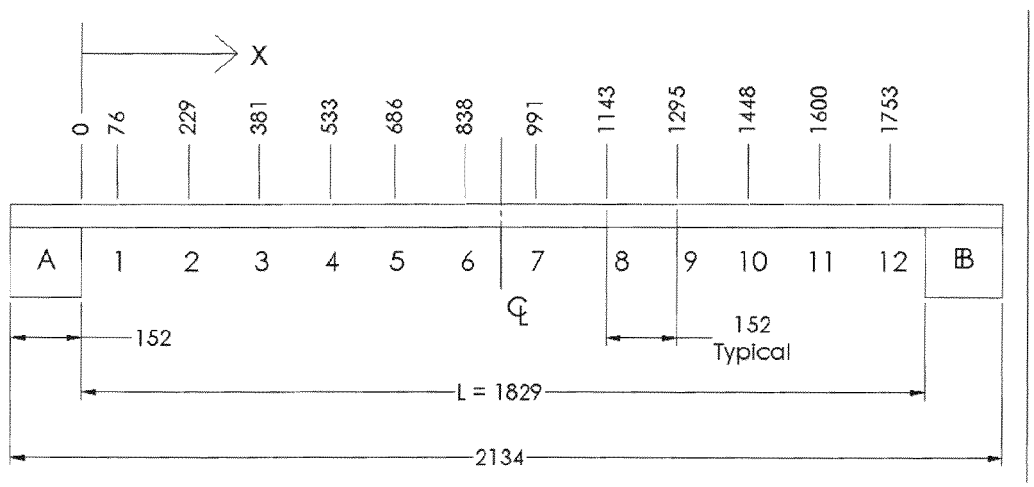
FIG. 78 is a side view of the aluminum beam in FIG. 75 with numbered strain gage locations.

3.3 Experimental Results 3.3.1 Identification of Magnitudes and Locations of Loads Separated by Two Strain Gage Locations on an Aluminum Beam A quantity of 12 uniaxial Vishay strain gages (part number CEA-13-250UN-350, FIG. 74) was bonded, with equal spacing, along the bottom surface of an aluminum 6061-T6 beam with rest boundary conditions, as shown in FIG. 75. A Vishay P3 strain indicator and a Vishay SB-10 switch unit were used to display the strain gage outputs (FIG. 76). The loads were applied via dumbbells, whose nominal weights were within 1.2% of their actual values. The cross section of the beam is a 50.8 mm square box with a 3.2 mm wall thickness (FIG. 77), and its side view with strain gage locations is shown in FIG. 78.

The position of a force $F_n$ is the strain gage number n directly to the left of the force added to the corresponding $\alpha_n$. The hexadecimal numbering system is used, where the force transducer formed by uniaxial strain gages 9 through 12 is $FT_{9ABC}$ or $FT_A$. The calibration procedure in Chapter 2 was used, where a known force was placed in each weight area and all the strains were recorded. The errors between the experimental and calculated magnitudes of the forces inside the weight areas of the force transducers are referred to as the force errors, and the errors for the force transducers with the forces outside the force transducers, are referred to as the zero errors. The Microsoft Excel Solver was used to reduce the maximum force and zero errors by changing β with the constraint β>0. The beam was then loaded with two unknown forces, each weighing 222 N, placed inside various weight areas, separated by two or more strain gage locations, and the force transducer results from the adjusted β are shown in Table 3.1. The adjusted global calibration factor was 93% of the theoretical global calibration factor. The force transducers with the forces outside the weight areas, but inside the force transducers, were not used and indicated as "N/A" in Table 3.1. The force errors were within 12.3% before calibration and reduced to within 4.3% after calibration. The zero errors were within 2.6% after calibration. The position errors defined by $|\Delta p_n|/L$, where L is the span of the beam, as shown in FIG. 78, were within 1.1% after calibration. The main source of error is the low signal to noise ratio, since the maximum strain gage reading of 269 pr was below the recommended range of 1,000 to 1,500 µε for a strain gage reading [15]. Another possible cause of error was that the multiple load problem is more sensitive to response error than the single load problem [5].

uniaxial strain gages and the shear gages, the positions of the forces were calculated from Eq. (3.20), with the calibrated position errors within 1.0%, as shown in Table 3.3. Compari-

TABLE 3.1

Calculated magnitudes and positions of two 222 N forces on the aluminum beam

| Experimental Positions | $FT_3$ (N) | $FT_5$ (N) | $FT_6$ (N) | $FT_7$ (N) | $FT_8$ (N) | $FT_9$ (N) | $FT_4$ (N) | Maximum Force Error | Maximum Zero Error | Maximum Position Error |
|---|---|---|---|---|---|---|---|---|---|---|
| 3.5 & 5.5 | 213 | 232 | N/A | −4 | 8 | 0 | 0 | 4.3% | 1.7% | 0.8% |
| 3.5 & 6.5 | 217 | N/A | 213 | N/A | 4 | 4 | −4 | 4.3% | 0.9% | 0.3% |
| 3.5 & 7.5 | 224 | 0 | N/A | 224 | N/A | −8 | 0 | 0.9% | 1.7% | 1.1% |
| 3.5 & 8.5 | 217 | 4 | −11 | N/A | 232 | N/A | −4 | 4.3% | 0.9% | 0.5% |
| 3.5 & 9.5 | 221 | 8 | −11 | −4 | N/A | 213 | N/A | 0.9% | 2.6% | 0.6% |
| 3.5 & 10.5 | 221 | 0 | −11 | 4 | 4 | N/A | 221 | 0.9% | 2.6% | 0.6% |

Figure 79:
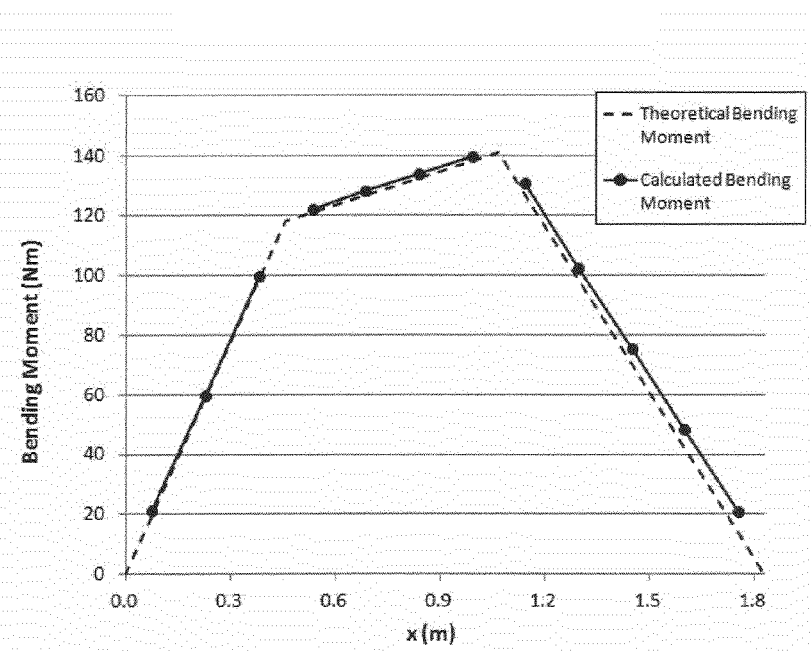
FIG. 79 is a comparison of the theoretical and calculated bending moment diagrams for the beam in FIG. 75.

A comparison of the theoretical and calculated bending moment diagrams for two 222 N forces at positions 3.5 and 7.5, are shown in FIG. 79, where a rest boundary is assumed to be a firm rest boundary for the theoretical bending moment. The discrepancies between the theoretical and calculated bending moment diagrams can indicate that either a rest boundary was not an ideal firm rest boundary or there was a small measurement error for the span of the beam. The errors between the theoretical and calculated bending moments are not directly related to those between the theoretical and calculated magnitudes and positions of the forces.

Figure 80:
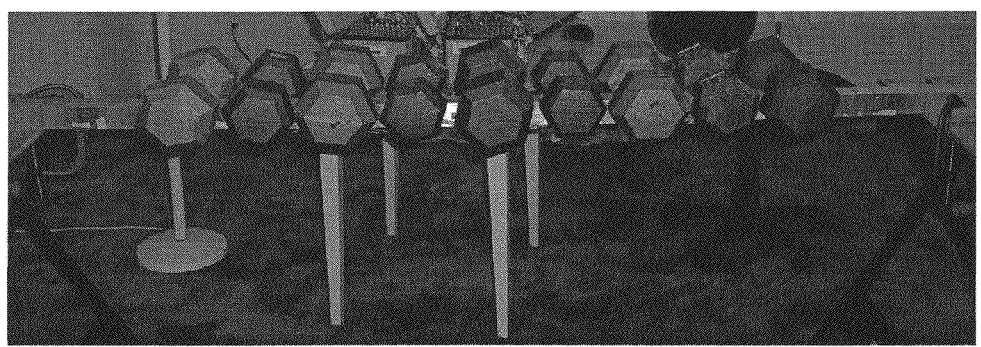
FIG. 80 is a picture of an experimental setup of nine forces on the aluminum beam.
Figure 81:
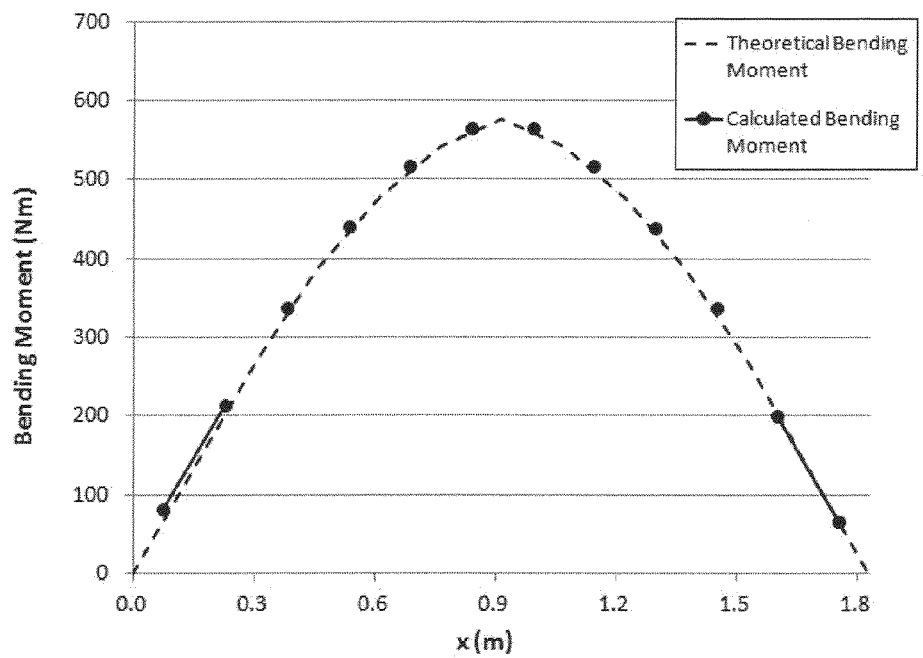
FIG. 81 is a comparison of the theoretical and calculated bending moment diagrams for the beam in FIG. 80.

The beam was also loaded with nine weights totaling 1,779 N, as shown in FIG. 80. One can calculate the magnitude and position of the resultant force on the beam using the force transducer $FT_{12BC}$. The calculated magnitude of the resultant force was 1,768 N, which had a 0.6% error. The calculated position of the resultant force had a 3.7% error. A potential application of this methodology is to identify the longitudinal center of gravity of a vehicle on a bridge. Another potential application is to identify the weight and longitudinal center of gravity of a payload on a bed of a truck or trailer by measuring strains on the frame of the truck or trailer. The theoretical and calculated bending moment diagrams are shown in FIG. 81. The theoretical bending moment curve approaches a parabola as one would expect for a distributed load on a beam. The calculated bending moments are close to the theoretical ones.

Figure 82:
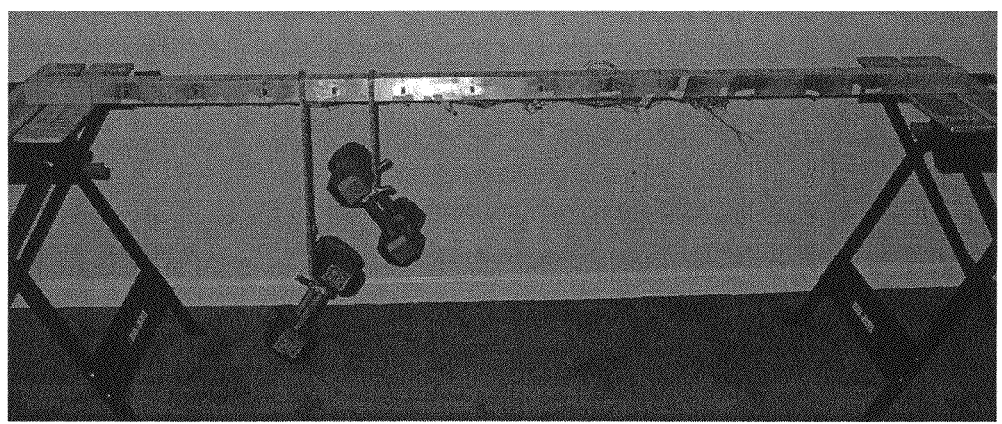
FIG. 82 is a picture of an experimental setup of two forces on the aluminum beam in FIG. 75 separated by one strain gage location.
Figure 83:
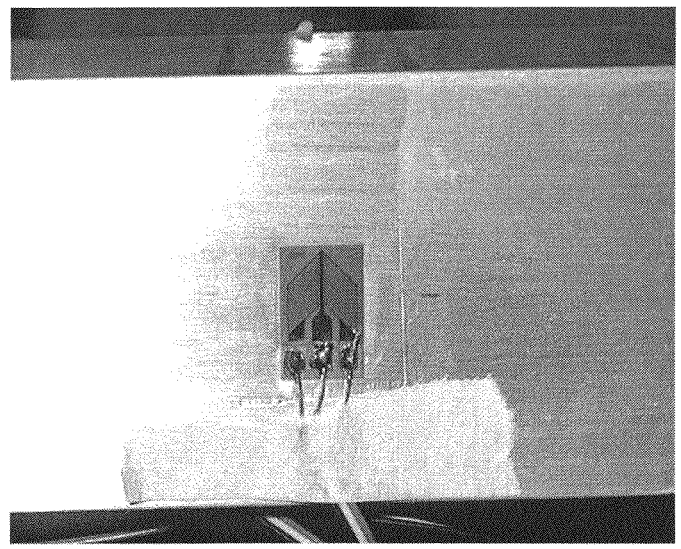
FIG. 83 is a picture of a shear gage mounted on the neutral axis of the aluminum beam in FIG. 82.
Figure 84:
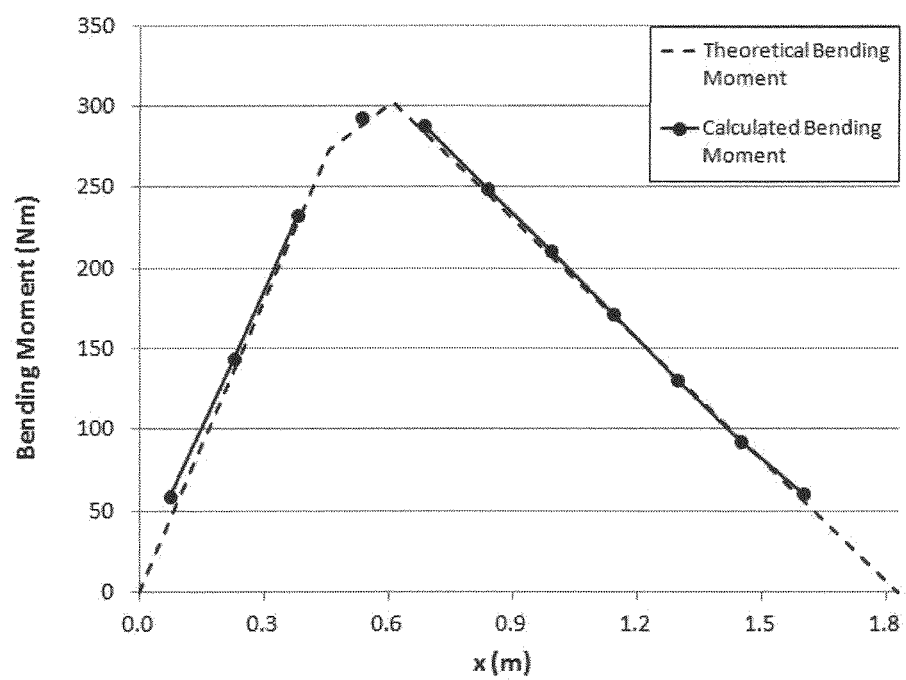
FIG. 84 is a comparison of the theoretical and calculated bending moment diagrams for the case in Sec. 3.3.2.
Figure 85:
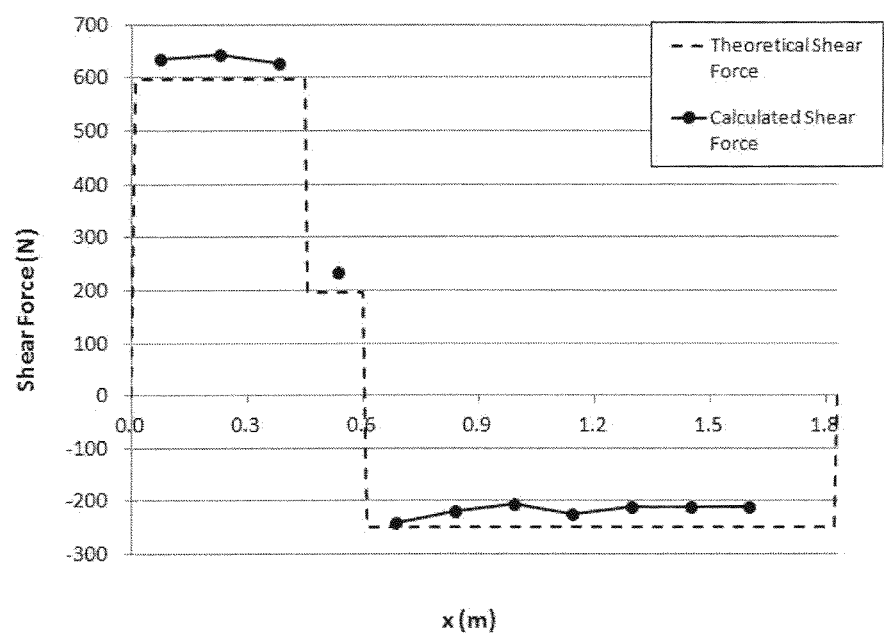
FIG. 85 is a comparison of the theoretical and calculated shear force diagrams for the case in Sec. 3.3.2.

3.3.2 Identification of Magnitudes and Locations of Loads Separated by One Strain Gage Location on the Aluminum Beam A quantity of 12 Vishay shear gages (part number CEA-13-187UV-350) was bonded along the neutral axis of the beam in FIG. 75 (FIG. 82), at the same x locations as the uniaxial strain gages as shown in FIG. 78; a close-up view of a shear gage is shown in FIG. 83. Calibration was performed similar to the case in Sec. 3.3.1, where a single known force was placed inside various weight areas and the maximum force and zero errors were minimized. In this case, the global calibration factors for both the uniaxial and shear gages were adjusted. The adjusted global calibration factors were 93% and 101% of the theoretical global calibration factors for the uniaxial strain gages and shear gages, respectively. The beam was then loaded by two unknown forces at various positions (FIG. 82), with one uniaxial strain gage and one shear gage at the same location between adjacent forces including the reaction forces. Equation (3.19) was used to calculate the magnitudes of the forces using the shear gages, as shown in Table 3.2. The calibrated force errors were within 6.3% and the calibrated zero errors were within 5.0%. By using both the sons of the theoretical and calculated bending moment and shear force diagrams are shown in FIGS. 84 and 85, respectively. Any discrepancies between the theoretical and calculated bending moments do not affect the load identification methodology.

TABLE 3.2

Calculated magnitudes of two forces on the aluminum beam using shear gages

| F = 400 N at Position #1 | F = 445 N at Position #2 | $F_1$ (N) | $F_2$ (N) | $F_3$ (N) | $F_4$ (N) | $F_5$ (N) | $F_6$ (N) | Maximum Force Error | Maximum Zero Error |
|---|---|---|---|---|---|---|---|---|---|
| 1.25 | 2.50 | 395 | 466 | −14 | 14 | −14 | −7 | 4.8% | 1.7% |
| 1.50 | 2.50 | 395 | 466 | −14 | 28 | −21 | −14 | 4.8% | 3.3% |
| 1.75 | 2.50 | 388 | 466 | −7 | 28 | −21 | −14 | 4.8% | 3.3% |
| 3.25 | 4.50 | −21 | 21 | 388 | 473 | −21 | −14 | 6.3% | 3.3% |
| 3.50 | 4.50 | −7 | 14 | 395 | 473 | −21 | −14 | 6.3% | 2.5% |
| 3.75 | 4.50 | −14 | 14 | 388 | 466 | −14 | −14 | 4.8% | 2.5% |
| 5.25 | 6.50 | 0 | 7 | −14 | 28 | 388 | 445 | 3.0% | 4.2% |
| 5.50 | 6.50 | 0 | 7 | −14 | 35 | 381 | 452 | 4.8% | 4.2% |
| 5.75 | 6.50 | 0 | 0 | −7 | 35 | 395 | 438 | 1.6% | 5.0% |

TABLE 3.3

Calculated positions of two forces on the aluminum beam using uniaxial strain gages and shear gages

| Experimental Position #1 | Experimental Position #2 | Calculated Position #1 | Calculated Position #2 | Maximum Position Error |
|---|---|---|---|---|
| 1.25 | 2.50 | 1.27 | 2.48 | 0.1% |
| 1.50 | 2.50 | 1.45 | 2.46 | 0.4% |
| 1.75 | 2.50 | 1.68 | 2.45 | 0.6% |
| 3.25 | 4.50 | 3.13 | 4.45 | 1.0% |
| 3.50 | 4.50 | 3.41 | 4.45 | 0.7% |
| 3.75 | 4.50 | 3.65 | 4.43 | 0.8% |
| 5.25 | 6.50 | 5.14 | 6.41 | 0.9% |
| 5.50 | 6.50 | 5.40 | 6.42 | 0.8% |
| 5.75 | 6.50 | 5.68 | 6.43 | 0.6% |

3.4 Conclusion

The strain gage based force transducer methodology in Chapter 2 has been extended to the case of multiple loads on a slender beam. When the loads are separated by two or more strain gage locations, multiple force transducers, each consisting of four uniaxial strain gages mounted to the bottom surface of the beam, can identify the magnitudes and locations of the loads. Each force transducer can also identify a zero load when the loads on the beam are located outside the force transducer. When the loads are separated by one strain gage location, the problem is ill-posed since many solutions exist for the calculated bending moment diagram. However, with two shear gages, one on each side of a load, the magnitude of the load can be identified. When the uniaxial strain gages at the corresponding locations are also used, the position of the load can be identified. When multiple loads are located inside the weight area of a force transducer, the magnitude and location of the resultant load can be identified. The strain gage based methods are independent of the boundary conditions of the beam.

Experiments were performed on a prismatic aluminum beam with rest boundary conditions. For the case of two loads separated by two or more strain gage locations, the force errors were within 4.3% after calibration, the zero errors were within 6.3%, and the errors for the relative locations of the loads were within 1.1%. For the case of two loads separated by one strain gage location, the force errors were within 6.3% after calibration, the zero errors were within 5.0%, and the errors for the relative locations of the loads were within 1.0%.

Chapter 4: Identifying Magnitudes and Locations of Loads on Slender Beams with Welded and Bolted Joints Using a Strain Gage Based Force Transducer with Application to a Portable Army Bridge Abstract A strain gage based force transducer has been developed to identify magnitudes and locations of loads on non-continuous slender beams with welded and bolted joints. The slopes of the bending moment curves on the two sides of a load are calculated from measured strains on a beam. Four uniaxial strain gages are mounted to the bottom surface of the beam, with two strain gages on each side of the load. A calibration method developed earlier can be used to account for the discrepancies between the theoretical and actual scaling factors arising from stress concentrations and unpredictable stress patterns in the beams due to the presence of the joints. The force transducer methodology is experimentally validated on a continuously tapered aluminum beam with a series of welded joints, an aluminum beam with a constant cross section and a bolted joint, a half aluminum and half steel beam with two different cross sections and a bolted joint, and a full scale portable army bridge at the US Army Aberdeen Test Center.

4.1 Introduction

Knowing the gross weight of a vehicle that cross a bridge is important in calculating its fatigue life when designing commercial or military bridges [3]. It is often impractical to obtain this information from directly instrumented vehicles [2]. Hence it is better practice to instrument a bridge via strain gages and calculate the input loads from the inverse problem [1-4, 7-9]. The fatigue design load, which is the vehicle weight multiplied by an impact factor, is an important value when designing portable army bridges [24]. A load identification method should not only determine the static weight of a vehicle, but also the dynamic interaction between the vehicle and the bridge.

A methodology to determine the magnitudes and locations of single and multiple loads on slender beams has been developed by the authors using strain gage based methods [31, 33]. It has been experimentally demonstrated on continuous beams with constant cross sections and a continuously tapered beam. It has also been demonstrated on beams with different boundary conditions [31]. While the theory has been proven robust for single and multiple loads for various continuous beams with different boundary conditions, a commercial or military bridge is rarely made from a constant extrusion, and it would have many welded and bolted joints [34].

This paper examines the applications of the strain gage based force transducer methodology in Ref. [31] to various laboratory beams with welded and bolted joints as well as a full scale portable army bridge. Section 4.2.1 describes how the strain gage based force transducer methodology is applied to a non-continuous slender beam, and Sec. 4.2.2 describes the calibration procedure. The experimental results for a continuously tapered aluminum beam with a series of welded joints are shown in Sec. 4.3.1. The experimental results for an aluminum beam, and a half aluminum and half steel beam, with bolted joints at the centers of the beams, are shown in Secs. 4.3.2 and 4.3.3, respectively. Section 4.3.4 shows the application of the strain gage based force transducer methodology to a full scale portable army bridge at the US Army Aberdeen Test Center.

Figure 86:
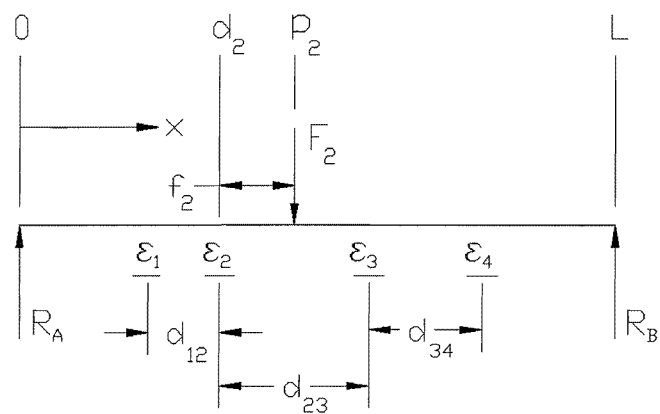
FIG. 86 shows a free body diagram of a non-continuous beam with pinned boundary conditions and two strain gages on each side of the force F2.

4.2 Theory 4.2.1 Identification of the Magnitude and Location of a Load on a Non-Continuous Slender Beam Consider a non-continuous slender beam with pinned boundaries, where the reaction forces are denoted by $R_A$ and $R_B$, non-homogeneous material, variable cross sections, and a force $F_2$ on the beam, as shown in FIG. 86. There can be one or more welded and/or bolted joints in the beam, and it is assumed that the beam behaves linearly in its response. A strain gage based force transducer, consisting of four uniaxial strain gages, with two strain gages on each side of the force $F_2$, is used to accurately identify the magnitude and position of the force when the force is located inside the weight area of the force transducer, which is a location between the two middle strain gages [31]. The force $F_2$ can be a concentrated force, a distributed force of any shape, or a combination of concentrated and distributed forces with the resultant force being $F_2$. For an Euler-Bernoulli beam, the shear force V and the bending moment M are related through [22]

$$\frac{dM(x)}{dx} = V(x) \tag{4.1}$$

where x is measured from the left reaction force. Furthermore, the bending moment M is proportional to the strain $\epsilon$ [23, 25, 35, 36]:

$$M = k\frac{EI}{y}\varepsilon \tag{4.2}$$

where y is the distance from the neutral axis of the beam to the point where the strain is measured, I is the area moment of inertia of the cross section, E is the Young's modulus, and k an unknown constant that changes the bending moment and strain relationship from that of a continuous beam due to the presence of the joints. The constant k depends on the geometric and material properties of the beam and the joints, and the locations of the joints relative to where the strain is measured. It can also depend on the bolt torque T, which is proportional to the tensile load in a bolt P [37]:

$$T = K\Phi P \tag{4.3}$$

where K ranges from 0.1 to 0.2, depending on bolt lubrication and the pitch, and $\Phi$ is the major bolt diameter.

Figure 87:
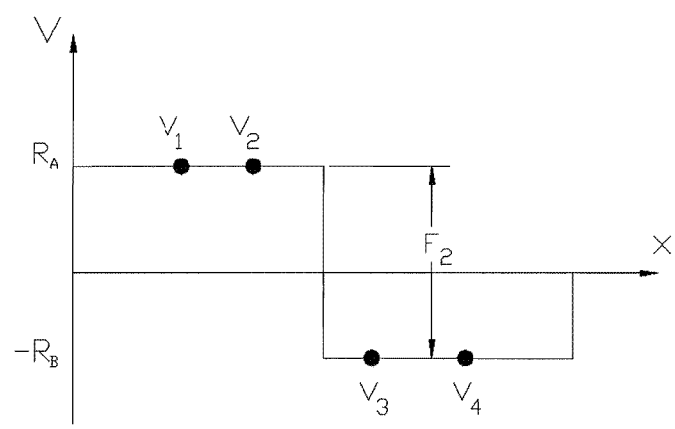
FIG. 87 is a shear force diagram for the beam in FIG. 86.
Figure 88:
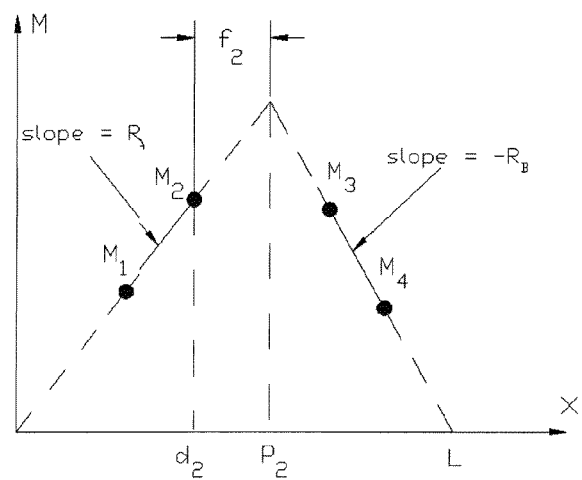
FIG. 88 shows calculated (solid lines) and actual (dashed lines) bending moment curves for the beam in FIG. 86, where the force F2 is located inside the weight area.

The four strain gage measurements $\epsilon_1$ through $\epsilon_4$ are needed to calculate the slopes of the bending moment curves on the two sides of the force; the shear force and bending moment diagrams for the beam in FIG. 86 are shown in FIGS. 87 and 88, respectively. By subtracting the slope of the right bending moment curve in FIG. 88 from that of the left one, the formulation of the force transducer is obtained from Eqs. (4.1) and (4.2) [31]:

$$FT_{1234} = FT_2 = \tag{4.4}$$
$$F_2 = -\varepsilon_1\left(\frac{k_1 E_1 I_1}{y_1 d_{12}}\right) + \varepsilon_2\left(\frac{k_2 E_2 I_2}{y_2 d_{12}}\right) + \varepsilon_3\left(\frac{k_3 E_3 I_3}{y_3 d_{34}}\right) - \varepsilon_4\left(\frac{k_4 E_4 I_4}{y_4 d_{34}}\right)$$

where $FT_2$, in which the subscript is the strain gage number for the strain gage immediately to the left of the force, is a shorthand notation for $FT_{1234}$ when the four strain gages are adjacent to each other, $d_{12}$ is the distance between strain gages $\varepsilon_1$ and $\varepsilon_2$, and $d_{34}$ is the distance between strain gages $\varepsilon_3$ and $\varepsilon_4$. One can define a scaling factor $\gamma_n$, where n=1, 2, 3, 4 is the strain gage number, and the corresponding calibration factor $\beta_n$ for each strain gage [31]:

$$\gamma_n = \frac{k_n E_n I_n}{y_n} \tag{4.5}$$

$$\beta_n = \frac{\gamma_n}{d_{nj}} \text{ for } n < j, \beta_n = \frac{\gamma_n}{d_{jn}} \text{ for } n > j \tag{4.6}$$

where j is also the strain gage number, and $d_{nj}$ or $d_{jn}$ is the distance between adjacent strain gages that are not at the end points of the weight area. By applying Eq. (4.5) to Eq. (4.4), one has an individual scaling factor for each strain gage in the force transducer $FT_2$:

$$FT_2 = F_2 = -\varepsilon_1\left(\frac{\gamma_1}{d_{12}}\right) + \varepsilon_2\left(\frac{\gamma_2}{d_{12}}\right) + \varepsilon_3\left(\frac{\gamma_3}{d_{34}}\right) - \varepsilon_4\left(\frac{\gamma_4}{d_{34}}\right) \tag{4.7}$$

By applying Eq. (4.6) to Eq. (4.7), one has an individual calibration factor for each strain gage in the force transducer $FT_2$:

$$FT_2 = F_2 = -\beta_1\varepsilon_1 + \beta_2\varepsilon_2 + \beta_3\varepsilon_3 - \beta_4\varepsilon_4 \tag{4.8}$$

When the force is outside the force transducer, the output of $FT_2$ will be zero since the slopes of the calculated bending moment curves will cancel out when subtracted. Let $$\alpha_{nj} = \frac{f_n}{d_{nj}} \tag{4.9}$$

be the relative position of a force $F_n$, where $f_n$ is the position of the force measured from the left adjacent strain gage. For the case where the force is outside the weight area, but inside the force transducer, the calculated force varies linearly with the distance between the force and an end point of the weight area [31].

The position of the force $F_2$ can be calculated when $F_2$ is inside the weight area, by finding the position of the intersection point of the two bending moment curves shown in FIG. 88:

$$\alpha_{23} = \frac{d_{23}(\beta_3\varepsilon_3 - \beta_4\varepsilon_4) + \gamma_3\varepsilon_3 - \gamma_2\varepsilon_2}{d_{23}(FT_{1234})} \tag{4.10}$$

The absolute position of the force $p_2$ can be obtained from the position of the left adjacent strain gage $d_2$ in FIG. 86 and Eq. (4.9):

$$p_2 = d_2 + \alpha_{23}d_{23} \tag{4.11}$$

The force transducer methodology does not depend on the boundary conditions of the beam, since the sum of the reaction forces always equals the applied force [31]. Furthermore, any reaction moment at a fixed or soft rest boundary of the beam does not change the slope of the bending moment curve, but merely shifts it along the ordinate [25, 31]. The methodology can also identify the magnitudes and locations of multiple loads on a slender beam, provided that any two loads are separated by two strain gage locations [33].

4.2.2 Calibration of a Force Transducer for a Non-continuous Slender Beam

The theoretical scaling factors $\gamma_n$ in Eq. (4.7) can be calculated from the geometric and material properties of a continuous beam. Modeling of a joint is often a difficult task involving extensive finite element analysis [37-39]. Instead of relying on the theoretical scaling factors, calibration can be performed using known loads; it is often the preferred method over analytical predictions, given the complexity of bolted joints [29, 37].

Figure 89:
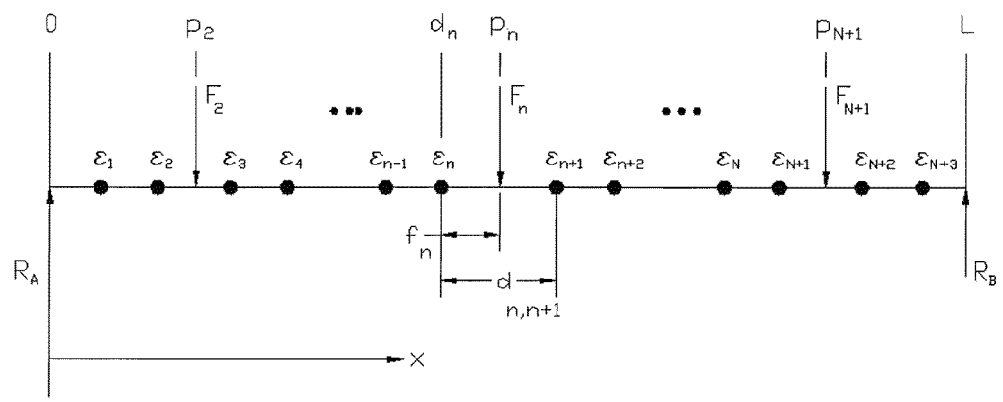
FIG. 89 shows a known nonzero force Fn placed immediately after strain gage epsilon sub n with all the other forces on the beam being zero.

The calibration procedure is set up so that a single known nonzero force $F_n$, where n=2, 3, . . . , N+1, is placed inside the weight area of the force transducer $FT_n$ that consists of strain gages $\varepsilon_{n-1}$ through $\varepsilon_{n+2}$, and all the other forces on the beam are zero [31] (FIG. 89); all the strains are measured. There are N+3 strain gages on the beam that create N force transducers, each of which consists of four adjacent strain gages, in order to identify the magnitudes of the N nonzero forces. Equation (4.7) is modified to reflect the N force transducers created:

$$FT_n = F_n = \tag{4.12}$$
$$-\varepsilon_{n-1}\left(\frac{\gamma_{n-1}}{d_{n-1,n}}\right) + \varepsilon_n\left(\frac{\gamma_n}{d_{n-1,n}}\right) + \varepsilon_{n+1}\left(\frac{\gamma_{n+1}}{d_{n+1,n+2}}\right) - \varepsilon_{n+2}\left(\frac{\gamma_{n+2}}{d_{n+1,n+2}}\right)$$

The calibration equation is $$[F] = [\varepsilon]/[\gamma] \tag{4.13}$$

where [F] is a q×1 matrix, in which q=$N^2$−2N+2, that represents all the known forces, including zero forces; [ε] is a q×m matrix, in which m=N+3, that represents the measured strains from strain gages forming the force transducers, and [γ] is an m×1 matrix that represents the scaling factors, which were assumed to be independent of loading. The force errors are defined as the relative errors between the known force magnitudes and the calculated ones from the force transducers, and the zero errors are the relative errors for the outputs of the force transducers that are expected to read zero. The maximum force error is denoted by $\lambda_F$, and the maximum zero error is denoted by $\lambda_0$. The total error $\lambda_T$ is defined by $$\lambda_T = C\lambda_F + \lambda_0 \tag{4.14}$$

where C is a user defined positive parameter. The theoretical $\gamma_n$ (n=1, 2, . . . , N+3) are used as the starting point for calibration, and the Microsoft Excel Solver is used to adjust all $\gamma_n$ to minimize $\lambda_T$ with the constraints $\gamma_n$>0; the joint effects can be accounted for by the calibration procedure. The position error is defined by $|\Delta p_n|/L$, where $\Delta p_n$ is the difference between a known force position and the calculated one. By applying the calibration procedure for the magnitudes of the forces, the position errors usually do not need to be calibrated [31, 33]. When the scaling factors are adjusted, calibration for temperature drift, which can cause the largest error for strain gages [14, 26, 30], is also performed by zeroing strain gages before readings are taken.

Figure 90:
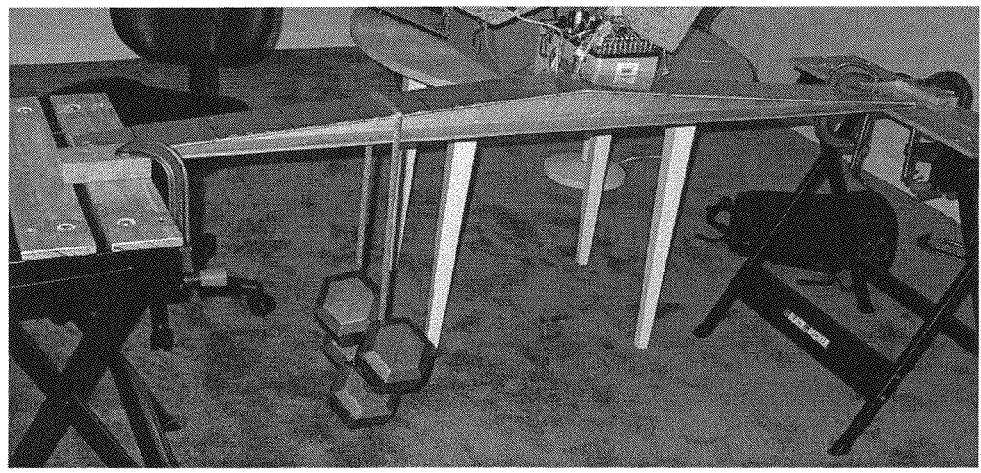
FIG. 90 is a picture of an experimental setup of a continuously tapered aluminum beam with a series of welded joints and rest boundary conditions.
Figure 91:
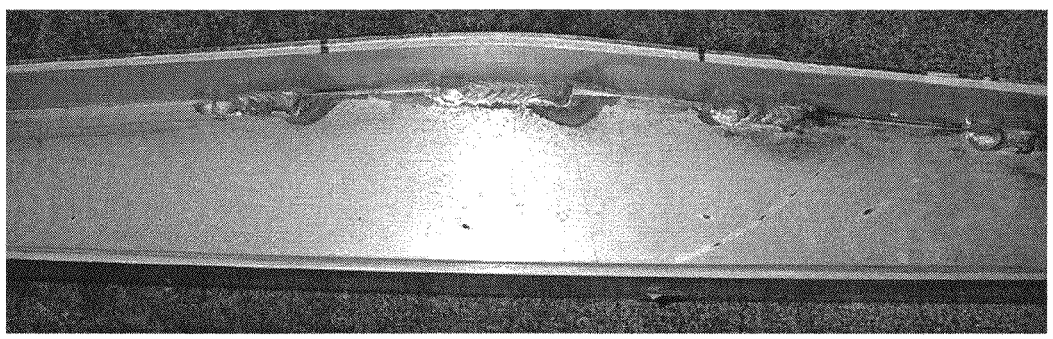
FIG. 91 is a picture of a close-up view of some welded joints in the beam in FIG. 90.
Figure 92:
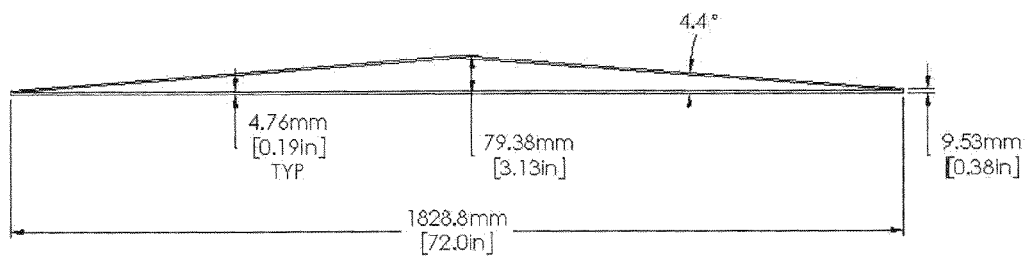
FIG. 92 is a side view of the beam in FIG. 90.
Figure 93:
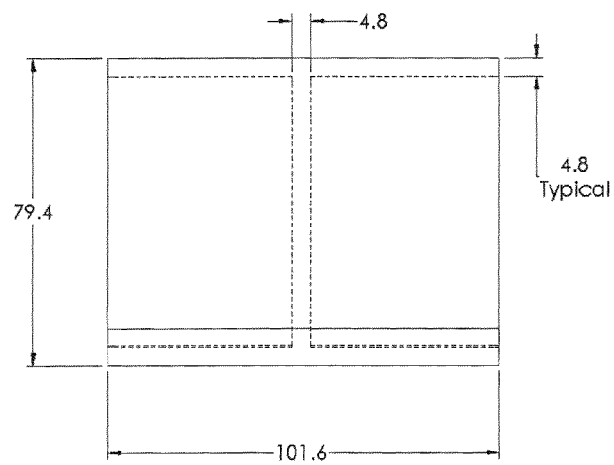
FIG. 93 is an end view of the beam in FIG. 90 (dimensions in mm)
Figure 94:
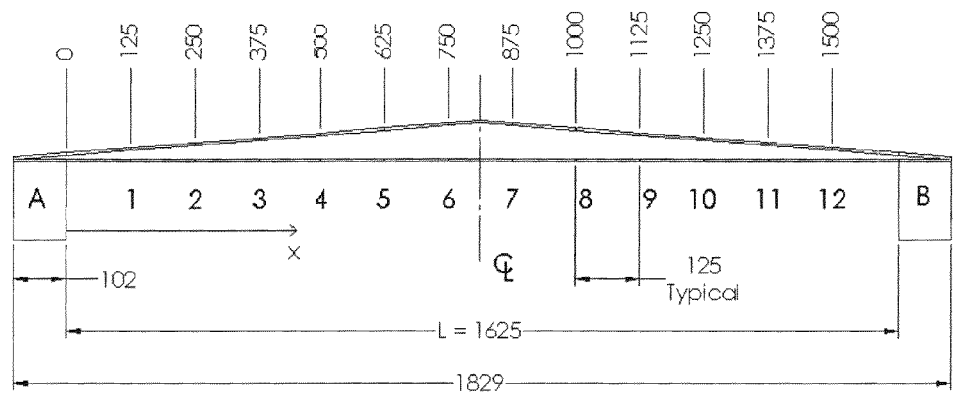
FIG. 94 is a side view of the beam in FIG. 90 with numbered strain gage locations (dimensions in mm)

4.3 Experimental Results 4.3.1 Identifying the Magnitude and Location of a Load on a Continuously Tapered Aluminum Beam with a Series of Welded Joints and Rest Boundary Conditions A quantity of 12 uniaxial Vishay strain gages (part number CEA-13-250UN-350) were bonded, with equal spacing, along the bottom surface of a continuously tapered, aluminum 6061-T6 beam, with rest boundary conditions, as shown in FIG. 90. The theoretical Young's modulus for aluminum is 69 GPa. The beam was fabricated from a continuously tapered T-shaped beam, with a bent plate acting as the top flange, which is connected to the web with a series of welded joints, to complete an I-shaped beam, as shown in FIG. 91. A Vishay P3 strain indicator and a Vishay SB-10 switch unit were used to display the strain gage outputs. The loads were applied via dumbbells, whose nominal weights were within 1.2% of their actual values. The beam has a 4.4° taper (FIG. 92), with its end view shown in FIG. 93 and its side view with strain gage locations shown in FIG. 94.

Figure 98:
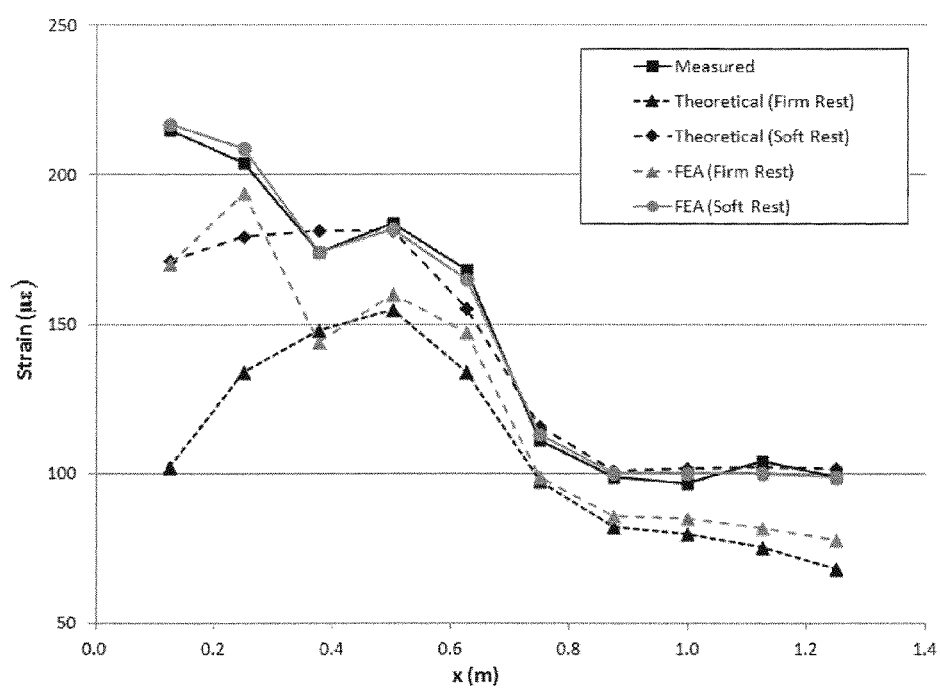
FIG. 98 shows comparisons of the theoretical strains for firm rest and soft rest boundary conditions, the measured strains, and the predicted strains from FEA for firm rest and soft rest boundary conditions.
Figure 95:
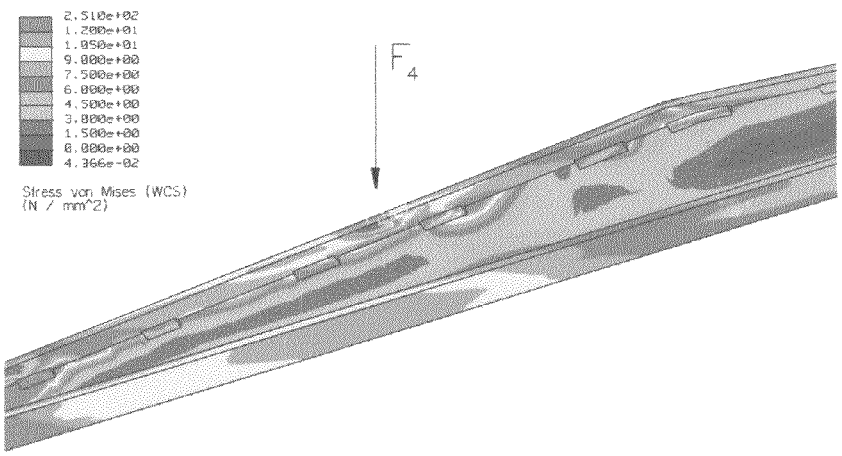
FIG. 95 is a color presentation of a predicted stress pattern from Finite Element Analysis (FEA) on the beam in FIG. 90 with an 801 N force at position 4.5.
Figure 96:
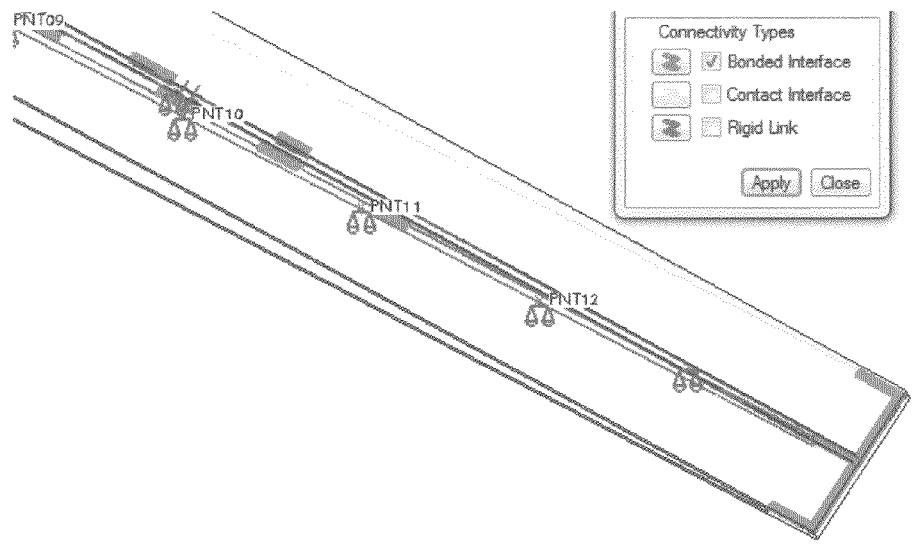
FIG. 96 is a color presentation of a bonded interface for welded joints in the FEA model.
Figure 97:
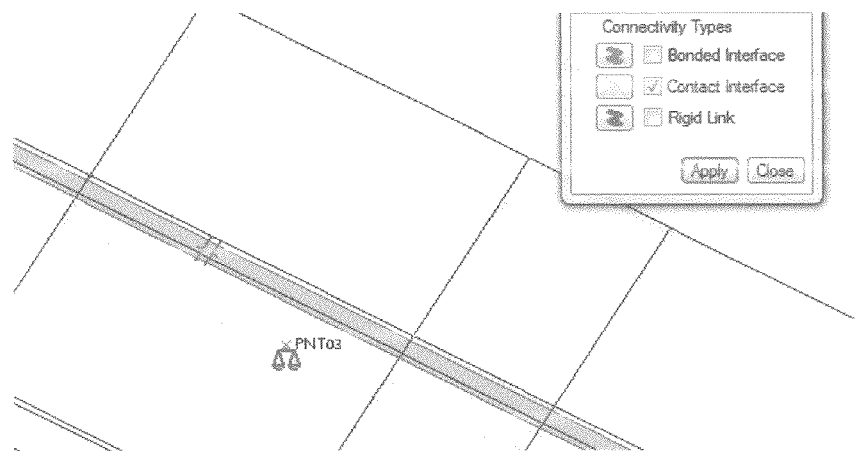
FIG. 97 is a color presentation of a contact interface between the top flange and web in the FEA model.

The position of the force is the strain gage number n directly to the left of the force added to the corresponding relative position $\alpha_{nj}$ of the force. The hexadecimal numbering system is used, where the force transducer formed by uniaxial strain gages 9 through 12 is $FT_{9ABC}$ or $FT_A$. The welded joints have an irregular pattern; the position of a strain gage can correspond to a cross section of the beam that may or may not contain a welded joint. In either case, the theoretical scaling factors were for the I-shaped beam cross sections. Finite element analysis (FEA) was performed on the beam in FIG. 90 with pinned-roller boundary conditions, where a roller boundary condition allows the beam to move freely in the horizontal direction, and an 801 N force at position 4.5, using Pro-Engineer Mechanica to demonstrate the stress concentrations due to the presence of the welded joints (FIG. 95). The welded joints were modeled as a bonded interface (FIG. 96), and the top flange was modeled as a contact interface to the web (FIG. 97). Comparisons of the theoretical strains for firm rest and soft rest boundary conditions, the measured strains, and the predicted strains from FEA for firm rest and soft rest boundary conditions are shown in FIG. 98, where the resultant reaction forces were assumed to be 85 and 80 mm away from the edges of the left and right abutments, respectively, for the soft rest boundary conditions [31]. While the theoretical strains for soft rest boundary conditions were within 20.3% of the measured strains, the predicted strains from FEA with soft rest boundary conditions were within 3.8% of the measured strains.

Figure 99:
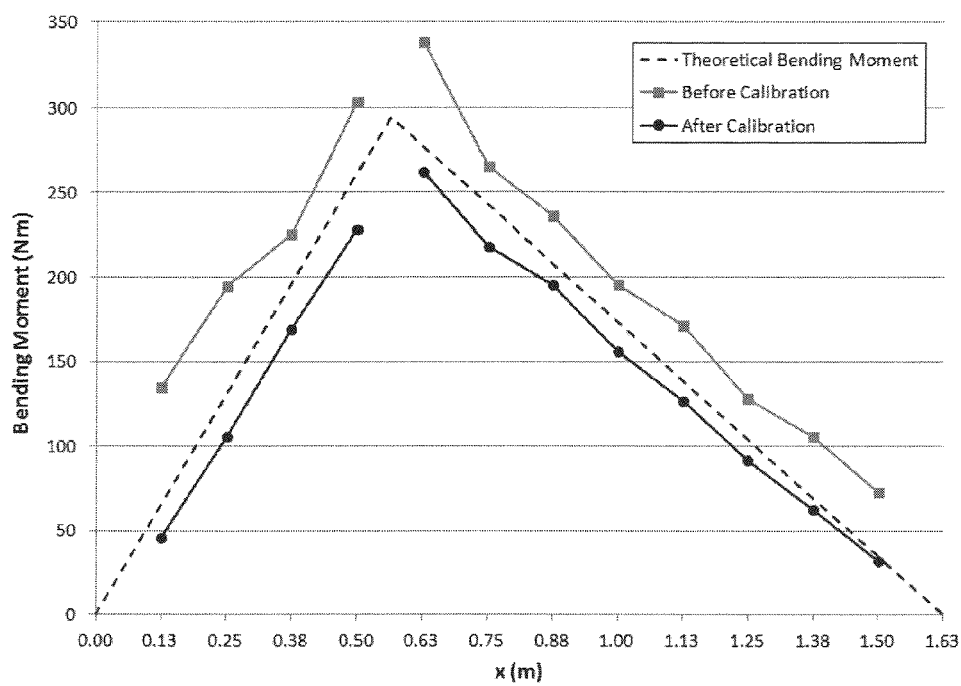
FIG. 99 shows comparisons of the theoretical bending moment and the calculated bending moments, both before and after calibration, for an 801 N force at position 4.5.

Calibration was performed using the method in Sec. 2.2 with C=0.7 in Eq. (4.14); comparisons of the theoretical, FEA, and adjusted $\gamma_n$, along with the average force and zero errors, are shown in Table 4.1, where soft rest boundary conditions were used in FEA; the theoretical $\gamma_n$ were for the firm rest boundary conditions and used as the starting point for calibration. The adjusted scaling factors ranged from 34 to 83% of their theoretical values. Known forces of 578 N were used for calibration and unknown forces of 801 N were calculated using the same adjusted scaling factors. The average force error before calibration was 18.9%, and it was reduced to 2.8% after calibration. The average zero error before calibration was 25.6%, and it was reduced to 7.1% after calibration. The theoretical bending moment diagram for firm rest boundary conditions and the calculated bending moment diagrams, both before and after calibration, for an 801 N force at position 4.5, are shown in FIG. 99. Errors in the bending moment calculations are not reflected in those in load identification [31]. The errors for the calculated magnitudes and positions of the forces for various loading scenarios are shown in Table 4.2. The force errors were within 4.5% after calibration, the zero errors were within 9.9%, and the position errors were within 2.3%. A source of error was the low signal to noise ratio, since the maximum strain gage reading of 268 µε was below the recommended range of 1,000 to 1,500 µε for a strain gage reading [15]. While the two neutral axes for the continuously tapered beam are not collinear, which is needed for the Euler-Bernoulli beam theory [21], and the vertical cross sections used for the theoretical scaling factors are not perpendicular to the neutral axes, they can be accounted for to some extent through calibration.

TABLE 4.1

Theoretical, FEA, and adjusted scaling factors for the beam in FIG. 90, with the corresponding average force and zero errors

| Strain Gage | 1 | 2 | 3 | 4 | 5 | 6 | 7 | 8 | 9 | 10 | 11 | 12 | Average Force Error | Average Zero Error |
|---|---|---|---|---|---|---|---|---|---|---|---|---|---|---|
| Theoretical Scaling Factor | 0.63 | 0.95 | 1.30 | 1.65 | 2.01 | 2.39 | 2.39 | 2.01 | 1.65 | 1.30 | 0.95 | 0.63 | 18.9% | 25.6% |
| FEA Scaling Factor | 0.49 | 0.82 | 1.35 | 1.64 | 1.90 | 2.45 | 2.40 | 2.04 | 1.68 | 1.33 | 1.00 | 0.48 | 18.6% | 21.9% |
| Adjusted Scaling Factor | 0.21 | 0.52 | 0.97 | 1.24 | 1.56 | 1.97 | 1.97 | 1.60 | 1.22 | 0.92 | 0.57 | 0.28 | 2.8% | 7.1% |

TABLE 4.2

Errors for calculated magnitudes and positions of forces on the beam in FIG. 90; known forces of 578N were used to calculate unknown forces of 801N

| Experimental Force (N) | Experimental Position | Calculated Force (N) | Force Error | Maximum Zero Error | Position Error |
|---|---|---|---|---|---|
| 578 | 2.5 | 555 | 4.1% | 7.4% | 2.3% |
| 801 | 2.5 | 764 | 4.5% | 3.8% | 2.1% |
| 578 | 3.5 | 591 | 2.3% | 5.0% | 0.3% |
| 801 | 3.5 | 795 | 0.7% | 3.7% | 0.5% |

TABLE 4.2-continued

Errors for calculated magnitudes and positions of forces on the beam in FIG. 90; known forces of 578N were used to calculate unknown forces of 801N

| Experimental Force (N) | Experimental Position | Calculated Force (N) | Force Error | Maximum Zero Error | Position Error |
|---|---|---|---|---|---|
| 578 | 4.5 | 601 | 3.9% | 8.7% | 2.0% |
| 801 | 4.5 | 827 | 3.3% | 6.3% | 1.9% |
| 578 | 5.5 | 556 | 3.8% | 8.7% | 0.7% |
| 801 | 5.5 | 799 | 0.3% | 8.8% | 0.8% |
| 578 | 6.5 | 561 | 2.9% | 8.6% | 0.6% |
| 801 | 6.5 | 816 | 1.9% | 9.9% | 0.4% |

Figure 100:
FIG. 100 is a picture of an experimental setup of an aluminum 6061-T6 beam with a bolted joint and rest boundary conditions.
Figure 101:
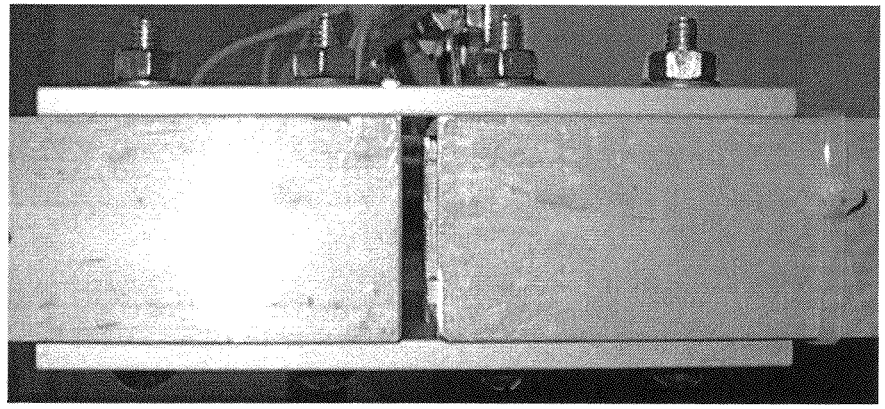
FIG. 101 is a picture of a close-up view of the bolted joint in the beam in FIG. 100.
Figure 102:
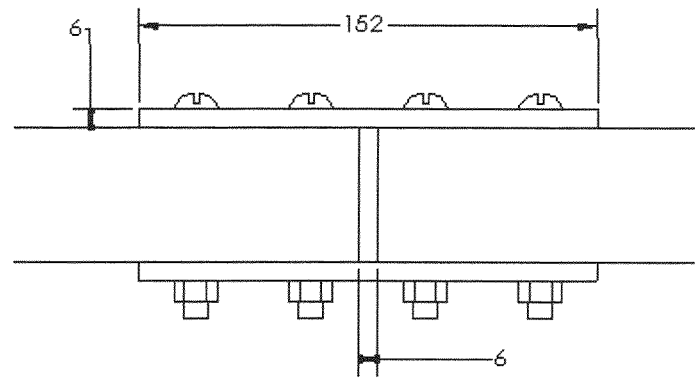
FIG. 102 is a close-up view of the bolted joint in the beam in FIG. 100 (dimensions in mm)
Figure 103:
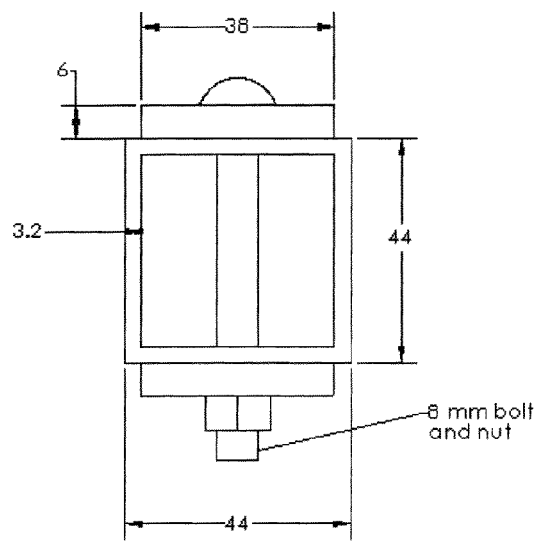
FIG. 103 is an end view of the beam in FIG. 100 (dimensions in mm)
Figure 104:
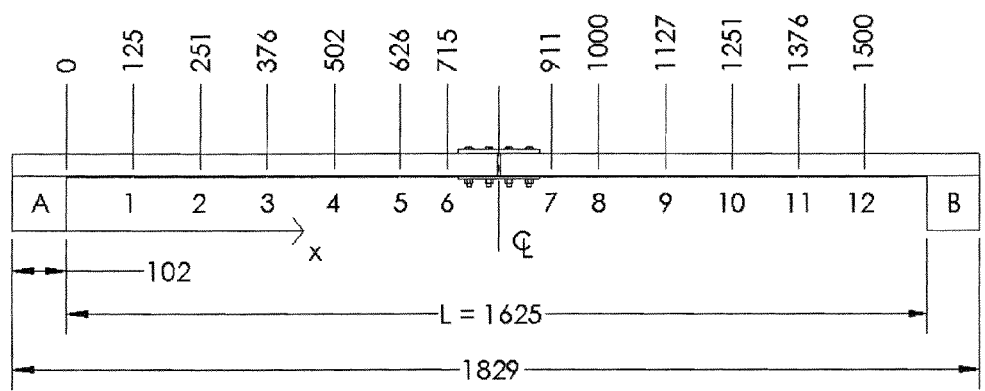
FIG. 104 is a side view of the beam in FIG. 100 with numbered strain gage locations (dimensions in mm)

4.3.2 Identifying the Magnitude and Location of a Load on an Aluminum Beam with a Bolted Joint and Rest Boundary Conditions A quantity of 12 uniaxial strain gages were bonded along the bottom surface of an aluminum 6061-T6 beam with a bolted joint at the center of the beam and rest boundary conditions, as shown in FIGS. 100-102. The cross section of the beam is a 44.5 mm square box with a 3.2 mm wall thickness (FIG. 103), and its side view with strain gage locations is shown in FIG. 104.

Figure 105:
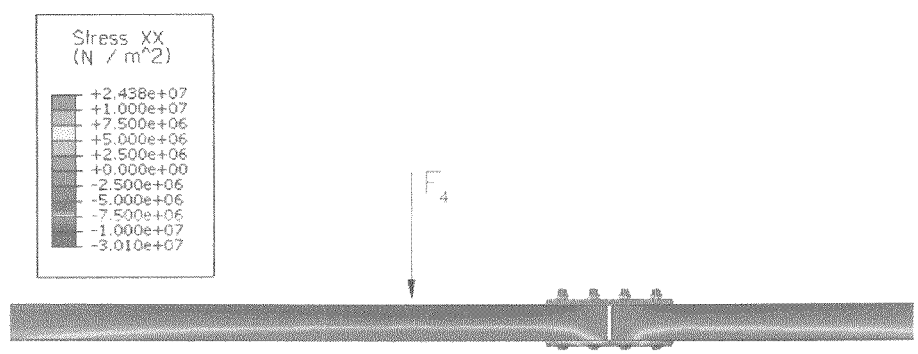
FIG. 105 is a color presentation of a predicted stress pattern from FEA on the beam in FIG. 100 with pinned boundary conditions, zero preloads in the bolts, and a 445 N force at position 4.5.
Figure 106:
FIG. 106 is a color presentation of a predicted stress pattern from FEA on a prismatic beam similar to the beam in FIG. 100, under a 445 N force at position 4.5.
Figure 107:
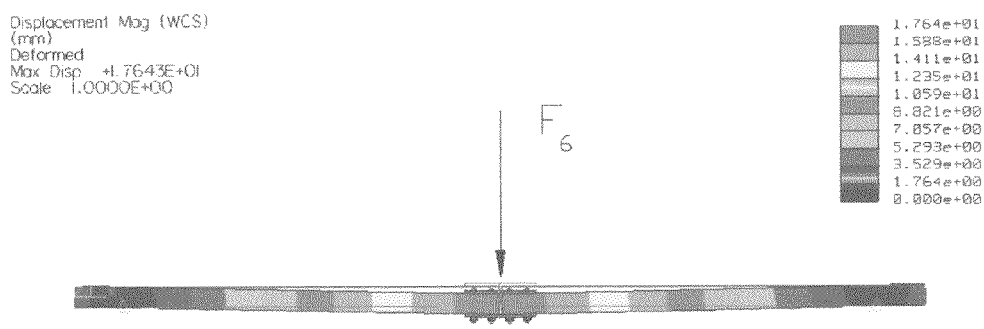
FIG. 107 is a color presentation of predicted deflections from FEA on the beam in FIG. 105 for a 445 N force at position 6.5.
Figure 108:
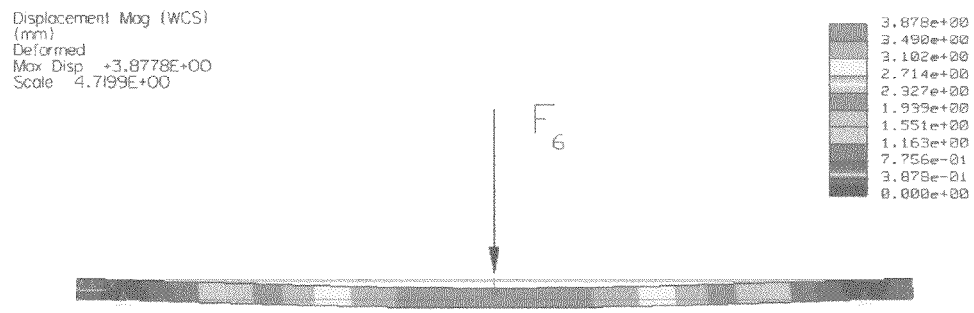
FIG. 108 is a color presentation of predicted deflections from FEA on the beam in FIG. 106 for a 445 N force at position 6.5.
Figure 109:
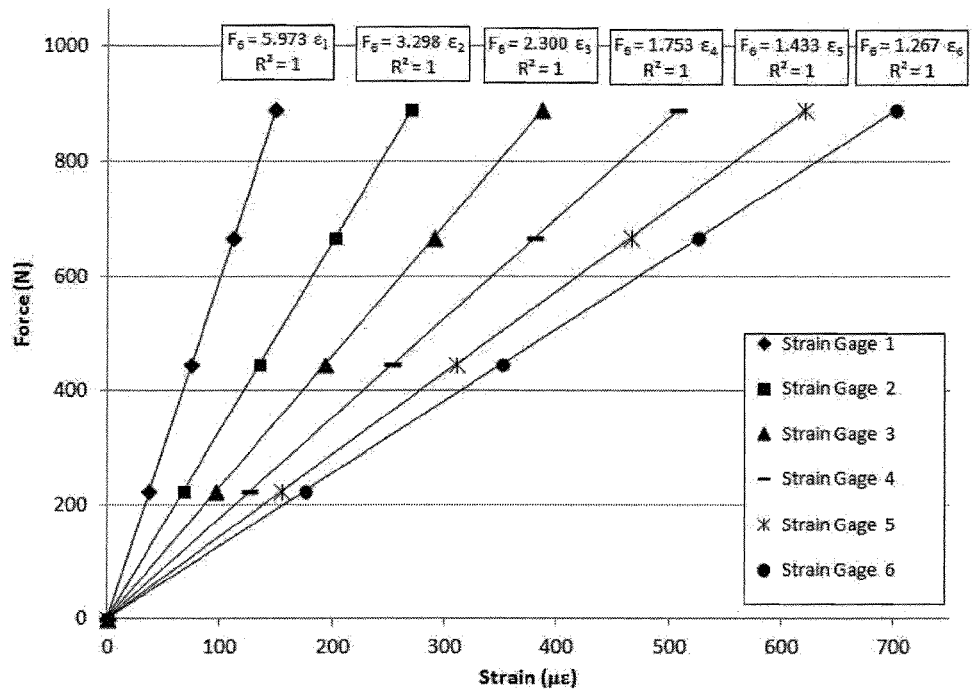
FIG. 109 shows strain response from FEA on the beam in FIG. 100 with increasing magnitudes of a force at position 6.5.
Figure 110:
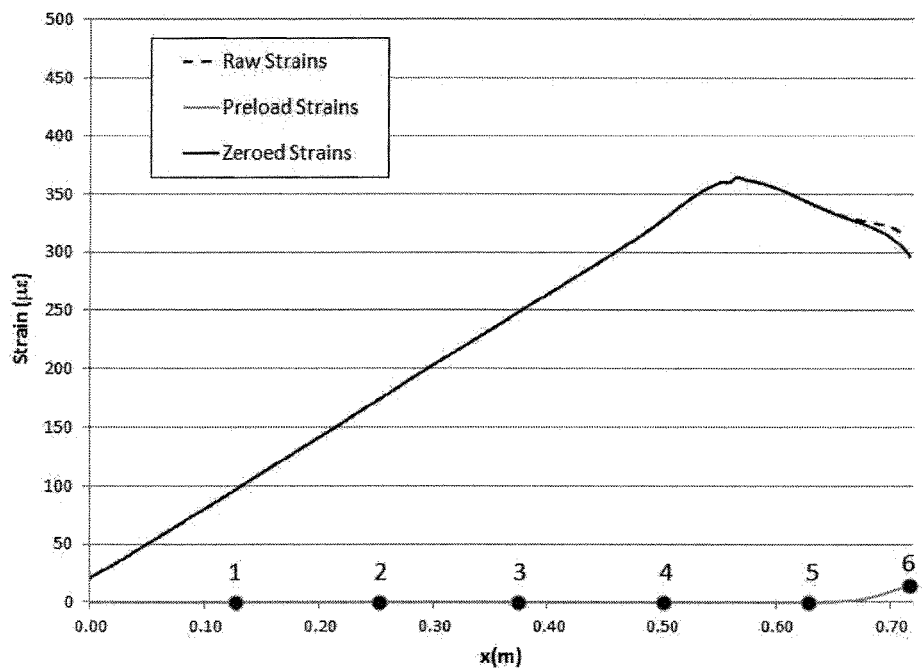
FIG. 110 shows comparisons of raw strains, preload strains, and zeroed strains for a bolt tension of 1.7 kN; locations of strain gages 1 through 6 are indicated.
Figure 111:
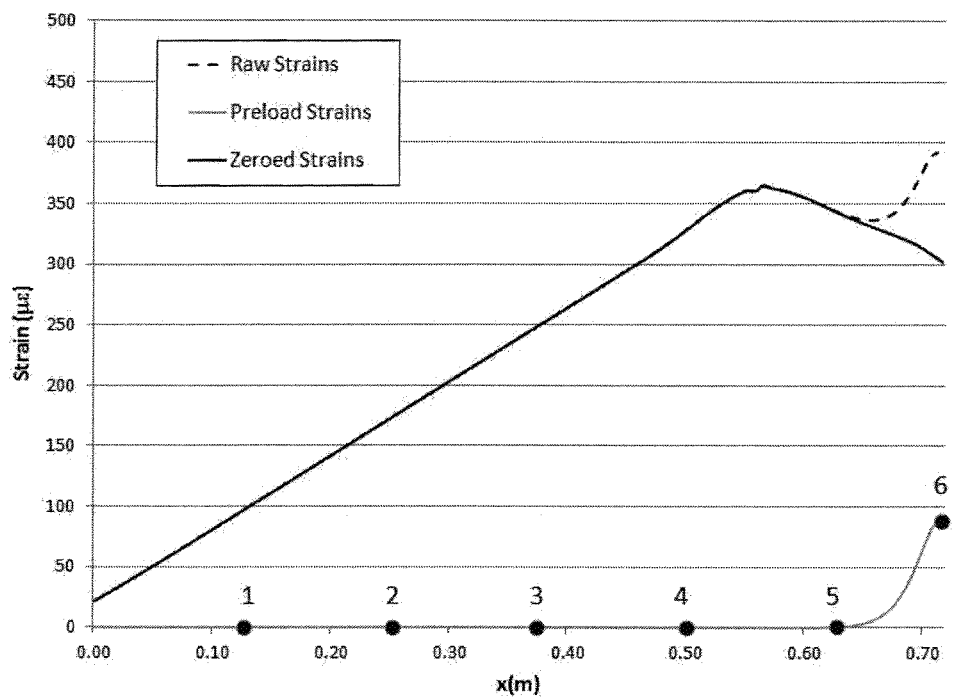
FIG. 111 shows comparisons of raw strains, preload strains; and zeroed strains for a bolt tension of 8.5 kN; locations of strain gages 1 through 6 are indicated.
Figure 112:
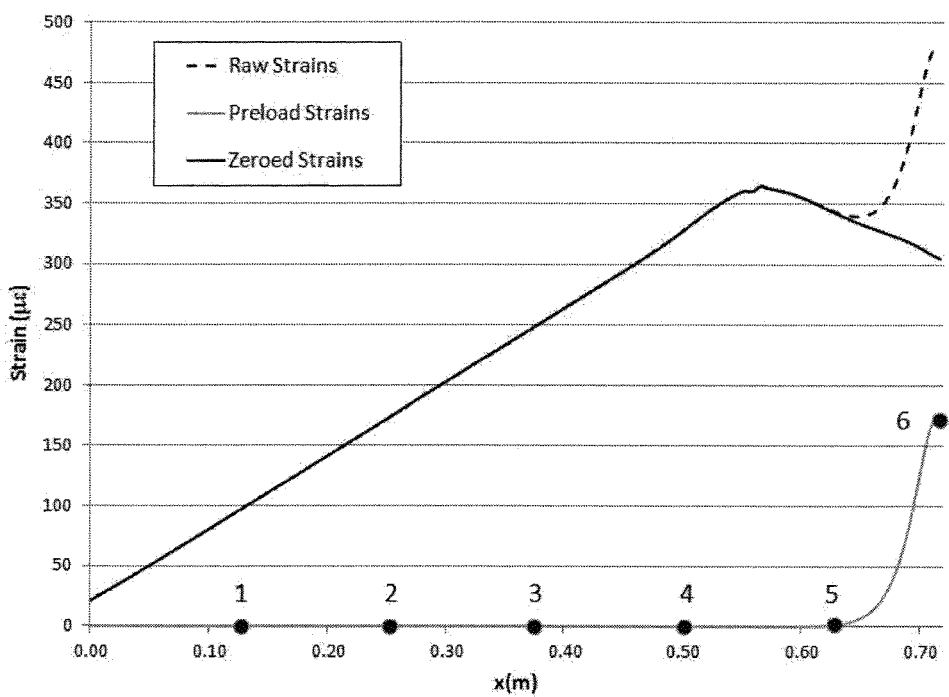
FIG. 112 shows comparisons of raw strains, preload strains, and zeroed strains for a bolt tension of 17.0 kN; locations of strain gages 1 through 6 are indicated.

FEA was performed on the beam in FIG. 100 with pinned-roller boundary conditions, zero preloads in the bolts, and a 445 N force at position 4.5, using Abaqus to demonstrate the stress flow in the beam and the stress concentrations due to the presence of a bolted joint (FIG. 105). The finite element model also had an updated Young's modulus, which is 94% of the theoretical value, a coefficient of friction of 1.05 between an aluminum joint plate and the aluminum beam, a coefficient of friction of 0.60 between a steel bolt or nut and an aluminum plate or beam, and soft rest boundary conditions, where the resultant reaction forces were assumed to be 30 mm away from the edges of the abutments [31]. The stress flow in a similar prismatic beam, under a 445 N force at position 4.5, is shown in FIG. 106. It can be seen that the normal flow of stress in FIG. 105 is interrupted by the bolted joint, which affects the strains in the neighborhood of the bolted joint. A comparison of the deflections for the beam with the bolted joint and a similar prismatic beam are shown in FIGS. 107 and 108, respectively. The predicted deflection for the beam with the bolted joint is 17.6 mm and that for the similar prismatic beam is 3.9 mm. The higher deflection for the beam with the bolted joint is due to the lower stiffness of the joint plates that have a lower moment of inertia then the beam. The linearity of the beam response can be verified from FIG. 109. The Microsoft Excel trend lines display the equations of the lines for the force-strain relationships in FIG. 109 as well as the coefficients of determination $R^2$, where $R^2=1$ indicates a perfect correlation to a line. FEA was also performed on the beam with a force of 445 N at position 4.5 and bolt tension values of 1.7, 8.5, and 17.0 kN, which would correspond to bolt torque values of 1.36, 6.78, and 13.56 Nm, respectively, according to Eq. (4.3), where a lubricated bolt was assumed to have K=0.1 and $\Phi$=8 mm. Comparisons of raw strains due to the preloads in the bolts and the applied load, strains due to the preloads in the bolts, referred to as preload strains, and strains due to the applied load, referred to as zeroed strains, which are obtained by subtracting the preload strains from the raw strains, for different bolt tension values are shown in FIGS. 110-112. While the bolt torque creates higher preload strains near the bolted joint, the preload strains elsewhere on the beam are almost zero. Hence $k_n \cong 1$ in Eq. (4.5) away from the bolted joint, and the corresponding $\gamma_n$ are close to their theoretical values for a continuous beam. While a higher torque value produces a higher preload strain at strain gage 6, which is closest to the bolted joint, the zeroed strains are almost the same.

Figure 113:
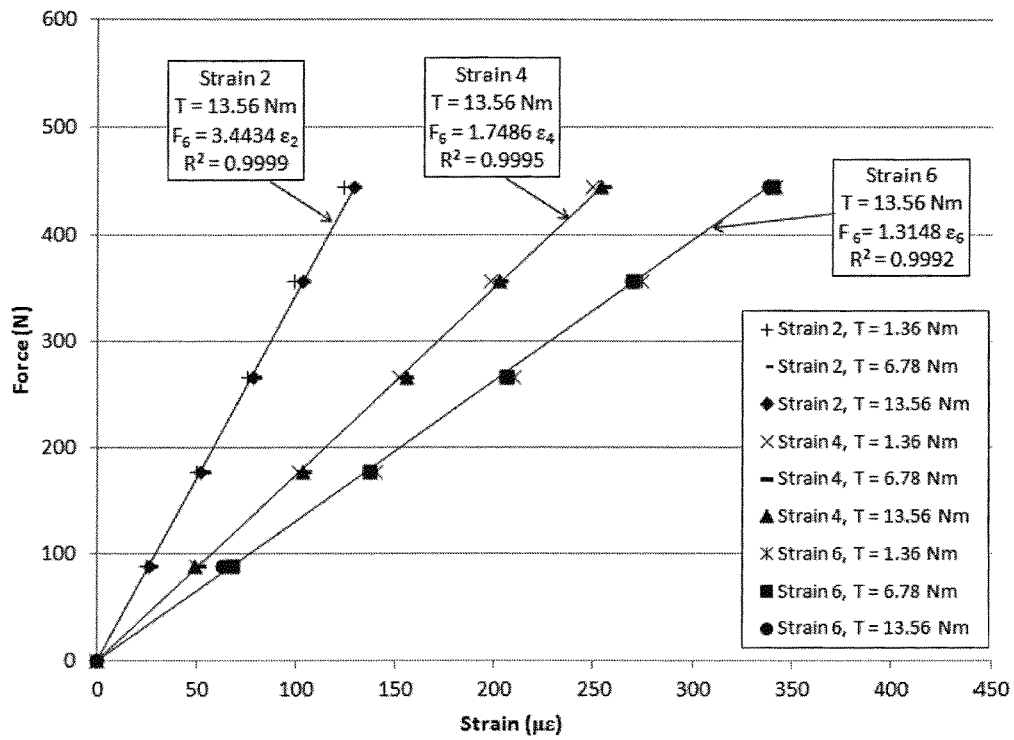
Figure 114:
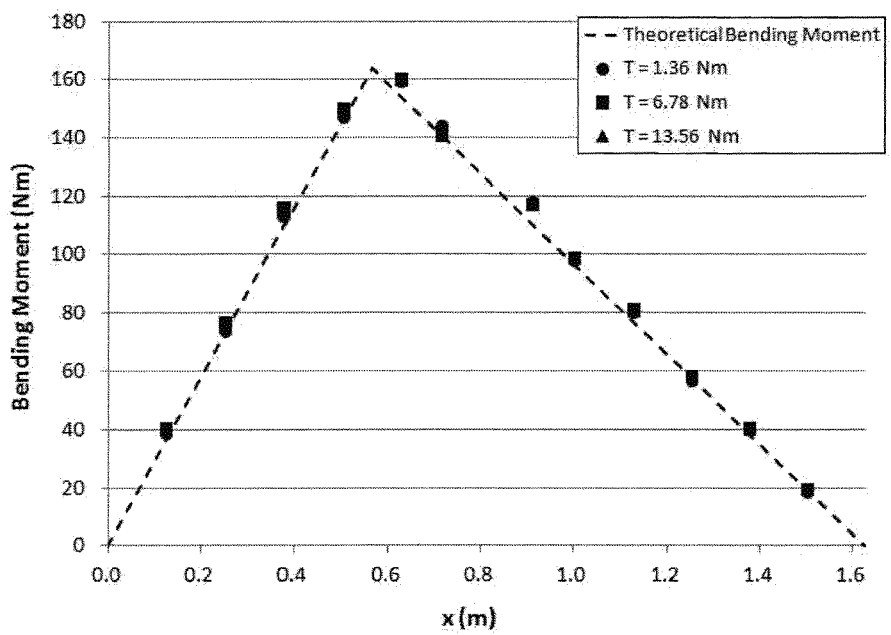
Figure 115:
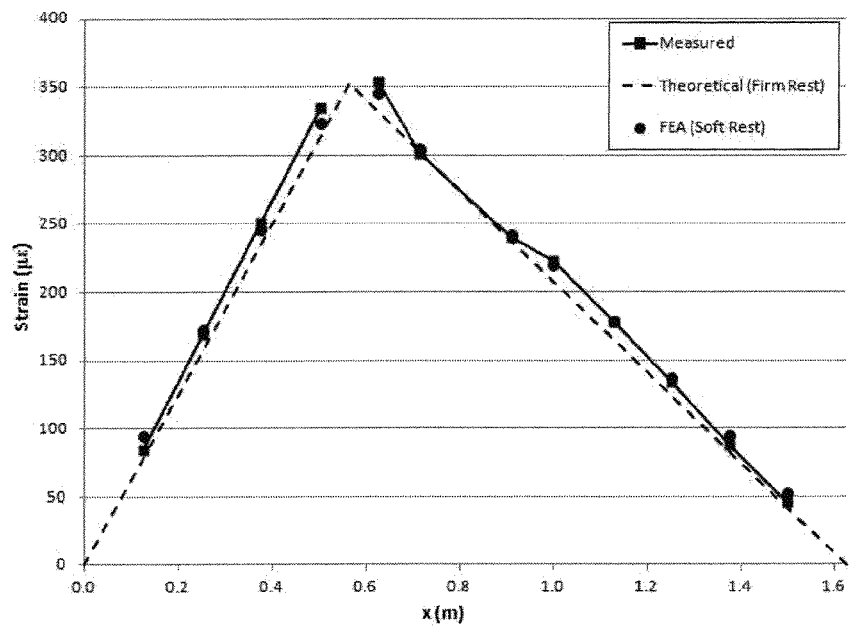

The bolt torque was varied experimentally to validate the linear response of the beam in FIG. 100. The responses of strain gages 2, 4, and 6 are shown in FIG. 113 for five different magnitudes of the force at position 6.5 and three different bolt torque values (1.36, 6.78, and 13.56 Nm); the strain gages were zeroed after a preload was applied and before readings were taken. All the lines in FIG. 113 had $R^2>0.9992$, which validated that the beam response is linear. For strain gages 2, 4, and 6, the differences among the slopes of the lines for the force-strain relationships were within 3.9%, 1.9%, and 1.6%, respectively, for the three bolt torque values. It was observed that when the bolt torque was changed from 1.36 to 6.78 Nm, strain gages 6 and 7 increased by about 190 $\mu\epsilon$, while the other strain gages that were away from the bolted joint stayed within 2 $\mu\epsilon$, which is consistent with the FEA result. Similarly, when the bolt torque was changed from 6.78 to 13.56 Nm, strain gages 6 and 7 increased by about 150 $\mu\epsilon$, while the other strain gages stayed within 2 $\mu\epsilon$. Comparisons of the theoretical and calculated bending moment diagrams for the three torque values, for a 445 N force at position 4.5, are shown in FIG. 114. Comparisons of the theoretical strains for firm rest boundary conditions, the measured strains for the bolt torque of 13.56 Nm, and the corresponding zeroed strains from FEA are shown in FIG. 115. There were drops in the measured strains at strain gages 6 and 7 and the corresponding zeroed strains from FEA because the bolted joint stiffens the beam in its neighborhood.

Figure 116:
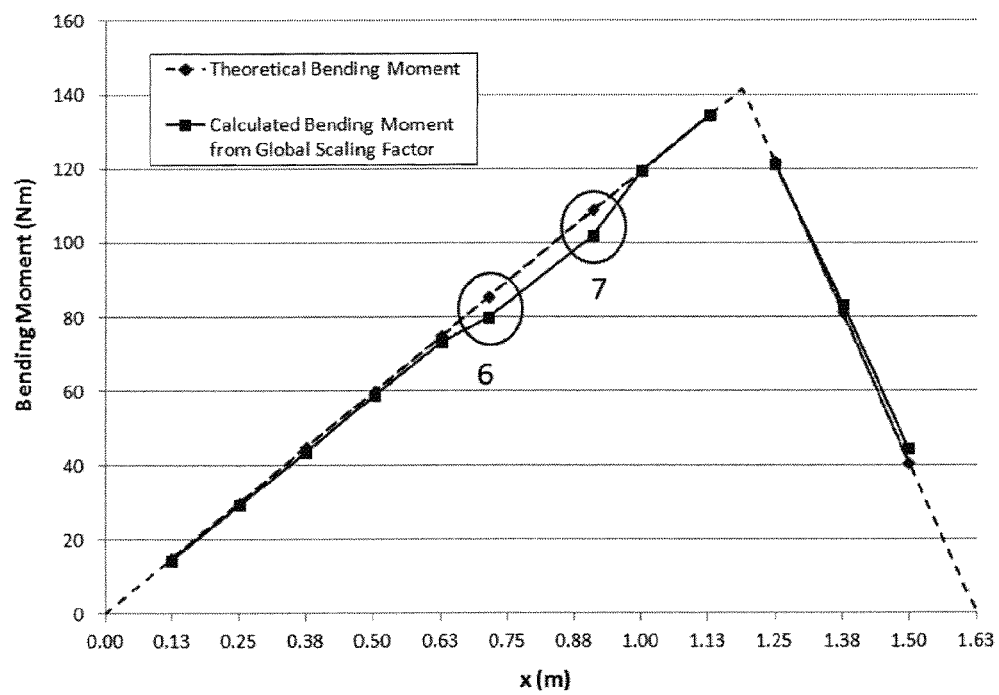
Figure 117:
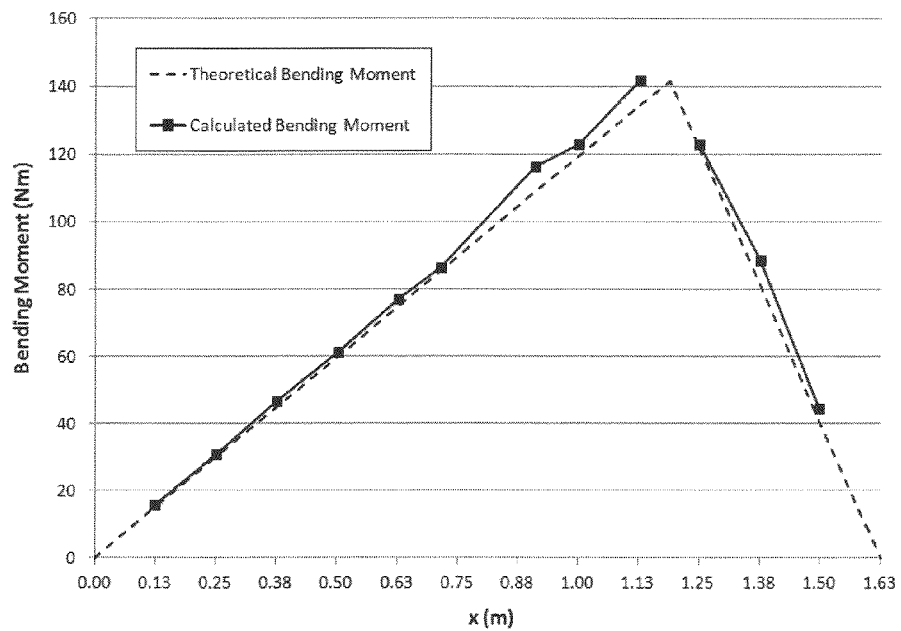

The theoretical bending moments for firm rest boundary conditions and the calculated bending moments from a global scaling factor, which is 93% of its theoretical value, for a 445 N force at position 9.5, have noticeable discrepancies at strain gages 6 and 7 due to the stiffening effect of the bolted joint (FIG. 116). Calibration was performed using the method in Sec. 4.2.2 with C=1 in Eq. (4.14); the comparison of the theoretical and adjusted $\gamma_n$, along with the average force and zero errors, is shown in Table 4.3. The known force of 445 N was placed in five weight areas and the unknown force of 445 N was calculated for the remaining four weight areas using the same scaling factors. The adjusted scaling factors ranged from 93 to 106% of their theoretical values. The average force error before calibration was 14.6%, and it was reduced to 2.8% after calibration. The average zero error before calibration was 31.1%, and it was reduced to 6.0% after calibration. The errors for the calculated magnitudes and positions of the forces for various loading scenarios are shown in Table 4.4. The force errors were within 5.3% after calibration, the zero errors were within 9.6%, and the position errors were within 1.7%. The theoretical and calculated bending moment diagrams for a 445 N force at position 9.5 are shown in FIG. 117.

TABLE 4.3

Scaling factors for the beam in FIG. 100 before and after calibration, with the corresponding average force and zero errors

| Strain Gage | 1 | 2 | 3 | 4 | 5 | 6 | 7 | 8 | 9 | 10 | 11 | 12 | Average Force Error | Average Zero Error |
|---|---|---|---|---|---|---|---|---|---|---|---|---|---|---|
| Theoretical Scaling Factor | 0.46 | 0.46 | 0.46 | 0.46 | 0.46 | 0.46 | 0.46 | 0.46 | 0.46 | 0.46 | 0.46 | 0.46 | 14.6% | 31.1% |
| Adjusted Scaling Factor | 0.47 | 0.45 | 0.46 | 0.45 | 0.45 | 0.47 | 0.49 | 0.44 | 0.45 | 0.44 | 0.46 | 0.43 | 2.8% | 6.0% |

TABLE 4.4

Calculated magnitude and position errors of the beam in FIG. 100

| Experimental Force (N) | Experimental Position | Calculated Force (N) | Force Error | Maximum Zero Error | Position Error |
|---|---|---|---|---|---|
| 445 | 2.5 | 464 | 4.3% | 5.8% | 0.7% |
| 445 | 3.5 | 464 | 4.4% | 6.0% | 0.7% |
| 445 | 4.5 | 445 | 0.0% | 6.4% | 0.6% |
| 445 | 5.5 | 436 | 1.9% | 4.1% | 0.7% |
| 445 | 6.5 | 426 | 4.3% | 4.4% | 1.3% |
| 445 | 7.5 | 445 | 0.1% | 5.8% | 0.5% |
| 445 | 8.5 | 424 | 4.6% | 9.6% | 1.7% |
| 445 | 9.5 | 421 | 5.3% | 6.6% | 1.6% |
| 445 | 10.5 | 448 | 0.6% | 5.4% | 1.3% |

Figure 124:
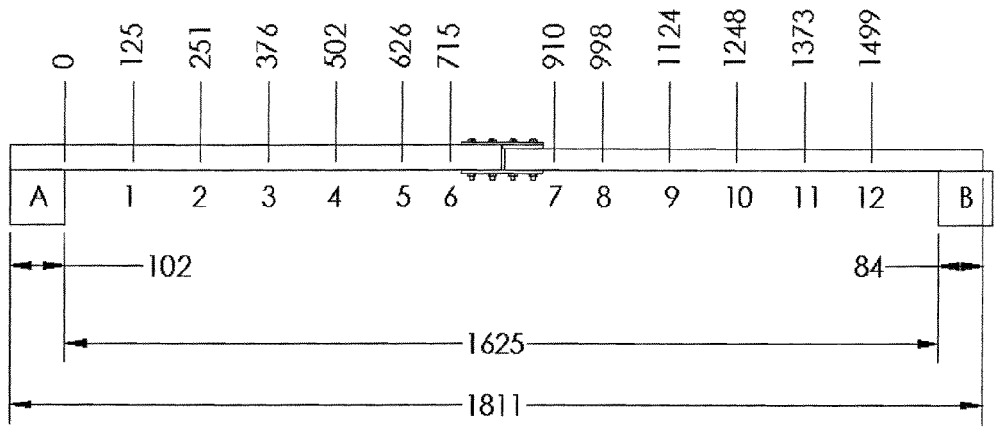

A quantity of six uniaxial Vishay strain gages (part number CEA-06-250UN-350) were bonded along the bottom surface of a beam, the left half of which is the same as that in FIG. 100 and the right half of which is a steel A36 beam, with a bolted joint at the center of the beam (FIG. 118). The theoretical Young's modulus for steel is 200 GPa. The cross section of the steel part of the beam is a 38.1 mm square box with a 3.2 mm wall thickness (FIG. 119); the joint plates are the same as those in FIG. 100, and there is a plate between the top joint plate and the steel part of the beam because of different dimensions of the cross sections of the aluminum and steel parts of the beam (FIGS. 119-123). The side view of the beam with strain gage locations is shown in FIG. 124. The experiment here demonstrated the applicability of the methodology to a beam with non-homogenous material, since the Young's modulus of the aluminum part of the beam differs significantly from that of the steel part of the beam. FEA performed here with Mechanica shows the discontinuity in the stress flow at the joint, similar to that in Sec. 4.3.2, for the beam in FIG. 4.33 with pinned boundary conditions, zero preloads in the bolts, and a 445 N force at position 2.5 (FIG. 125). It should be noted that there is no stress in the plate between the top joint plate and the top of the steel part of the beam.

The theoretical bending moments for firm rest boundary conditions and the calculated bending moments from a global scaling factor, which is 88% of its theoretical values, for a 445 N force at position 9.5, have more discrepancies at strain gages 6 and 7 due to the stiffening effect of the bolted joint (FIG. 126). Calibration was performed using the method in Sec. 4.2.2 with C=0.5 in Eq. (4.14); the comparison of the theoretical and adjusted $\gamma_1$, along with the average force and zero errors, is shown in Table 4.5. The known force of 445 N was placed in five weight areas and the unknown force of 445 N was calculated for the remaining four weight areas using the same scaling factors. The adjusted scaling factors ranged from 94 to 104% of their theoretical values. The average force error before calibration was 11.6%, and it was reduced to 3.0% after calibration. The average zero error before calibration was 21.5%, and it was reduced to 4.1% after calibration. The errors for the calculated magnitudes and positions of the forces for various loading scenarios are shown in Table 4.6. The force errors were within 4.7% after calibration, the zero errors were within 4.9%, and the position errors were within 1.0%. The theoretical and calculated bending moment diagrams for a 445 N force at position 9.5 are shown in FIG. 127.

TABLE 4.5

Scaling factors for the beam in FIG. 118 before and after calibration, with the corresponding average force and zero errors

| Strain Gage | 1 | 2 | 3 | 4 | 5 | 6 | 7 | 8 | 9 | 10 | 11 | 12 | Average Force Error | Average Zero Error |
|---|---|---|---|---|---|---|---|---|---|---|---|---|---|---|
| Theoretical Scaling Factor | 0.46 | 0.46 | 0.46 | 0.46 | 0.46 | 0.46 | 0.95 | 0.95 | 0.95 | 0.95 | 0.95 | 0.95 | 11.6% | 21.5% |
| Adjusted Scaling Factor | 0.46 | 0.45 | 0.44 | 0.45 | 0.45 | 0.48 | 0.96 | 0.93 | 0.90 | 0.92 | 0.92 | 0.99 | 3.0% | 4.1% |

TABLE 4.6

Calculated magnitude and position errors of the beam in FIG. 118

| Experimental Force (N) | Experimental Position | Calculated Force (N) | Force Error | Maximum Zero Error | Position Error |
|---|---|---|---|---|---|
| 445 | 2.5 | 424 | 4.7% | 4.8% | 0.6% |
| 445 | 3.5 | 426 | 4.3% | 3.0% | 1.0% |
| 445 | 4.5 | 453 | 1.8% | 4.9% | 0.4% |
| 445 | 5.5 | 441 | 0.8% | 4.8% | 0.4% |
| 445 | 6.5 | 431 | 3.0% | 4.9% | 0.7% |

TABLE 4.6-continued

Calculated magnitude and position errors of the beam in FIG. 118

| Experimental Force (N) | Experimental Position | Calculated Force (N) | Force Error | Maximum Zero Error | Position Error |
|---|---|---|---|---|---|
| 445 | 7.5 | 466 | 4.7% | 4.0% | 0.1% |
| 445 | 8.5 | 425 | 4.5% | 2.7% | 0.5% |
| 445 | 9.5 | 448 | 0.7% | 2.6% | 0.6% |
| 445 | 10.5 | 433 | 2.8% | 4.9% | 0.7% |

4.3.4 Identifying the Magnitude and Location of a Load on a Portable Army Bridge The force transducer methodology was used to measure the magnitude and location of a load on a portable army bridge on the Bridge Crossing Simulator (BCS), which is operated by the US Army Aberdeen Test Center at Aberdeen Proving Ground in Maryland, USA (FIG. 128). The BCS tests portable army bridges for fatigue failure by simulating thousands of vehicle crossings. The BCS consists of ten pairs of hydraulic cylinders; the two cylinders in each pair are connected by a Whiffle, which applies a load to the bridge via eight pads, as shown in FIGS. 128-132. First, a bridge is set up on dirt abutments and measured strains from the bridge are collected from vehicles with various crossing speeds. Next, the bridge is set up on the BCS with wood abutments and straps, which create boundary conditions that are between rest and fixed boundary conditions, and loads from multiple Whiffles are applied to the bridge to simulate various crossing speeds of vehicles. A load identification methodology can be used to identify cylinder loads that need to be applied, from measured strains from live crossings of vehicles.

The portable army bridge shown in FIGS. 128-130 has a span of 46 meters, a height of 1.2 meters, a width of 4.3 meters, and a cross section that consists of four I-shaped beams and a deck, as shown in FIG. 133. Twenty uniaxial strain gages were bonded along the bottom flange of the bridge (FIG. 133) at the hydraulic cylinder locations. The bridge consists of eight modules, as shown in FIGS. 129 and 130, which are connected by bolted joints, and each module has many welded and bolted joints. The BCS was used to apply two known 89 kN forces at the roadside and curbside matching cylinders in FIGS. 130 and 131, at various locations along the bridge. The resultant force from each cylinder consists of four distributed forces at the pads, as shown in FIG. 132. Since the force applied on each side is at a strain gage location, a force transducer used to identify the force was formed by two strain gages to the left of the force and two to the right. The zero errors were calculated by force transducers that do not contain the strain gage at the force position. For instance, to identify the magnitude and position of a force at position 3.0, the force transducer $FT_{1245}$ was used; the zero errors were calculated by force transducers $FT_{4578}$, $FT_{5689}$, and $FT_{6794}$. Calibration was performed independently for each side of the bridge using the method in Sec. 4.2.2; the theoretical scaling factors that were calculated from the cross section in FIG. 133 were used as the starting point, and C=1 in Eq. (4.14). The adjusted scaling factors are shown in Table 4.7. Since the bridge has many welded and bolted joints and the end modules have variable cross sections, the scaling factors of the strain gages at various locations along the bridge differed significantly, with the maximum to minimum scaling factor ratio being 147%. However, since the bridge is almost symmetric from the roadside to the curbside, the roadside to curbside scaling factor ratio is between 90 to 107%. The adjusted scaling factors ranged from 75 to 110% of their theoretical values. Two unknown forces of 67 kN were applied at the roadside and curbside matching cylinders in four weight areas of the roadside and curbside force transducers, with the results shown in Tables 4.8 and 4.9. The roadside force errors were within 5.3% after calibration, the zero errors were within 13.7%, and the position errors were within 5.3%. The curbside force errors were within 3.8% after calibration, the zero errors were within 13.2%, and the position errors were within 5.1%. The theoretical bending moment diagram for firm rest boundary conditions and the calculated bending moment diagram for two 67 kN forces at position 5.0 are shown in FIGS. 134 and 135. The reaction moments at the boundaries were calculated to be negative due to the straps at the abutments.

TABLE 4.7

Scaling factors for the BCS strain gages on the roadside and curbside of the portable army bridge and their ratios

| Strain Gage | 1 | 2 | 3 | 4 | 5 | 6 | 7 | 8 | 9 | 10 |
|---|---|---|---|---|---|---|---|---|---|---|
| Scaling Factors Roadside | 2,554 | 2,155 | 2,428 | 2,192 | 1,905 | 1,944 | 2,323 | 2,772 | 2,480 | 2,480 |
| Scaling Factors Curbside | 2,631 | 2,147 | 2,690 | 2,176 | 1,876 | 2,054 | 2,174 | 2,626 | 2,529 | 2,496 |
| Roadside/ Curbside | 97% | 100% | 90% | 101% | 102% | 95% | 107% | 106% | 99% | 99% |

TABLE 4.8

Calculated magnitude and position errors for the roadside of the portable army bridge

| Experimental Force (N) | Experimental Position | Calculated Force (N) | Force Error | Maximum Zero Error | Position Error |
|---|---|---|---|---|---|
| 66,723 | 3.0 | 65,402 | 2.0% | 13.7% | 1.0% |
| 88,964 | 3.0 | 87,153 | 2.0% | 13.2% | 1.2% |
| 66,723 | 4.0 | 63,182 | 5.3% | 11.2% | 5.1% |
| 88,964 | 4.0 | 86,488 | 2.8% | 9.8% | 5.3% |
| 66,723 | 5.0 | 66,178 | 0.8% | 6.7% | 2.2% |
| 88,964 | 5.0 | 86,488 | 2.8% | 7.0% | 2.3% |
| 66,723 | 6.0 | 63,968 | 4.1% | 0.6% | 0.7% |
| 88,964 | 6.0 | 87,480 | 1.7% | 6.8% | 0.8% |

TABLE 4.9

Calculated magnitude and position errors for the curbside of the portable army bridge

| Experimental Force (N) | Experimental Position | Calculated Force (N) | Force Error | Maximum Zero Error | Position Error |
|---|---|---|---|---|---|
| 66,723 | 3.0 | 65,365 | 2.0% | 12.2% | 3.9% |
| 88,964 | 3.0 | 85,895 | 3.5% | 12.4% | 3.7% |
| 66,723 | 4.0 | 67,588 | 1.3% | 11.2% | 4.8% |
| 88,964 | 4.0 | 91,103 | 2.4% | 10.4% | 5.1% |
| 66,723 | 5.0 | 66,498 | 0.3% | 13.2% | 4.0% |
| 88,964 | 5.0 | 85,895 | 3.5% | 10.9% | 4.1% |
| 66,723 | 6.0 | 69,257 | 3.8% | 7.9% | 1.0% |
| 88,964 | 6.0 | 90,773 | 2.0% | 7.8% | 1.2% |

4.4 Conclusion

Using four uniaxial strain gages mounted to the bottom surface of a slender beam with welded and bolted joints, the magnitude and location of a load on the beam can be accurately identified. Each force transducer can also identify a zero load when the load on the beam is located outside the force transducer. The force transducer methodology will work for any slender non-continuous, non-homogenous beam with variable cross sections and different types of boundary conditions, as long as the response of the beam is linear. The theoretical scaling factors are calculated from geometric and material properties of the beam, and adjusted during a calibration procedure to account for the joint and other effects.

Experiments were performed on slender beams with welded and bolted joints and rest boundary conditions. For the continuously tapered aluminum beam with a series of welded joints in Sec. 4.3.1, the force errors were within 4.5% after calibration, the zero errors were within 9.9%, and the position errors were within 2.3%. The adjusted scaling factors differed significantly from the theoretical scaling factors and the calibration procedure reduced the average force error from 18.9% to 2.8%. For the aluminum beam with a bolted joint in Sec. 4.3.2, the force errors were within 5.3% after calibration, the zero errors were within 9.6%, and the position errors were within 1.7%. The adjusted scaling factors were within 7% of the theoretical scaling factors. FEA for zero preloads in the bolts and experiments for different bolt torque values confirmed that the response of the beam was linear. For a half aluminum and half steel beam with a bolted joint in Sec. 4.3.3, the force errors were within 4.7% after calibration, the zero errors were within 4.6%, and the position errors were within 1.0%. The adjusted scaling factors were within 6% of the theoretical scaling factors. The force transducer methodology was validated on a non-continuous and non-homogenous beam with two different cross sections in this case. For the portable army bridge on the BCS in Sec. 4.3.4, the force errors were within 5.3% after calibration, the zero errors were within 13.7%, and the position errors were within 5.3%. While the scaling factors differed significantly along the bridge, the roadside and curbside scaling factors were within 7% of each other. The theoretical scaling factors were a good starting point for calibration in all cases.

Chapter 5: Conclusion 5.1 Summary

A unique strain gage based method has been developed that can identify the magnitude and location of a load within a weight area of a force transducer. When the load is outside the force transducer, a zero load is accurately identified without influence from other loads on the beam. The load can be a concentrated load, distributed load or a combination of each. The goal of the force transducer methodology was to have force errors within 5%, zero errors within 10%, and position errors within 5%. For the experimental results of Chapter 2, the force errors were within 3.7% after calibration for the prismatic beams and within 4.0% for the continuously tapered beam. The zero errors were within 5.1% for the prismatic beams and within 5.7% for the continuously tapered beam. The location of the load was accurately calculated with an error within 0.1% for the steel beam with a precise string loading. The locations of the loads for the other cases were within an error of 2.3%.

The force transducer methodology was also applied to multiple loads on a beam that are separated by two strain gage locations. For the experimental results of Chapter 3, the force errors were within 4.3%, the zero errors were within 6.3%, and the position errors were within 1.1%. A new strain gage based method was developed using shear gages mounted on the neutral axis of a beam along with the uniaxial strain gages mounted on the bottom surface of the beam. For the case of two loads separated by one strain gage location, the force errors were within 6.3% after calibration, the zero errors were within 5.0%, and the position errors were within 1.0%.

The force transducer methodology was applied to beams with welded and bolted joints in Chapter 4, with stress concentration factors due to the joints being accounted for through the calibration procedure developed here. Experiments were performed on three laboratory beams as well as a portable army bridge on the BCS. For a continuously tapered aluminum beam with a series of welded joints, the force errors were within 4.5%, the zero errors were within 9.9%, and the position errors were within 2.3%. For an aluminum beam with a bolted joint, the force errors were within 5.3%, the zero errors were within 9.6%, and the position errors were within 1.7%. For a half aluminum and half steel beam with a bolted joint, the force errors were within 4.7%, the zero errors were within 4.6%, and the position errors were within 1.0%. For the portable army bridge on the BCS, the force errors were within 5.3%, the zero errors were within 13.7%, and the position errors were within 5.3%.

5.2 Contributions, Advantages, and Limitations

The force transducer methodology developed here successfully identifies the magnitudes and locations of loads on non-continuous, non-homogenous, slender beams with variable cross sections, welded and bolted joints, and pinned, firm rest, soft rest, pinned-fixed, and fixed boundary conditions, by using four uniaxial strain gages mounted to the bottom surface of the beam, when adjacent loads are separated by two strain gage locations. It is also used to determine the boundary conditions by calculating the bending moment diagram. When there are multiple loads separated by only one strain gage location, another method developed here uses two shear gages mounted on the neutral axis of the beam, one on each side of a load, to identify the magnitude of the load in this case. A combination of two uniaxial strain gages and two shear gages, with one uniaxial strain gage and one shear gage at the same location on each side of a load, is used to identify the location of the load. These methods have not been developed before and are innovative to the field of load identification. The calibration method and corresponding calibration matrix developed here is innovative and useful for strain gage based force transducers. By systematically applying known nonzero loads along the beam in various weight areas, both the nonzero load and nonzero loads are accounted for through calibration. The Microsoft Excel Solver is used to optimize the individual scaling factors of strain gages, while reducing the maximum force and zero errors.

The assumptions of the strain gage based methods are:
1. The beam has a linear response at all strain gage locations.
2. The beam is slender, and the Euler-Bernoulli beam theory is used to developed the strain gage based methods.
3. There exist individual scaling factors that are independent of loading, which can be applied to each strain gage and account for joint effects.

The strain gage based methods developed here are robust since:
1. The methods are independent of boundary conditions.
2. The scaling factor of each strain gage is determined through a calibration procedure regardless of the starting point.
3. Temperature effects can be cancelled out for homogeneous, prismatic beams without having to zero the strain gages before readings are taken. Temperature effects can be cancelled out for non-homogeneous and/or non-prismatic beams by zeroing the strain gages before readings are taken.
4. The beam can be non-continuous and non-homogenous, and have variable cross sections, welded and bolted joints, and different types of boundary conditions.

A limitation of the theory at this point is that the beam should be a slender beam governed by the Euler-Bernoulli beam theory. Another limitation of the force transducer methodology is when two forces are separated by one uniaxial strain gage, the problem is ill-posed. However, the additional strain gage based method developed here using shear gages creates a unique solution for that case.

5.3 Future Work

Future research will be conducting static experiments on the portable army bridge on the BCS using shear gages to determine loads separated by one strain gage location. Additional research will be the application of the strain gage based methods to determine the magnitude and location of dynamic loads on a bridge. As long as the sampling rate of the strain data is sufficiently high, the methods would work for static and dynamic loads. Specifically, the dynamic loading can be used to identify the cylinder forces for the BCS at Aberdeen Test Center. A computer algorithm can be developed to identify the magnitudes and locations of dynamic loads on a bridge by filtering zero loads below a threshold (i.e. 10% of the load), and calculating the vehicle speed. Another type of bridge that can be tested on the BCS is a truss bridge based off of the Bailey Bridge design as shown in FIG. 136. The load identification methods developed here can be extended for a truss bridge with periodically changing cross sections. The methods developed here can also be extended to a bridge with multiple supports.

The existing methodology can be tested on commercial bridges as well as army bridges. There are additional challenges of commercial bridges that do not exist for the portable army bridge used here: there can be additional supports under the bridge, there can be a nonlinear response such as for a concrete bridge, there can be small strain readings which can yield a low signal to noise ratio, and vehicles can cross at high speeds giving a large dynamic effect. It is also possible that a vehicle that is accelerating can produce large longitudinal loads that were not accounted for in this methodology.

Other future research can be developing a more robust method to determine the accuracy of experimental boundary conditions, by recreating the bending moment curve and calculating the reaction moments at the end abutments. The distinction between firm rest and soft rest can be determined using strain data, and can be applied also to military bridges resting on dirt end abutments. The accuracy of a simulated fixed boundary created from a clamp can be determined by calculating the reaction moments.

Lastly, future research can focus on non-slender beams that are governed by the Timoshenko beam theory instead of the Euler-Bernoulli beam theory. It is possible that the strain gage based methods developed here can be extended to such non-slender beams if the beam response is linear at the strain gage locations.

REFERENCES

[1] Zhu, X. Q. and Law, S. S., "Practical Aspects in Moving Load Identification", Journal of Sound and Vibration, 2002, V258, pgs. 123-146.

[2] Asnachinda, P., Pinkaew., T. and Laman, J. A., "Multiple Vehicle Axle Load Identification from Continuous Bridge Bending Moment Response", Science Direct, May 2008, pgs. 1-18.

[3] Moses, Fred M., "Weigh-In-Motion System Using Instrumented Bridges", Transportation Engineering Journal, May 1979, pgs. 233-249.

[4] Peters, R. J., "AXWAY—A System to Obtain Vehicle Axle Weights", The $12^{th}$ ARRB Conference, Hobart, Tasmania, August 1984, pgs. 10-18.

[5] Yuan, X. R., Cheng, E. L. and Chan, T. H., "Identification of Moving Loads from the Response of Simply Supported Beam", Proceedings of the International Conference on Structural Dynamics, Vibration, Noise and Control, Hong Kong, December 1995, pgs. 924-929.

[6] Bu, J. Q., Law, S. S. and Zhu, X. Q., "Innovative Bridge Condition Assessment from Dynamic Response of a Passing Vehicle", Journal of Engineering Mechanics, December 2006, pgs. 1372-1379.

[7] Law, S. S., Bu, J. Q., Zhu, X. Q. and Chan, S. L., "Moving Load Identification on a Simply Supported Orthotropic Plate", International Journal of Mechanical Sciences, 2007, V49, pgs. 1262-1275.

[8] Rowley, C. W., O'Brien, E. J., Gonzalez, A. and Znidaric, A., "Experimental Testing of a Moving Force Identification Bridge Weigh-In-Motion Algorithm", Experimental Mechanics, November 2008, pgs. 743-746.

[9] Skelton, S. B. and Richardson, J. A., "A Transducer for Measuring Tensile Strains in Concrete Bridge Girders", Experimental Mechanics, 2006, V46, pgs. 325-332.

[10] Adams, R. and Doyle, J. F., "Multiple Force Identification for Complex Structures", Experimental Mechanics, March 2002, pgs. 25-36.

[11] Jiu, J., Ma, C., Kung, I. and Lin, D., "Input Force Estimation of a Cantilever Plate by Using a System Identification Technique", Computer Methods in Applied Mechanics and Engineering, 2000, V190, pgs. 1309-1322.

[12] Hillary, B. and Ewins, D. J., "The Use of Strain Gauges in Force Determination and Frequency Response Function Measurements", Proceedings of the $2^{nd}$ International Modal Analysis Conference and Exhibit, February 1984, pgs. 627-634.

[13] Rajkondawar, P., Tasch, U., Lefcourt, A. M., Erez, B., Dyer, R. M., and Varner, M. A., "A System for Identifying Lameness in Dairy Cattle", American Society of Agricultural and Biological Engineers, 2002, V18, pgs. 1-28.

[14] The Technical Staff of Measurements Group, Inc., "Strain Gage Based Transducers: Their Design and Construction", 1988,pgs. 1-79.

[15] Vishay Measurements Group, Inc., "Measurement of Force, Torque, and Other Mechanical Variables with Strain Gages", Technical Publication 2011, pgs. 1-26.

[16] Young, W., "Roark's Formulas for Stress & Strain, 6$^{th}$ Edition", McGraw-Hill, 1989, pg. 52.

[17] Vishay Measurements Group, Inc., "Strain Gage Selection: Criteria, Procedures, Recommendations", Tech Note TN-505-4, November 2010 pgs. 49-64.

[18] Moller, P. W., "Load Identification Through Structural Modification", Journal of Applied Mechanics, Vol. 66, Issue 1, March 1999, pgs. 236-241.

[19] Masroor, S. A. and Zachary, L. W., "Designing an All-Purpose Force Transducer, Experimental Mechanics", Vol. 31, Issue 1, 1991, pgs. 33-35.

[20] Vishay Measurements Group, Inc., SC-300 Strain Measuring Systems Workshop, 2003.

[21] Craig, Roy R. Jr., "Mechanics of Materials", John Wiley and Sons, 1996.

[22] Nash, W. A., "Schaum's Outlines: Statics and Mechanics of Materials", McGraw-Hill Companies, 1992.

[23] Muvdi, B. B. and McNabb, J. W., "Engineering Mechanics of Materials", Macmillan Publishing Co., 1980.

[24] Kluck, J., Connor, R., and Hornbeck, B., "Trilateral Design and Test Code for Military Bridging and Gap-Crossing Equipment", Military Document Approved for Public Release, 2005, pgs. 1-117.

[25] American Forest & Paper Association "Beam Design Formulas with Shear and Moment Diagrams", November 2007, pgs. 1-20.

[26] Vishay Measurements Group, Inc., "Strain Gage Thermal Output and Gage Factor Variation with Temperature", Tech Note TN-504-1, September 2010, pgs. 35-47.

[27] Andrae, J. and Sawla, A., "Time Synchronized Measurement of Multi-Bridge Force Transducers", Measurement, 2001, V29, pgs. 105-111.

[28] Blakeborough, A., Clement, D., Williams, M. S. and Woodward, N., "Novel Load Cell for Measuring Axial Force, Shear Force and Bending Moment in Large-Scale Structural Experiments", Experimental Mechanics, March 2002, pgs. 115-122.

[29] Frederiksen, P. S. and Petersen, T, "On Calibration of Adjustable Strain Transducers", Experimental Mechanics, September 1996, pgs. 218-223.

[30] Dorsey, J., "Homegrown Strain-Gage Transducers", Experimental Mechanics, July 1977, pgs. 255-260.

[31] Bednarz III, E. T., Zhu, W. D. and Smith, S. A., "Identifying the Magnitude and Location of a Load on a Slender Beam Using a Strain Gage Based Force Transducer", submitted to the Journal of Strain Analysis.

[32] Vishay Measurements Group, Inc., "Plane-Shear Measurement with Strain Gages", Tech Note TN-512-1, September 2010 pgs. 113-118.

[33] Bednarz III, E. T., Zhu, W. D. and Smith, S. A., "Identifying Magnitudes and Locations of Multiple Loads on a Slender Beam Using Strain Gage Based Methods", submitted to the Journal of Strain Analysis.

[34] Mahoud, H., "Applying a Fuzzy Logic Expert System in the Selection of Bridge Deck Joints", Dissertation, University of Central Florida, 1998, pgs. 1-474.

[35] Groper, M., "Microslip and Macroslip in Bolted Joints", Experimental Mechanics, 1985, pgs. 171-174.

[36] Gaul, L., and Bohlen, S., "Identification of Nonlinear Structural Joint Models and Implementation in Discretized Structure Models", Conference on Mechanical Vibration and Noise, 1987, pgs. 213-219.

[37] Blendulf, B., "Fastening Technology & Bolted/Screwed Joint Design", seminar, February 2010, pgs. 1-284.

[38] He, K. and Zhu, W. D., "Finite Element Modeling of Structures With L-Shaped Beams and Bolted Joints", Journal of Vibration and Acoustics, February 2011, V 133, pgs. 1-13.

[39] Song, Y., Hartwigsen, C. J., McFarland, D. M., Vakakis, A. F., and Bergman, L. A., "Simulation of Dynamics of Beam Structures with Bolted Joints Using Adjusted Iwan Beam Elements", Journal of Sound and Vibration, 2004, V273, pgs. 249-276.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements, and dimensions can achieve the results described herein, without departing from the spirit and scope of this invention. Accordingly, the present invention should not be limited by the foregoing description. Rather the present invention is defined by the appended claims.

What is claimed is:

1. A deflection plate for protecting a load cell of a mobile dynamometer, comprising:
   a generally elongated member having a front surface, a back surface, a top surface, a bottom surface and two side surfaces;
   said front surface being at least partially tapered such that said front surface adjacent said top surface is thicker than said front surface adjacent said bottom surface;
   said front surface having at least one bore adjacent said top surface; and
   said front surface having at least one bore adjacent said bottom surface.

2. The deflection plate of claim 1 wherein said front surface tapers for a substantial portion from adjacent said top surface to adjacent said bottom surface with decreasing thicknesses.

3. The deflection plate of claim 2 wherein said front surface tapers with at least four decreasing thicknesses.

4. The deflection plate of claim 3 wherein said elongated member is formed of five segments wherein said first segment includes said top surface and said fifth segment includes said bottom surface and wherein said second segment, said third segment and said fourth segment are disposed in increasing segment number order between said first segment and said fifth segment.

5. The deflection plate of claim 4 wherein said first segment and said fifth segment have respective constant thicknesses arid wherein the thickness of the first segment is greater than the thickness of the fifth segment.

6. The deflection plate of claim 5 wherein said second segment, said third segment and said fourth segment each have decreasing thicknesses such that the junction of said second segment and said third segment is greater than the thickness of said junction of said third segment and said fourth segment.

7. The deflection plate of claim 6 wherein said front surfaces of each of said second segment, said third segment and said fourth segment are generally flat.

8. The deflection plate of claim 7 wherein said elongated member is generally rectangular.

9. The deflection plate of claim 8 wherein said back surface, said top surface, said bottom surface and said two side surfaces are generally flat.

10. The deflection plate of claim 9 wherein the bottom surface and the sides are joined by flat angled surfaces.

11. The deflection plate of claim 1, where the generally elongated member is substantially solid absent the bores.

12. The deflection plate of claim 2, where the front surface tapers for at least about 40% of the length of the front surface.

13. A system, comprising:
a deflection plate comprising a generally elongated member having a front surface, a back surface, a top surface, a bottom surface and two side surfaces;
where the deflection plate comprises a beginning segment, a middle segment, and a last segment,
where the beginning segment terminates at the top surface and is of a first uniform thickness,
where the middle segment is between the beginning segment and the last segment,
where the last segment terminates at the bottom surface and is of a second uniform thickness smaller than the first uniform thickness,
where the front surface of the beginning segment is substantially parallel to the back surface,
where the front surface of the middle segment at least partially tapers such that at least part of the middle segment is thinner than the beginning segment and such that at least part of the middle segment is thicker than the last segment,
where the front surface of the last segment is substantially parallel to the back surface,
where the back surface is substantially flat,
where the beginning segment has at least one bore, and
where the last segment has at least one bore.

14. The system of claim 13,
where the middle segment comprises a first middle segment and a second middle segment
where the first middle segment is between the beginning segment and the second middle segment,
where the second middle segment is between the first middle segment and the last segment,
where the first middle segment tapers along a first angle, and
where the second middle segment tapers along a second angle that is different from the first angle.

15. The system of claim 14,
where the middle segment comprises the first middle segment, the second middle segment, and a third middle segment,
where the first middle segment tapers along a third angle.

16. A system, comprising:
a deflection plate that comprises a generally elongated member having a front surface, a back surface, a top surface, a bottom surface and two side surfaces;
where the front surface is at least partially tapered such that the front surface adjacent to the top surface is thicker than the front surface adjacent to the bottom surface,
where the front surface has at least one bore adjacent to the top surface,
where the front surface has at least one bore adjacent to the bottom surface, and
where the deflection place is configured to protect a dynamometer.

17. The system of claim 16, where the generally elongated member is solid absent the at least one bore adjacent to the top surface and absent the at least one bore adjacent to the bottom surface.

18. The system of claim 17, where the front surface is at least partially tapered such that stress remains substantially constant throughout most the deflection place when the deflection plate is stressed.

19. The system of claim 16, where the front surface is at least partially flat in at least two non-adjacent segments that are separated by a tapered section.

20. The deflection plate of claim 1, said front surface having at least one bore adjacent said top surface that creates an opening from the top surface to the back surface; and said front surface having at least one bore adjacent said bottom surface that creates an opening from the top surface to the back surface.

* * * * *